US006798412B2

(12) United States Patent
Cowperthwaite

(10) Patent No.: US 6,798,412 B2
(45) Date of Patent: Sep. 28, 2004

(54) OCCLUSION REDUCING TRANSFORMATIONS FOR THREE-DIMENSIONAL DETAIL-IN-CONTEXT VIEWING

(75) Inventor: David Cowperthwaite, Hillsboro, OR (US)

(73) Assignee: Idelix Software Inc., Vancouver (CA)

( * ) Notice: Subject to any disclaimer, the term of this patent is extended or adjusted under 35 U.S.C. 154(b) by 259 days.

(21) Appl. No.: 09/946,806

(22) Filed: Sep. 6, 2001

(65) Prior Publication Data

US 2002/0122038 A1 Sep. 5, 2002

(30) Foreign Application Priority Data

Sep. 6, 2000 (CA) .............................................. 2317336

(51) Int. Cl.[7] .............................................. G06T 17/00
(52) U.S. Cl. ...................................................... 345/428
(58) Field of Search ................................ 345/419, 424, 345/428, 420, 421, 422, 427, 619, 625, 628, 672, 682

(56) References Cited

U.S. PATENT DOCUMENTS

| 5,432,895 | A | * | 7/1995 | Myers ........................ 345/419 |
| 5,680,524 | A | * | 10/1997 | Maples et al. ............... 345/427 |
| 5,689,628 | A | | 11/1997 | Robertson ................... 345/427 |
| 5,751,289 | A | * | 5/1998 | Myers ........................ 345/419 |
| 5,999,879 | A | | 12/1999 | Yano .......................... 701/208 |
| 6,160,553 | A | | 12/2000 | Robertson et al. .......... 345/767 |
| 6,204,850 | B1 | * | 3/2001 | Green ......................... 345/850 |
| 2003/0118223 | A1 | * | 6/2003 | Rahn et al. ................. 382/131 |

OTHER PUBLICATIONS

Cowperthwaite, David J., *Occlusion Resolution Operators for Three–Dimensional Detail–In–Context* (Burnaby, British Columbia: Simon Fraser University, 2000).

Carpendale, Marianne S.T., *A Framework for Elastic Presentation Space* (Burnaby, British Columbia: Simon Fraser University, 1999).

Carpendale, M.S.T., David J. Cowperthwaite, Margaret-Anne D. Storey, and F. David Fracchia, *Exploring Distinct Aspects of the Distortion Viewing Paradigm*, Technical Report TR 97–08, School of Computer Science, Simon Fraser University, Burnaby, British Columbia, Canada, Sep. 1997.

Cowperthwaite, David J., M. Sheelagh T. Carpendale, and F. David Fracchia, *Visual Access for 3D Data*, in Proceedings of ACM CHI 96 Conference on Human Factors in Computing Systems, vol. 2 of Short Papers: Alternative Methods of Interaction, pp. 175–176, 1996.

(List continued on next page.)

Primary Examiner—Don Wong
(74) Attorney, Agent, or Firm—Joseph Conneely; Ogilvy Renault

(57) ABSTRACT

In a data processing system that executes a program of instructions, a method for generating a detail-in-context presentation of a three-dimensional information representation comprising the steps of selecting a object-of-interest in the information representation; selecting a viewpoint; selecting a path from the viewpoint to the object-of-interest; and, displacing objects in the information representation away from the path to locations within the information representation where the objects remain visible when viewed from the viewpoint yet do not occlude the object-of-interest when viewed from the viewpoint to thereby generate the detail in context view.

58 Claims, 78 Drawing Sheets

OTHER PUBLICATIONS

Keahey, T. Alan, *Visualization of High–Dimensional Clusters Using Nonlinear Magnification*, Technical Report LA–UR–98–2776, Los Alamos National Laboratory, 1998.

Tigges, Mark, M.S.T. Carpendale, and Brian Wyvill, *Generalized Distance Metrics for Implicit Surface Modeling*, in Proceedings of the Tenth Western Computer Graphics Symposium, Mar. 1999.

Bossen, Frank J., *Anisotropic Mesh Generation with Particles*, Technical Report CMU–CS–96–134, CS Dept., Carnegie Mellon University, May 1996.

Bossen, Frank J. and Paul S. Heckbert, *A Pliant Method for Anisotropic Mesh Generation*, in 5th Intl. Meshing Roundtable, pp. 63–74, Oct. 1996.

Wilson, Orion, Allen VanGelder, and Jane Wilhelms, *Direct Volume Rendering Via 3D Textures*, Technical Report UCSC–CRL–94–19, University of California, Santa Cruz, Jack Baskin School of Engineering, Jun. 1994.

Carpendale, M. Sheelagh T., et al., "Distortion Viewing Techniques for 3–Dimensional Data", Information Visualization '96, Proceedings IEEE Symposium On, San Francisco, CA, USA, Oct. 28–29, 1996, Los Alamitos, CA, USA, IEEE Comput. Soc., US, Oct. 28, 1996 (Oct. 28, 1996), pp. 46–53 and 119, XP010201944, ISBN: 0–8186–7668–X.

Carpendale, M. Sheelagh T., et al., "Extending Distortion Viewing from 2D to 3D", IEEE Computer Graphics and Applications, IEEE Inc., New York, US, vol. 17, No. 4, Jul. 1997 (Jul. 1997), pp. 42–51, XP000927815, ISSN: 0272–1716.

Keahey, T. Alan, "The Generalized Detail–In–Context Problem", Information Visualization, 1998, Proceedings, IEEE Symposium On, Research Triangle, CA, USA, Oct. 19–20, 1998, Los Alamitos, CA, USA, IEEE Comput. Soc., US, Oct. 19, 1998 (Oct. 19, 1998), pp. 44–51 and 152, XP010313304, ISBN: 0–8186–9093–3.

Carpendale, M. Sheelagh T., et al., "Making Distortions Comprehensible", Visual Languages, 1997, Proceedings, 1997 IEEE Symposium On, Isle of Capri, Italy, Sep. 23–26, 1997, Los Alamitos, CA, USA, IEEE Comput Soc., US, Sep. 23, 1997 (Sep. 23, 1997), pp. 36–45, XP010250566, ISBN: 0–8186–8144–6.

Carpendale, M. Sheelagh T., et al., "3–Dimensional Pliable Surfaces: For the Effective Presentation of Visual Information", UIST '95, 8th Annual Symposium On User Interface Sofware and Technology, Proceedings Of The ACM Symposium On User Interface Sofware and Technology, Pittsburgh, PA, Nov. 14–17, 1995, ACM Symposium On User Interface Software and Technology, New York, Nov. 14, 1995 (Nov. 14, 1995), pp. 217–226, XP000634423, ISBN: 0–89791–709–X.

Ito, Minoru, et al., "A Three–Level Checkerboard Pattern (TCP) Projection Method for Curved Surface Measurement", Pattern Recognition, Pergamon Press Inc., Elmsford, N.Y., US, vol. 28, No. 1, 1995, pp. 27–40, XP004014030, ISSN 0031–3203.

Keahey, T. Alan, et al., "Techniques for Non–Linear Magnification Transformations", Information Visualization '96, Proceedings, IEEE Symposium On, San Francisco, CA, USA, Oct. 28–29, 1996, Los Alamitos, CA, USA, IEEE Comput. Soc., US, Oct. 28, 1996 (Oct. 28, 1996), pp. 38–45, XP010201943, ISBN: 0–8186–7668–X.

Keahey, T. Alan, et al., "Nonlinear Magnification Fields", Information Visualization, 1997, Proceedings, IEEE Symposium On, Phoenix, AZ, USA, Oct. 20–21, 1997, Los Alamitos, CA, USA, IEEE Comput. Soc., US, Oct. 20, 1997 (Oct. 20, 1997), pp. 51–58 and 121, XP010257169, ISBN: 0–8186–8189–6.

* cited by examiner (a) Horizontal Plane-Relative (b) Addition of Shaping Function

1100

(a) $L_1$   (b) $L_{1.5}$   (c) $L_2$   (d) $L_{2.5}$   (e) $L_5$

1700

(a) Discrete (b) Contiguous (c) Continuous (a) Perspective Viewing Frustum    (b) Magnification via Displacement

4800

(a) View-Aligned　　　(b) Secondary Viewpoint

4900

4910

(a) View-Aligned  (b) Secondary Viewpoint

5000

(a) Initial     (b) View-Aligned     (c) Secondary Viewpoint

5100

5200

5300

(a) Object-Axis Aligned    (b) Sightline-Aligned

6200

(a) (b) (c) (d)

6500

(a) (b) (c)

6700

6800

(a)                                       (b)

7000

(a) (b) (c)

OCCLUSION REDUCING TRANSFORMATIONS FOR THREE-DIMENSIONAL DETAIL-IN-CONTEXT VIEWING

The invention relates to the field of computer graphics processing. More specifically, the invention relates to a method and system for viewing details in representations of three-dimensional information while maintaining the context and, where occlusions of the detail is avoided.

BACKGROUND OF THE INVENTION

Three-dimensional ("3D") representations of information present specific challenges not found in two-dimensional ("2D") representations, for example, in 3D representations certain elements may be occluded by the presence of other elements in the representation Traditional approaches to dealing with occlusion avoidance in 3D representations include techniques such as cutting planes, viewer navigation, filtering of information, and transparency. While these methods provide clearer visual access to elements of interest it removes much of the contextual information from a representation.

In 2D representations all information is restricted to a plane perpendicular to a view point. The addition of the third spatial variable (or z component) allows objects to be interposed or positioned between the viewpoint and other objects in a scene, thus partially or completely hiding them from view. The preservation of spatial relationships and presentation of relationships to the occluding objects is important in constructing a physically plausible scene or in other words the detail of the scene is maintained in the context in which it exists For example, in volumetric rendering of 3D data it is often the case that the near-continuous nature of the data makes occlusion of interior features of the data inevitable. This phenomenon is important in supporting perception of the scene as a 3D representation, but a user may very well wish to examine these hidden interior regions.

Solutions are available that provide visual access (i.e. clear lines of sight) to previously occluded elements. Several of these solutions are described by Cowperthwaite in *Occlusion Resolution Operators for Three-Dimensional Derail-In-Context* (Cowperthwaite, David J., *Occlusion Resolution Operators for Three-Dimensional Detail-In-Context* (Burnaby, British Columbia: Simon Fraser University, 2000)) which is incorporated herein by reference. Cutting planes may be used to remove information from a scene. Increasing transparency (or reducing the opacity) of objects allows more distant objects to be seen through those more proximal to the viewer. Navigation of the viewer, whether egocentric (moving the viewer within the data space) or exocentric (moving or re-orientation of the data space) may lead to a configuration where occlusion is resolved. Finally, information filtering may be used to reduce the density of data in a representation. These are all common methods of occlusion resolution and all operate by reducing the amount (or visibility) of contextual information in the final presentation. Similar methods such as panning zooming and filtering have also been traditionally applied to dealing with large or congested displays of information in two-dimensions. Thus, the removal of information from a presentation has been one approach to dealing with the large information spaces.

Another approach has been the development of "detail-in-context" presentation algorithms. The field of detail-in-context viewing is concerned with the generation of classes of information presentations where areas or items defined as focal regions or regions of interest ("ROI") are presented with an increased level of detail, without the removal of contextual information from the original presentation. For example, regions of greatest interest may be displayed at an enlarged size, providing more visual detail, while the scale of the surrounding context may be adjusted to provide the space for the magnification of the ROI.

In the detail-in-context discourse, differentiation is open made between the terms "representation" and "presentation". A "representation" is a formal system, or mapping, for specifying raw information or data that is stored in a computer or data processing system. For example, a digital map of a city is a representation of raw data including street names and the relative geographic location of streets and utilities. Such a representation may be displayed visually on computer screen or printed on paper. On the other hand, a presentation is a spatial organization of a given representation that is appropriate for the task at hand. Note also that the term "visualization" in computer graphics processing is often used to identify the process of applying computer graphics techniques to the problem of presenting information to users. That is, a "representation" is transformed into a "presentation" through the process of visualization. Thus, a presentation of a representation organizes such things as the point of view and the relative emphasis of different parts or regions of the representation. For example, a digital map of a city may be presented with a work route magnified to reveal street names. Thus, detail-in-context presentations allow for magnification of a particular ROI in a representation while preserving visibility of the surrounding representation. In other words, in detail-in-context presentations focal regions are presented with an increased level of detail without the removal of contextual information from the original representation. In general, a detail-in-context presentation may be considered as a distorted view (or distortion) of a portion of the original representation where the distortion is the result of the application of a "lens" like distortion function to the original representation. For reference, a detailed review of various detail-in-context presentation techniques may be found in Carpendale's *A Framework for Elastic Presentation Space* (Carpendale, Marianne S. T., *A Framework for Elastic Presentation Space* (Burnaby, British Columbia: Simon Fraser University, 1999)) which is incorporated herein by reference.

The process of generating 2D detail-in-context presentations as described by Carpendale may be encompassed by the term Elastic Presentation Space ("EPS"). EPS includes techniques that allow for the adjustment of a visual presentation without interfering with the information content of the representation. The adjective "elastic" is included in the term as it implies the capability of stretching and deformation and subsequent return to an original shape. Basically, in EPS graphics technology, a two-dimensional visual representation is placed onto a surface; this surface is placed in three-dimensional space; the surface, containing the representation, is viewed through perspective projection; and the surface is manipulated to effect the reorganization of image details. The presentation transformation is separated into two steps: surface manipulation or distortion and perspective projection. Extensions of classical 2D detail-in-context viewing algorithms to 3D by the addition of a z component do not adequately address the situation To reiterate, a unique situation arises with detail-in-context viewing and 3D representations of information in that the possibility of the ROI being occluded exists. As discussed above, there are a number of methods which have been developed, independent of detail-in-context viewing, for dealing with situation of occlusion in 3D information representations. Each of these methods involves removing information from a display in some manner, which is contrary to the goals of detail-in-context viewing.

Several systems are known which provide techniques for occlusion avoidance in computer graphics systems. In U.S. Pat. No. 5,999,879 (Yano), a navigation apparatus for stereoscopically displayed road maps containing shape data for buildings, mountains, and similar landmarks is disclosed. With the disclosed apparatus, when a landmark object overlaps a section of road in stereoscopic view, the shape of the overlapping landmark may be changed so that the occluded section of road may be observed. The disclosed apparatus cannot provide detail-in-context presentations. In U.S. Pat. No. 5,689,628 (Robertson), a method and system are disclosed for maintaining a view of a selected display object while navigating in an n-dimensional, workspace. As such, the disclosed method and system exemplify, at most, a viewer navigation-like approach to occlusion avoidance. Thus, none of these systems disclose a method or system for occlusion avoidance in a maimer that is optimized for 3D information representations and detail-in-context viewing.

A need therefore exists for a method and system that will allow for effective occlusion avoidance and detail-in-context viewing of representations of three-dimensional data

SUMMARY OF THE INVENTION

The invention provides a method, system, computer program product, and integrated circuit product for occlusion avoidance and detail-in-context viewing of 3D information representations. The invention employs Occlusion Reducing Transformations to improve the visibility of objects-of-interest within 3D information representations by the displacement of occluding objects. The invention enables occlusion avoidance and hence the effective generation of 3D detail-in-context presentations. Occluding objects are generally displaced in directions away from the line of sight extending from a user's viewpoint to the object-of-interest in the information representation.

According to one aspect of the invention, a method is provided for generating a detail-in-context presentation of a three-dimensional information representation. The method comprises the steps of selecting a object-of-interest in the information representation; selecting a viewpoint; selecting a source path from the viewpoint to the object-of-interest; and, displacing objects in the information representation away from the source path to locations within the information representation where the objects remain visible when viewed from the viewpoint yet do not occlude the object-of-interest when viewed from the viewpoint. With respect to the displacement of objects away from the source, the method further comprises the steps of, for each object, calculating a direction vector between the object and the nearest point on the source; calculating the magnitude of this direction vector; calculating a displacement vector having the same direction as the direction vector and having a magnitude based on the magnitude of the direction vector and given by a transformation function; and, displacing the object in the direction of the displacement vector a distance given by the magnitude of the displacement vector.

According to another aspect of the invention, a method is provided wherein the transformation function is such that objects located closest to the source are displaced the furthest and objects originally lying further away from the source are displaced in successively smaller increments such that a smooth transition is eventually made to objects that are located far enough away from the source as to require no displacement for occlusion avoidance purposes.

According to another aspect of the invention, a method is provided wherein the transformation function includes a detail-in-context distortion basis function According to another aspect of the invention, a method is provided wherein the source is a line, According to another aspect of the invention, a method is provided wherein the source is a plane.

According to another aspect of the invention, a method is provided wherein the plane is parallel to a plane containing a vector from the viewpoint to the object-of-interest.

According to another aspect of the invention, a method is provided wherein the plane is perpendicular to a plane containing a vector from the viewpoint to the object-of-interest.

According to another aspect of the invention, a method is provided wherein the plane is rotted with respect to a plane containing a vector from the viewpoint to the object-of-interest.

According to another aspect of the invention, a method is provided wherein the distribution of the transformation function across a plane perpendicular to a vector from the viewpoint to the object-of-interest is modified by a shaping function.

According to another aspect of the invention, a method is provided wherein the shaping function is operable to spatially constrain the operation of the transformation function.

According to another aspect of the invention, a method is provided wherein the shaping function is constant.

According to another aspect of the invention, a method is provided wherein the shaping function is Gaussian.

According to another aspect of the invention, a method is provided wherein the shaping function is linear.

According to another aspect of the invention, a method is provided wherein the shaping function is a user defined curve.

According to another aspect of the invention, a method is provided wherein the object-of-interest is the focus of the detail-in-context distortion basis function.

According to another aspect of the invention, a method is provided wherein the detail-in-context distortion basis function is linear.

According to another aspect of the invention, a method is provided wherein the detail-in-context distortion basis function is Gaussian.

According to another aspect of the invention, a method is provided wherein the detail-in-context distortion basis function is hemispherical.

According to another aspect of the invention, a method is provided wherein the detail-in-context distortion basis function is inverse hemispherical.

According to another aspect of the invention, a method is provided wherein the detail-in-context distortion basis function is trigonometric.

According to another aspect of the invention, a method is provided wherein the detail-in-context distortion basis function is user defined.

According to another aspect of the invention, a method is provided wherein the distribution of the transformation function along the source parallel to a vector from the viewpoint to the object-of-interest is defined by a distribution function.

According to another aspect of the invention, a method is provided wherein the distribution function is a z-axis distribution function.

According to another aspect of the invention, a method is provided wherein the distribution function is constant.

According to another aspect of the invention, a method is provided wherein the distribution function is linear.

According to another aspect of the invention, a method is provided wherein the linear distribution function continues through the three-dimensional data representation thereby isolating the object-of-interest.

According to another aspect of the invention, a method is provided wherein the distribution function is short linear.

According to another aspect of the invention, a method is provided wherein one end of the short linear distribution function terminates at the object-of-interest.

According to another aspect of the invention, a method is provided wherein the distribution function is truncated.

According to another aspect of the invention, a method is provided wherein the distribution function is truncated at the object-of-interest.

According to another aspect of the invention, a method is provided wherein the truncated distribution function includes a cap around the object-of-interest.

According to another aspect of the invention, a method is provided wherein the cap is hemispherical.

According to another aspect of the invention, a method is provided wherein the distribution function is a user defined curve.

According to another aspect of the invention, a method is provided wherein the magnitude of the displacement vector as given by the transformation function is defined by a distance metric.

According to another aspect of the invention, a method is provided wherein the distance metric is Euclidean.

According to another aspect of the invention, a method is provided wherein the distance metric is Lp as given by the equation $dLp(x,y,z)=[((ABS(x))^p+(ABS(y))^p+(ABS(z))^p]^{(1/p)}$.

According to another aspect of the invention, a method is provided wherein the distance metric is super-quadratic.

According to another aspect of the invention, a method is provided wherein the distance metric is user defined.

According to anther aspect of the invention, a method is provided wherein the object-of-interest is a plurality of objects-of-interest.

According to another aspect of the invention, a data processing system is provided. This data processing system has stored therein data representing sequences of instructions which when executed cause the above-described method to be performed. The data processing system generally has an input device, a central processing unit, memory, and a display.

According to another aspect of the invention, a computer software product is provided. This computer software product contains sequences of instructions which when executed cause the above-described method to be performed.

According to another aspect of the invention, an integrated circuit product is provided. This integrated circuit product contains sequences of instructions which when executed cause the above-described method to be performed.

According to another aspect of the invention, the use of the above-described method to obtain an unobstructed view of a stored object in a display of the contents of a warehouse is provided. According to another aspect of the invention, the above-described use is provided wherein the stored object is an inventory item. According to another aspect of the invention, the above-described use is provided wherein the display is an electronic display. According to another aspect of the invention, the above-described use is provided wherein the display is a print-out. According to another aspect of the invention, the above-described use is provided wherein the warehouse is a shipping vessel.

According to another aspect of the invention, the use of the above-described method to obtain an unobstructed view of a person in a display of a group of people is provided. According to another aspect of the invention, the above-described use is provided wherein the display is an electronic display. According to another aspect of the invention, the above-described use is provided wherein the display is a print-out.

According to another aspect of the invention, the use of the above-described method to obtain an unobstructed view of a component within a three-dimensional drawing is provided. According to another aspect of the invention, the above-described use is provided wherein the drawing is a mechanical design drawing. According to another aspect of the invention, the above-described use is provided wherein the drawing is an engineering drawing. According to another aspect of the invention, the above-described use is provided wherein the drawing is a drawing of an automobile engine.

According to another aspect of the invention, the use of the above-described method to obtain an unobstructed view of a node in a three-dimensional network topology is provided. According to another aspect of the invention, the above-described use is provided wherein the network topology is a computer network.

BRIEF DESCRIPTION OF THE DRAWINGS

The invention may best be understood by referring to the following description and accompanying drawings in which.

DETAILED DESCRIPTION OF THE PREFERRED EMBODIMENTS

Figure 1A:
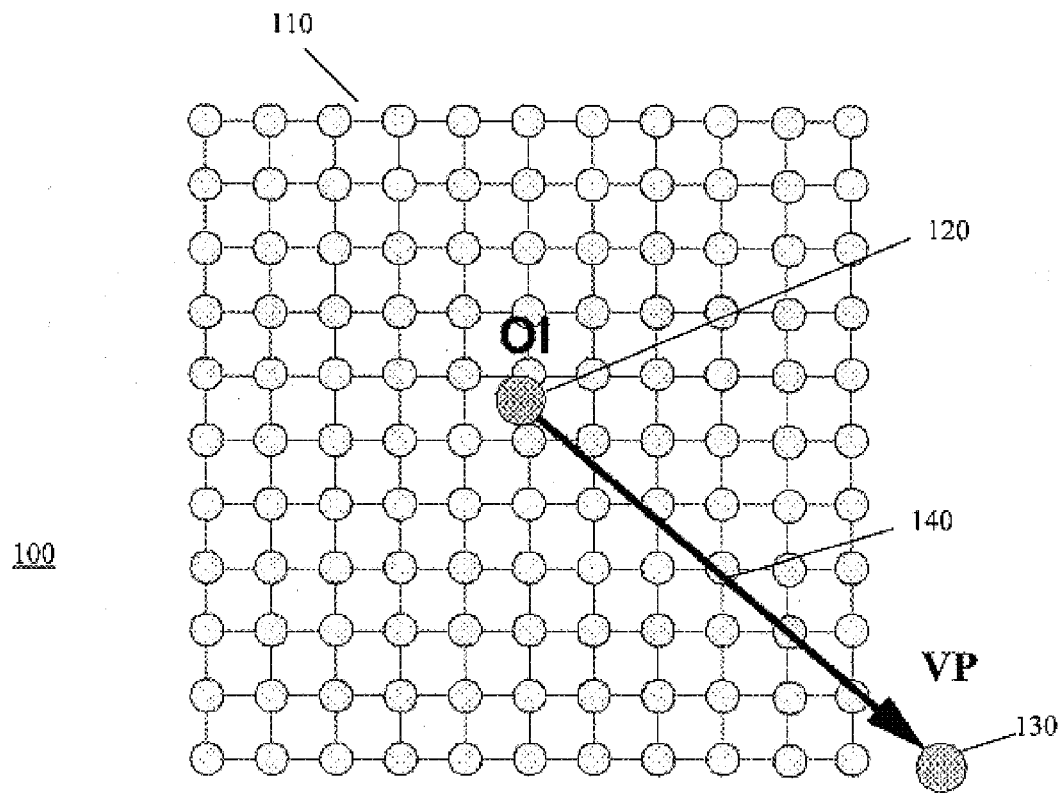
FIG. 1 is a sequence of 2D cross-sectional views illustrating a linear occlusion reducing transformation in operation in accordance with the preferred embodiment.

In the following description, numerous specific details are set forth to provide a thorough understanding of the invention. However, it is understood that the invention may be practiced without these specific details. In other instances, well-known software, circuits, structures and techniques have not been described or shown in detail in order not to obscure the invention. The term data processing system is used herein to refer to any machine for processing data, including the computer systems and network arrangements described herein. In the drawings, like numerals refer to like structures or processes.

The present invention resolves occlusion of objects in a 3D scene through a layout adjustment method derived from 2D detail-in-context viewing methods. By extension beyond traditional 2D approaches to layout adjustment in 3D, the present invention addresses the specific challenges of occlusion in 3D representations. In doing so the present invention provides a simple yet powerful method for providing non-occluded views of objects or ROIs in a 3D information representation with minimal adjustment of the original structure and without the use of cutting planes, transparency or information filtering. In other words, the present invention includes a method of occlusion resolution that provides detail-in-context viewing for 3D information representations. It maintains the representation of the data while dealing with occlusion where it occurs, namely along the line of sight connecting the viewpoint to the ROI. The present invention employs operators that will be referred to as Occlusion Reducing Transformations ("ORTs"). These ORTs are viewer-aligned and function to integrate the benefits of detail-in-context viewing with the occlusion reduction capability necessary to deal with 3D information spaces. ORTs can be applied to a range of 3D visualizations as will be described in the following.

The application of some of these 2D techniques to 3D can be extended in a manner that does account for the presence of elements occluding the object of interest. This can be accomplished by first examining the process of generating 2D detail-in-context views and identifying the specific elements of the transformation process which contribute to reduction in local information density in the final layout.

The method of the present invention for occlusion reduction and detail-in-context viewing of 3D representations draws upon EPS concepts as described in Carpendale. This EPS concept is described as follows: In EPS, detail-in-context views of 2D visual representations are created with sight-line aligned distortions of a 2D information presentation surface within a 3D perspective viewing frustum. Magnification of regions of interest and the accompanying compression of the contextual region to accommodate this change in scale are produced by the movement of regions of the surface towards the viewpoint located at the apex of the pyramidal shape containing the frustum. The process of projecting these transformed layouts via a perspective projection results in a new 2D layout which includes the zoomed and compressed regions. The use of the third dimension and perspective distortion to provide magnification in EPS provides a meaningful metaphor for the process of distorting the information presentation surface. The 3D manipulation of the information presentation surface in such a system is an intermediate step in the process of creating a new 2D layout of the information.

Figure 14:
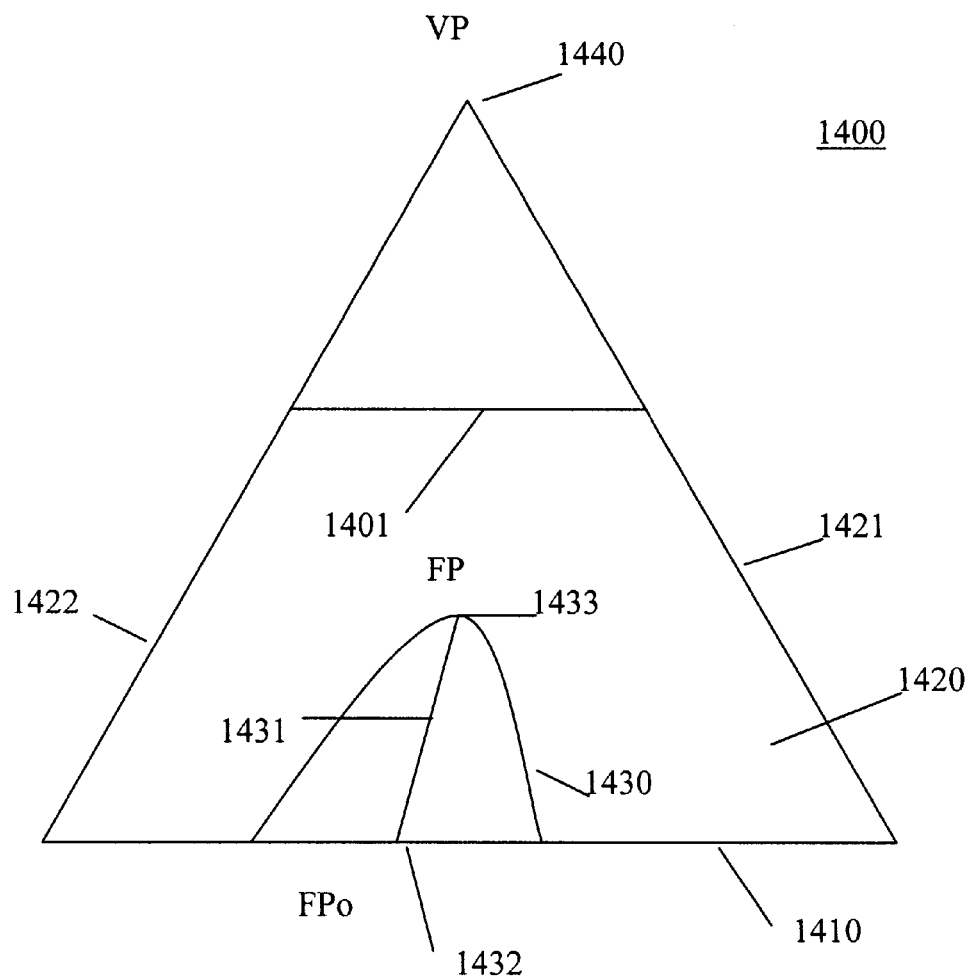
FIG. 14 is a cross-sectional view of a presentation in accordance with EPS graphics technology and in accordance with the preferred embodiment.

This process is shown graphically in FIG. 14, wherein there is shown a cross-sectional view of a presentation 1400 in accordance with an EPS system. EPS system employs viewer-aligned perspective projections to produce detail-in-context presentations in a reference view plane 1401 which may be viewed on a display. Undistorted 2D data points are located in a basal plane 1410 of a 3D perspective viewing volume or frustum 1420 which is defined by extreme rays 1421 and 1422 and the basal plane 1410. A viewpoint ("VP") 1440 is located above a center point of the basal plane 1410 and reference view plane 1401. Points in the basal plane 1410 are displaced upward onto a distorted surface 1430 which is defined by a general 3D distortion function (i.e. a detail-in-context distortion basis function). The direction of the viewer-aligned perspective projection corresponding to the distorted surface 1430 is indicated by the line FPo–FP 1431 drawn from a point FPo 1432 in the basal plane 1410 trough the point FP 1433 which corresponds to the focus or focal region or focal point of the distorted surface 1430.

The concept of occlusion in EPS is described as follows: In order for an object of interest in a 3D information representation to become occluded, an occluding object must be positioned such that its projection overlaps that of the object of interest as seen from the viewpoint ("VP"). Furthermore this occluding object must be located between the VP and the object of interest ("OOI"). If the "sight-line" of a given OOI is defined by a line segment connecting the center of the object of interest to the VP. It is in the neighborhood of this sight-line that other objects which may occlude the OOI will lie. As new OOIs are defined or as the VP is moved to a provide a new presentation of the information layout, the location of this sight-line within the layout changes, and the set of objects representing possible sources of occlusion will change as well. The fact that it is only in this region, on or near the sight-line, that objects representing potential occluding objects will be found is significant. If there are no objects in this neighborhood, other than the OOI, then there will be no occlusion. The present invention provides a method which will keep the region surrounding the sight-line clear of other occluding objects.

As previously described in the Background section, cutting planes, positioned and oriented appropriately, could remove all of the data in a representation between the OOI ad the VP. This would have the desired effect of keeping the region of the sight-line clear. However it would not support detail-in-context viewing of 3D representations. Transparency could be used to reduce the effect of occlusion to see the OOI, at the expense of increased difficulty in the comprehension of the structure as a whole. Transparency may also be increased to the point where the potentially occluding objects are essentially removed from the scene. This would accomplish the same effect as filtering. Navigation of the VP to a new location will define a new sight-line to the OOI and change the set of potentially occluding objects. It may be possible to find a new external VP where there are fewer or no occluding objects between the new VP and the OOI. In denser information representations (i.e. volmetric data) or representations where the distribution of elements leads to regions of higher and lower densities (such as scatter-plots or graphs) it may not be possible to find such a new VP. Another solution in this case is to fly into the 3D structure, moving the VP past potentially occluding objects. This has the effect of shortening the sight-line and again reducing the potential set of occluders. A side effect of this approach is that at least some of the data in the representation will now be outside of the viewing volume and thus culled from the presentation. On the other hand, the method of the present invention leaves as much as possible of the original structure of the representation intact as its focus is on the neighborhood of the sight-line and it acts principally on those objects which represent the most likely potential occluders of an OOI.

A translation function can be applied to the redistribution of density around a focal point or ROI in a 2D information representation, as described by Carpendale, Cowperthwaite, Storey, and Fracchia in *Exploring Distinct Aspects of the Distortion Viewing Paradigm* (Carpendale, M. S. T., David J. Cowperthwaite, Margaret-Anne D. Storey, and F. David Fracchia, *Exploring Distinct Aspects of the Distortion Viewing Paradigm*, Technical Report TR 97-08, School of Computing Science, Simon Fraser University, Burnaby, B C, Canada, September 1997) which is incorporated herein by reference. In this case, consider a 2D to 2D translation function, call it t(x), given by $t(x)=(x*f(x))/(d-f(x))$, where $f(x)$ is the cross sectional profile of the distortion function with the ROI located at its focus and d is the distance from the original plane of the presentation surfaced to the VP. If the source of this function is extended from a point in a 2D representation to a point in a 3D representation, then the operation of the translation function from movement of elements in (x, y) to movement in (x, y, z) can also be extended. This simple extension is capable of producing the local density reductions observed by Cowperthwaite Carpendale, and Fracchia in *Visual Access for 3D Data* (Cowperthwaite, David J., M. Sheelagh T. Carpendale, and F. David Fracchia, *Visual Access for 3D Data*, in *Proceedings of ACM CHI 96 Conference on Human Factors in Computing Systems,* volume 2 of SHORT PAPERS: *Alternative Methods of Interaction,* pages 175–176, 1996), which is incorporated herein by reference, and has seen some application to cluster-busting of 3D graph or node layouts as in Keahey's *Visualization of High-Dimensional Clusters Using Nonlinear Magnification* (Keahey, T. Alan, *Visualization of High-Dimensional Clusters Using Nonlinear Magnification,* Technical Report LA-UR-98-2776, Los Alamos National Labratory, 1998), also incorporated herein by reference, but yields little benefit in more general visual representations where occlusion is a significant problem.

Redefining the Focus. The principle problem in such direct extensions of 2D detail-in-context transformations to 3D is that they do little to resolve occlusion of the OOI. As noted, in order to reduce occlusion objects need to be removed from the neighbodrood of the sight-line. In the interest of maintaining a detail-in-context presentation of the visual representation, this has to be accomplished without the removal of information and with as little disruption of the overall structure of the layout as possible. This constrained adjustment preserves as far as possible the original mental model of the 3D structure on the part of the user.

In the foregoing discussion of translation functions, the OOI itself was treated as the source for 3D extensions of traditional 2D layout adjustment algorithms. If, instead, the sight-line from the VP to the OOI is defined as the source of the transformation function (i.e. ORT), then a similar method can be used to move objects away from the line of sight, rather than just away from the OOI.

Referring now to FIGS. 1, (a), (b) and (c), there are shown 2D cross-sectional views 100 of a linear ORT in operation. Referring to FIG. 1(a) there is shown an original configuration of 2D cross-sectional view of a structure defined by a number of information points arranged in a matrix 110, the OOI 120 near the middle of the structure 110, and the VP 130 at the lower right. The sight-line 140 connects the OOI 120 to the VP 130. In other words, the OOI 120 or focal point or ROI and the VP 130 define the line of sight through the structure 110.

Figure 1B:
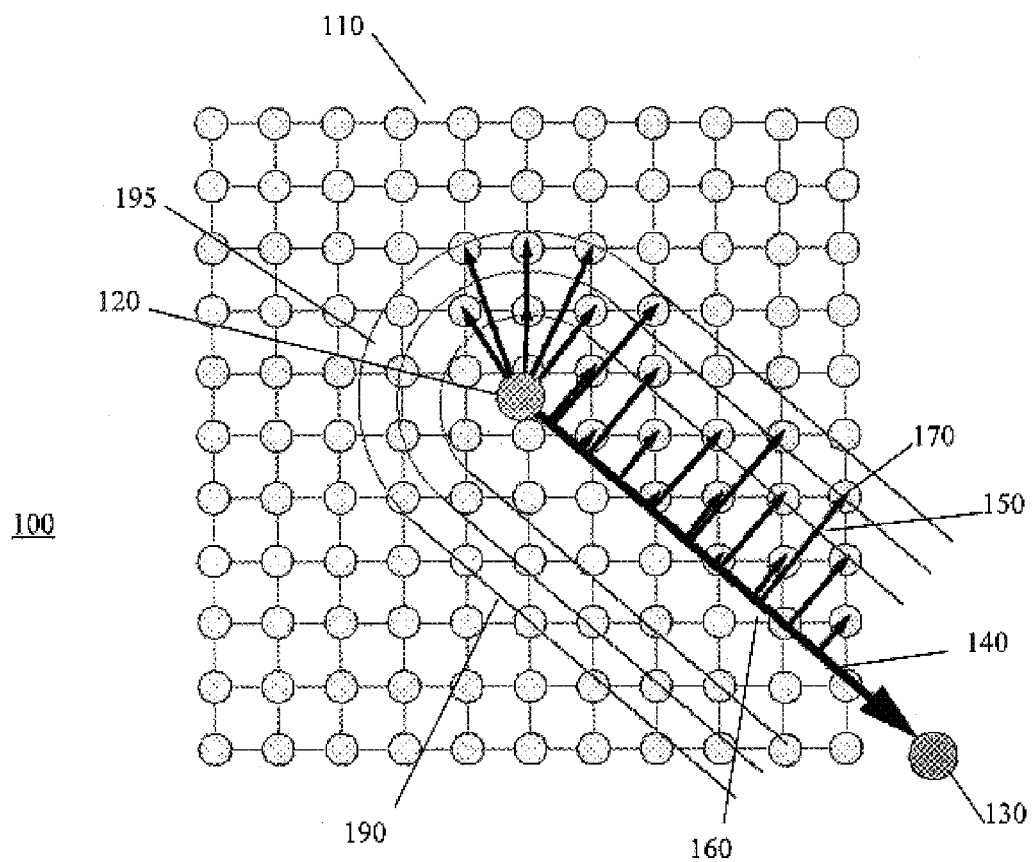

FIG. 1(b) shows direction vectors 150 to points in the structure 170 lying on or near the sight-line 140. The distance of each point 170 is measured to the nearest point 160 on the sight-line 140. A direction vector 150 from the nearest point 160 on the sight-line 140 to the point being adjusted 170 is also determined. Points will be moved in the direction of these direction vectors 150. The lengths of the direction vectors 150 form an input to a transformation function. The result of this function is used to determine the displacement for each point. Points closest to the line of sight are moved the furthest in distance, and points originally lying further away are moved in successively smaller increments in distance. In other words, the lengths of the direction vectors 150 form inputs to the function that determines the magnitude of resulting displacement vectors. The direction of the resulting displacement vectors will be parallel to the input direction vectors. Eventually a smooth transition is made to points which are far enough away as to be unaffected by the transformation.

Figure 1C:
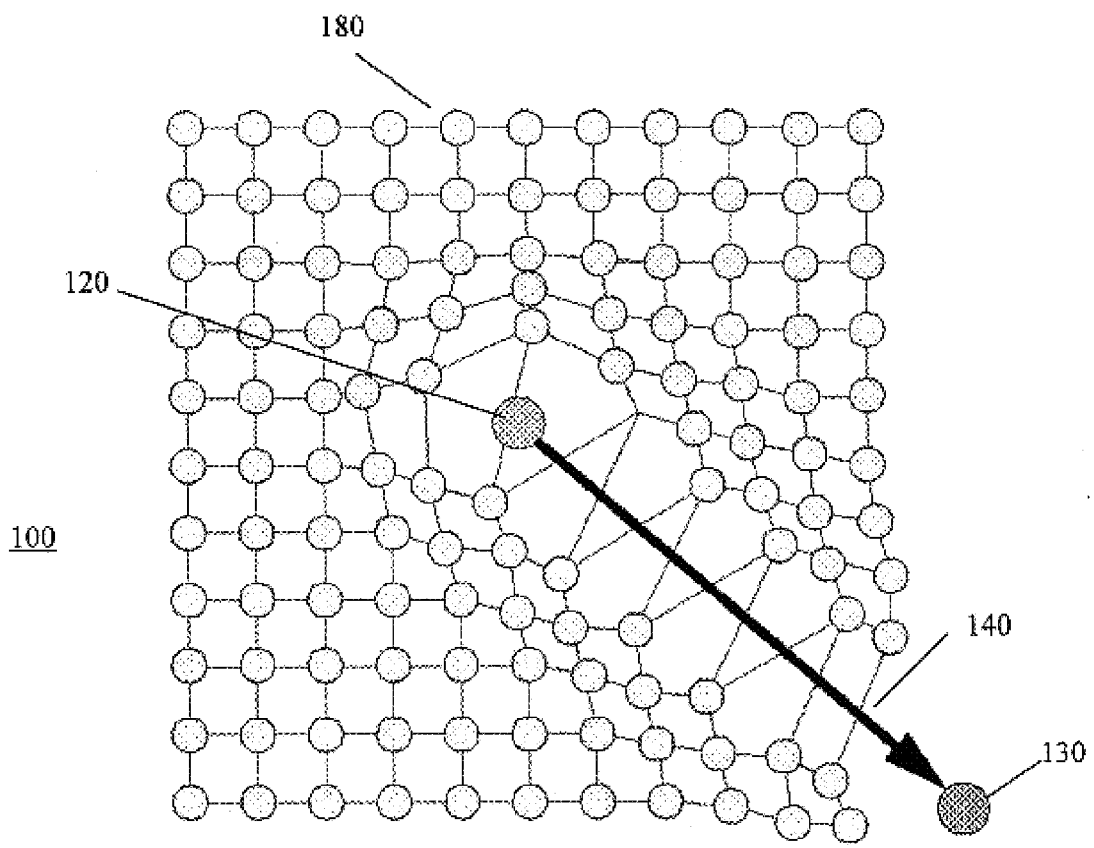

Referring to FIG. 1(c) there is shown the final configuration 180 resulting from the application of the transformation function to the layout 110. In this final configuration 180, a clear line of sight from the VP 130 to the OOI 120 is established. In the following, and as mentioned above, functions or operators such as this will be referred to as Occlusion Reducing Transformations of the visual representation, or ORTs.

The effect of an ORT is to provide a clear line of sight, or visual access, to an object or region of interest within a 3D visual representation by adjusting the layout. The application of multiple ORTs may be composed on a representation by combining the effects of the individual ORTs on the elements of the representation.

Let the sight-line of an ORT be defined as the "source" of the function. Other definitions of the source are possible as will be discussed below. The source of the ORT is the location which elements of the representation will move away from as the ORT is applied. If there are a series of ORT operators, say 0 . . . n, then a weighted average of the effect of each ORTi can be employed where the influence another ORTj (j N.E. i) on a point decreases as the distance of the point to the source of ORTi decreases. This means that for points where this distance is 0 the influence of the other ORTj is also 0. Since the OOI for ORTI defines one end of the sight-line, it will be at distance 0 from the source of ORTi. A simple average of the effect of each ORTi on an element, for all i=0 . . . n, may also be employed as illustrated in FIGS. 2 through 4.

Figure 2A:
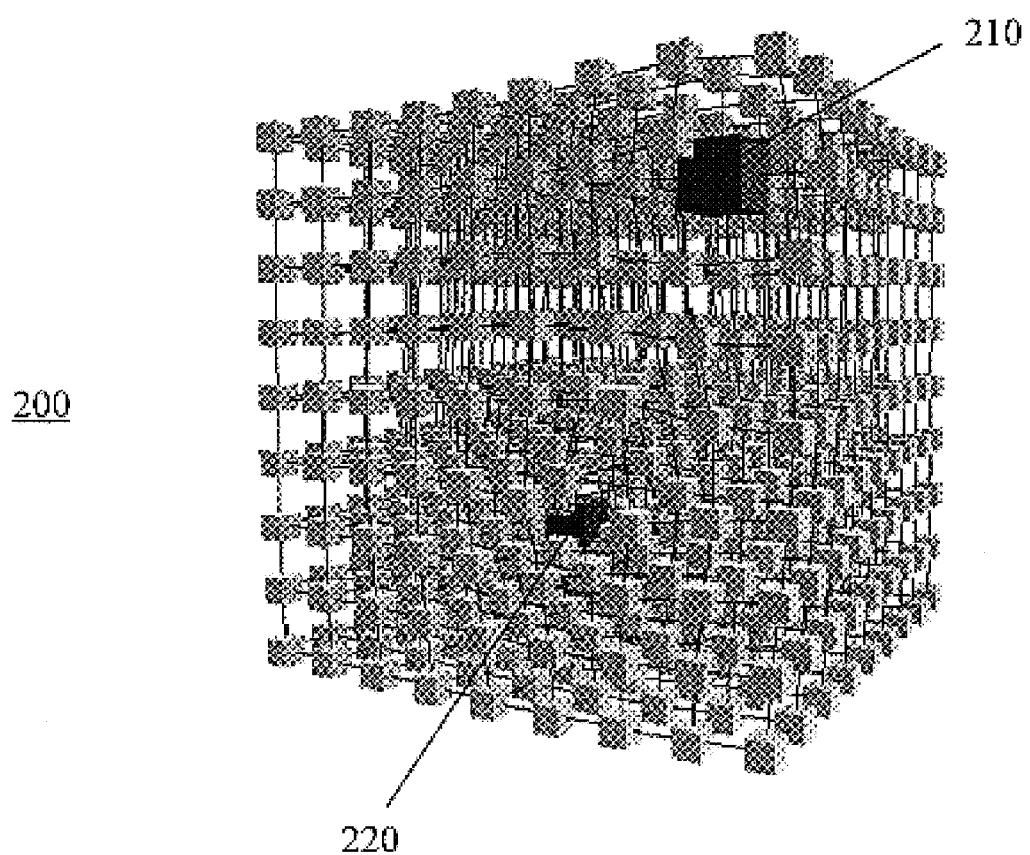
FIG. 2 is a sequence of perspective views illustrating the progressive, simultaneous application of two occlusion reducing transformations to 3D graph in accordance with the preferred embodiment.
Figure 2B:
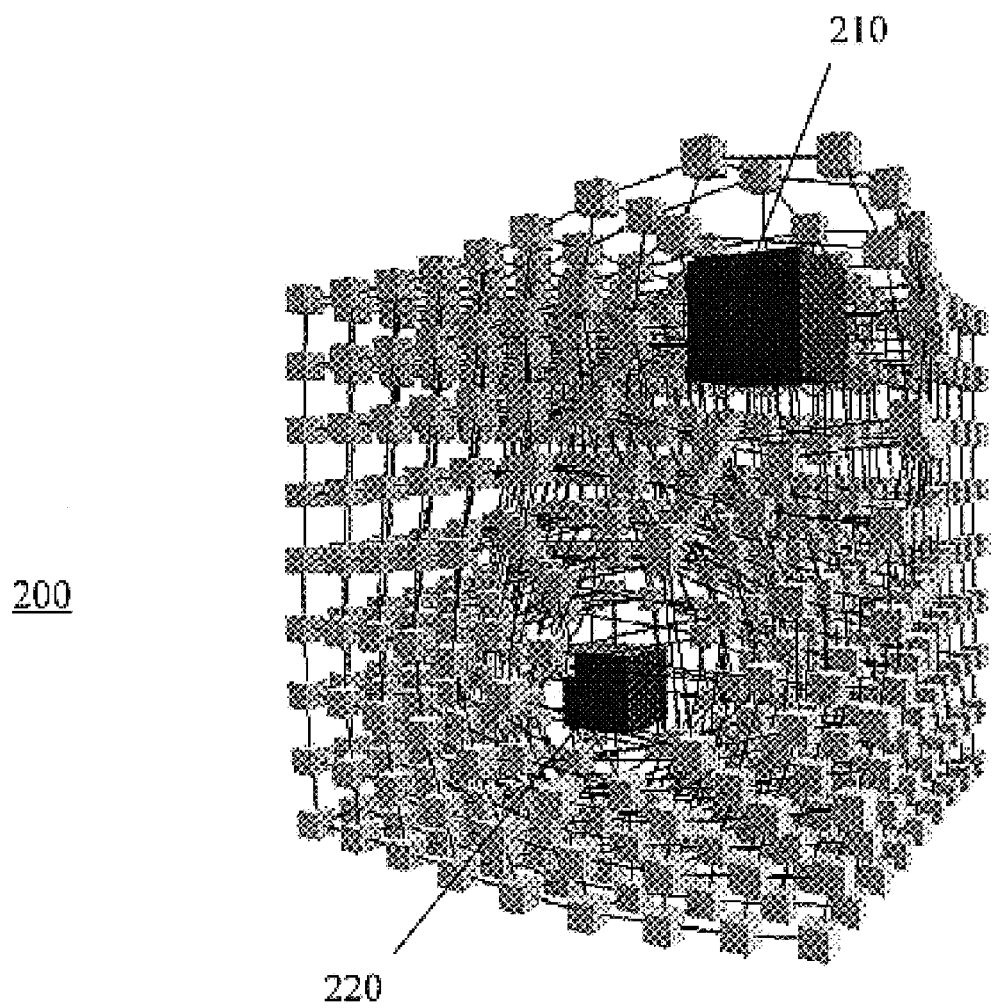
Figure 2C:
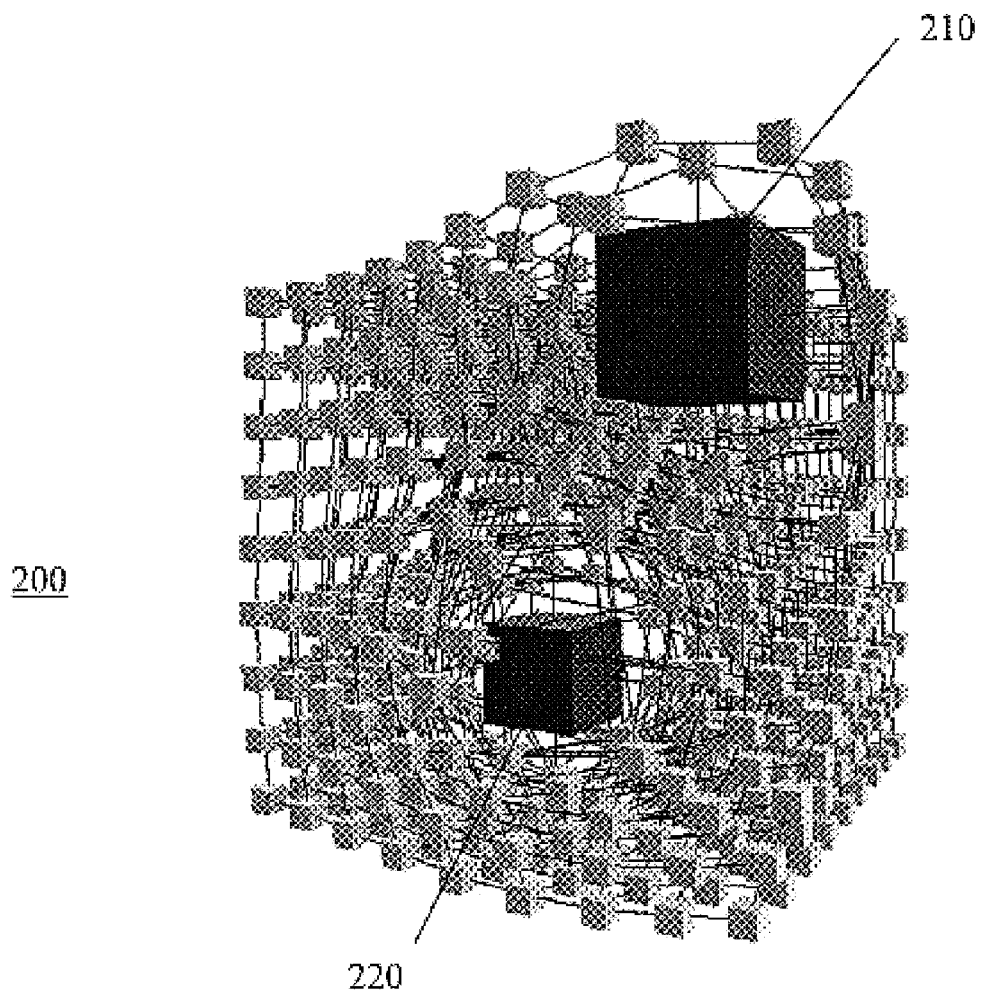

Referring to FIG. 2, there are shown perspective views 200 illustrating the progressive, simultaneous application of two ORTs to a 3D graph. This application reveals two OOIs, one near the front of the layout 210, the second 220 nearly at the back (as seen from the current viewpoint). The progression sequence is from FIG. 2(a) through to FIG. 2(c). Because the viewpoint is an integral component in its construction, the ORT remains oriented properly and continues to provide occlusion reduction as the viewpoint is moved.

Figure 3A:
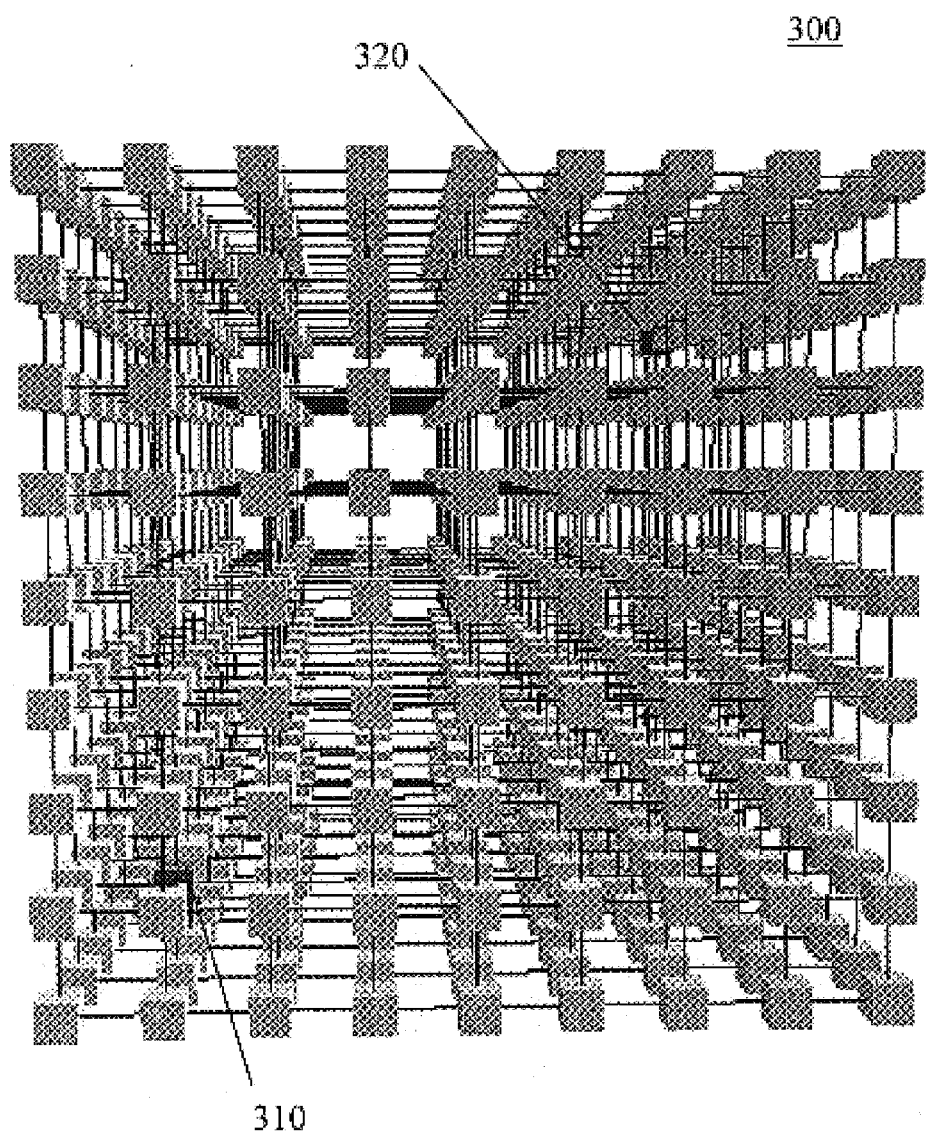
FIG. 3 is a sequence of perspective views illustrating the rotation of a 3D graph without the application of occlusion reducing transformations in accordance with the preferred embodiment.
Figure 3B:
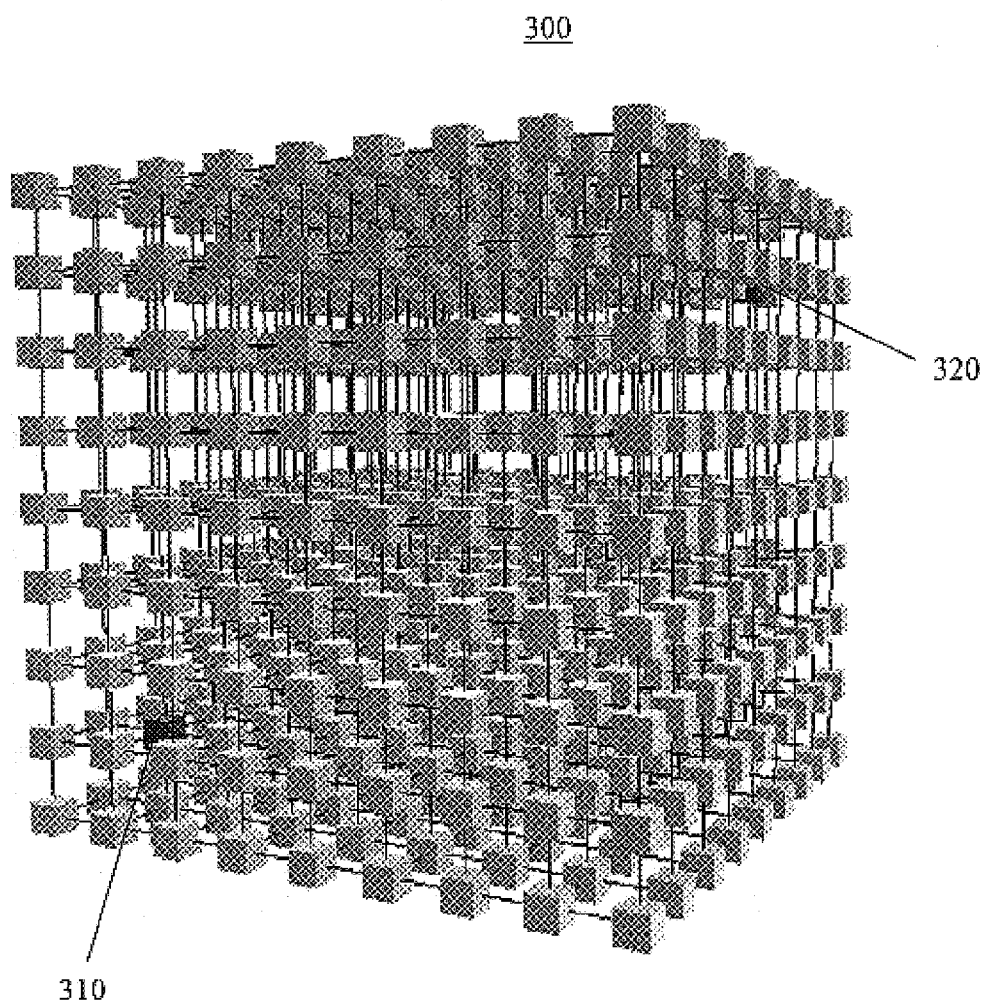
Figure 3C:
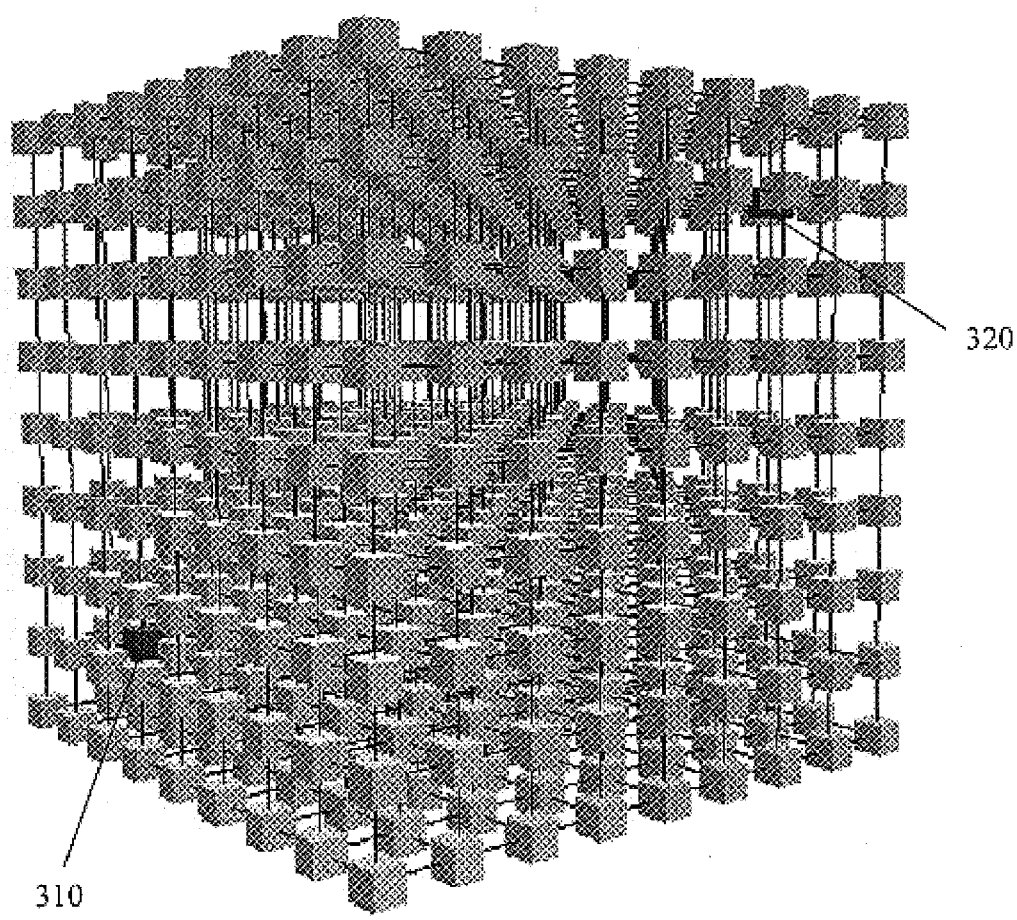

Referring to FIG. 3, there are shown perspective views 300 illustrating the rotation of a 3D graph without the application of ORTs. The rotation sequence is from FIG. 3(a) through to FIG. 3(c). The rotation is made in a effort to reveal the two OOIs 310, 320 without the application of ORTs. It can be seen that a clear view of even the nearer 310 of the two OOIs in the structure is available from only a limited range of VPs.

Figure 4A:
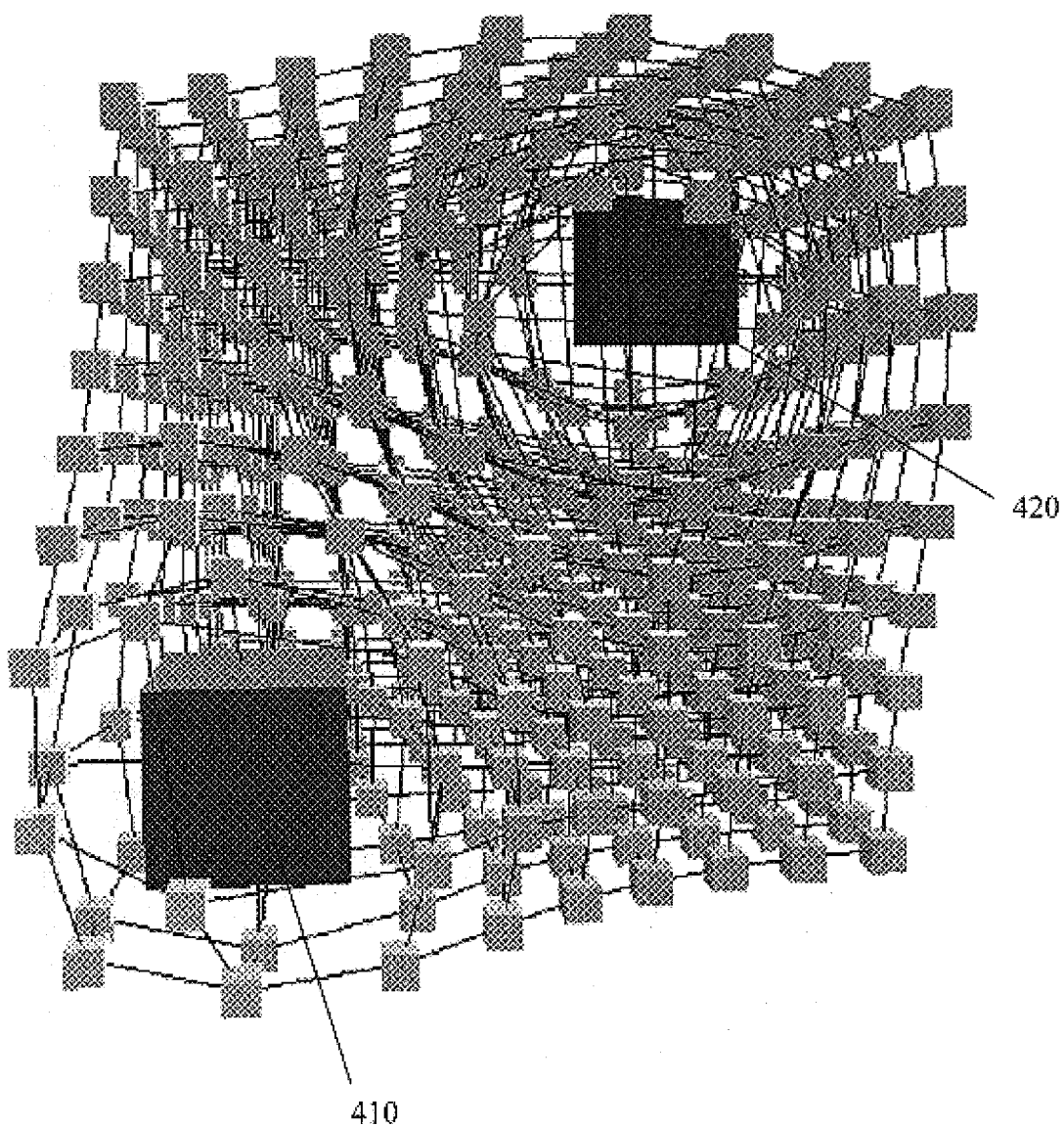
FIG. 4 is a sequence of perspective views illustrating the rotation of a 3D graph with occlusion reducing transformations in place in accordance with the preferred embodiment.
Figure 4B:
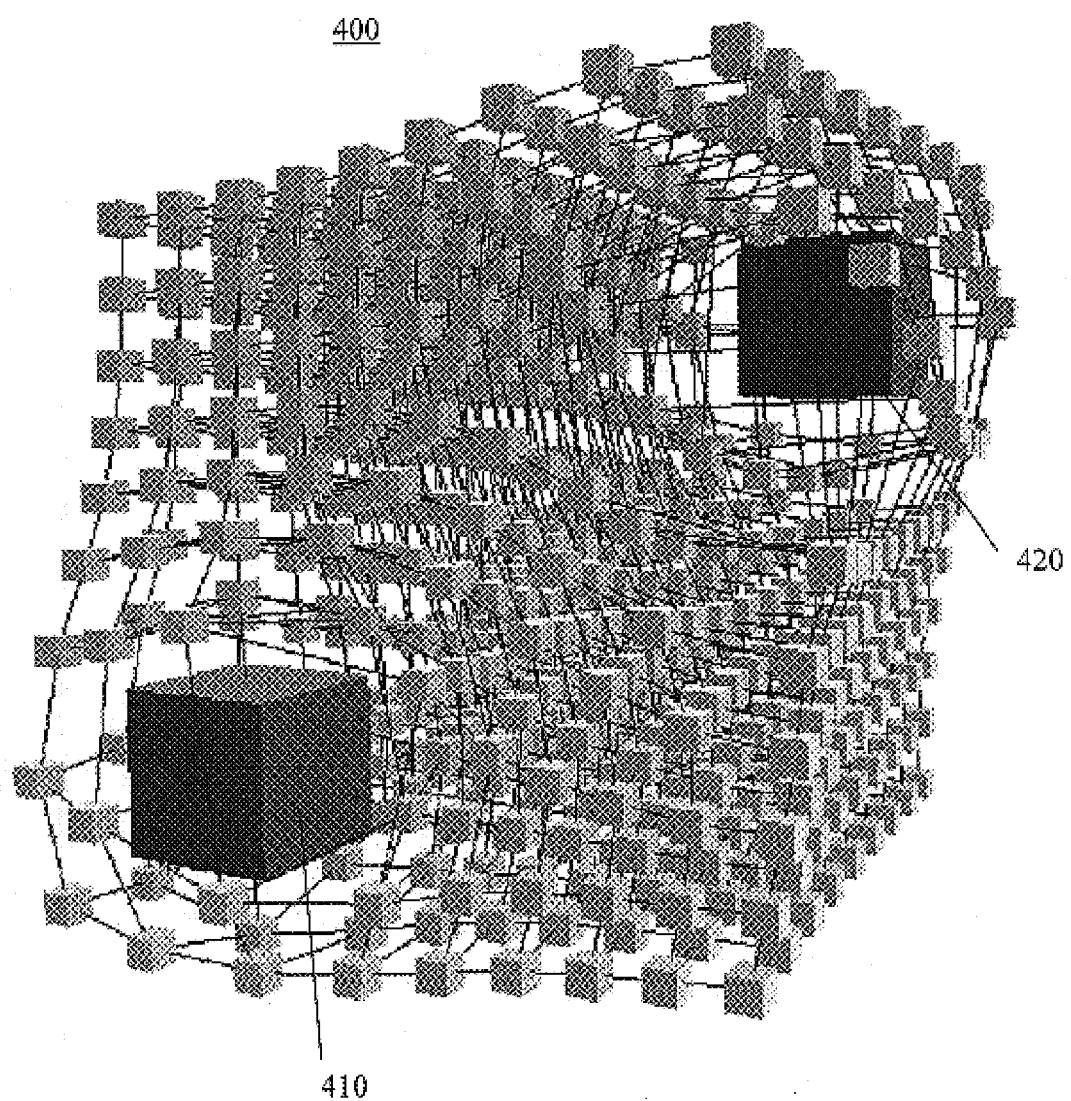
Figure 4E:
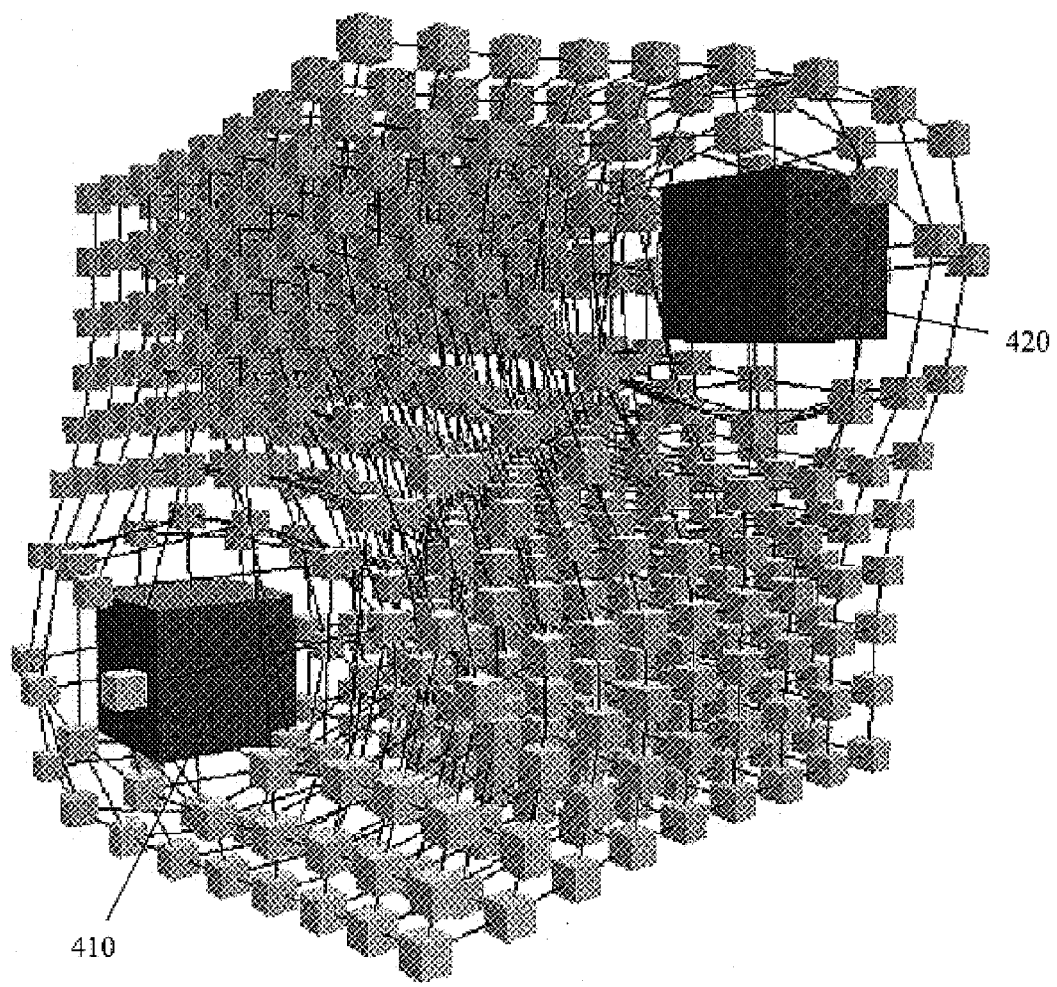

Referring to FIG. 4, there are shown perspective views 400 illustrating the rotation of a 3D graph with ORTs in place. The rotation sequence is from FIG. 4(a) through to FIG. 4(c) and is the same sequence as shown in FIG. 3. The OOIs 410, 420 have been increased in scale for emphasis. With the application of the ORTs, even the OOI 420 at the far side of the graph is visible through the sight-line clearing effect of the ORT.

Figure 5:
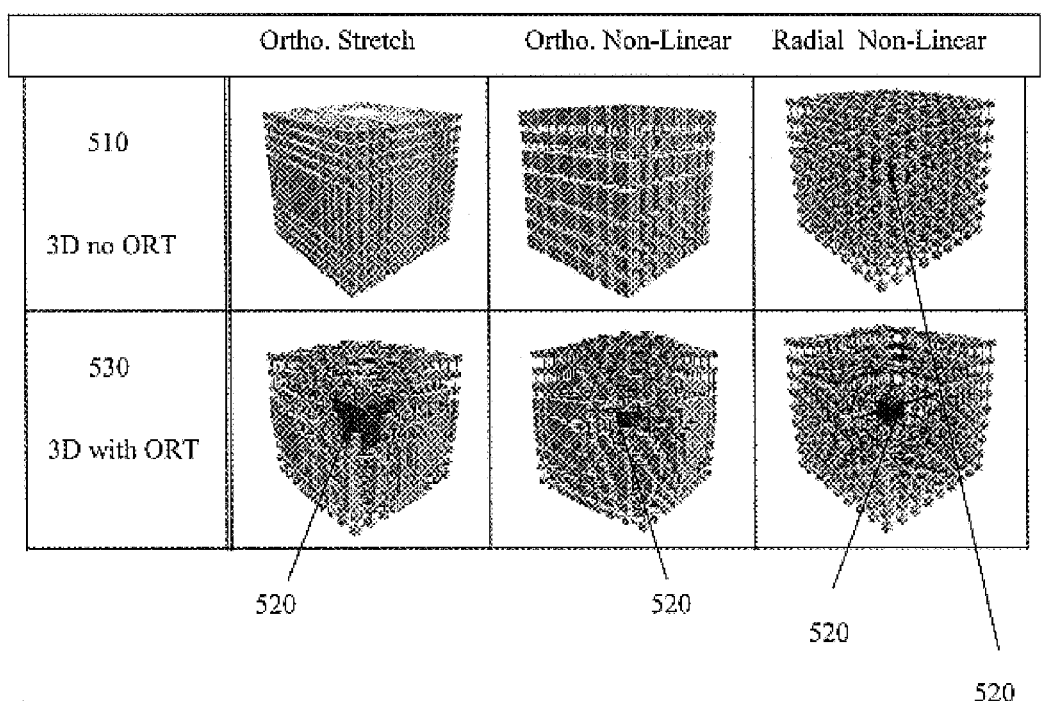
FIG. 5 is a table containing perspective views illustrating the effect of adding an occlusion reducing transformation to the 3D extensions of common 2D layout adjustment or distortion schemes for detail-in-context viewing including orthogonal stretch, orthogonal non-linear, and radial non-linear schemes in accordance with the preferred embodiment.

Referring to FIG. 5, there is shown a table 500 containing perspective views illustrating the effect of adding an ORT to the 3D extensions of common 2D layout adjustment or distortion schemes for detail-in-context viewing including orthogonal stretch, orthogonal non-linear, and radial non-linear schemes. The first row 510 of table 500 shows the simple extension of 2D distortions To 3D. In can be observed that in most cases the OOI 520 or focal point is even more occluded than before the layout adjustment or distortion. The second row 530 of table 500 adds the operation of an ORT to clear the line of sight from the VP the OOI 520 or focal point. Visual access is now provided to the previously occluded OOI 520.

ORT-Relative Coordinate Systems. The sight-line is the simplest primitive that can be employed to produce an effective ORT. Likewise the nearest-point measurement in Euclidean space is the simplest distance measurement. In order to facilitate the description of a wider range of ORT operators, a local coordinate system ("CS") for each ORT can be constructed. The creation of a local ORT coordinate system requires two vectors and a point in three dimensions from which the position and orientation of the ORT CS relative to the world CS can be derived.

Now, call the location of the OOI associated with an ORT the focal point ("FP"). This end of the sight-line will be used as the location of the origin of the ORT CS. The direction from the FP to the VP will form one of the two vectors needed in order to orient the ORT CS. For the second vector, the UP vector in the viewer, camera, or VP coordinate system will be used. Typically this direction is positive y, <0, 1, 0> or "up" in the world CS. In order for the ORT CS to be properly defined, the vectors VP-FP and UP must not be parallel.

With these elements a coordinate system that is centered on the FP, with the positive z-axis oriented towards the VP, can be constructed. By this construction the x=0 plane of the ORT CS contains the UP vector from the World CS. A rotation of the ORT CS around the sight-line is a simple matter of rotating the UP vector around the VP-PP vector in the world CS and using this rotated vector in the construction of the ORT CS.

Figure 6:
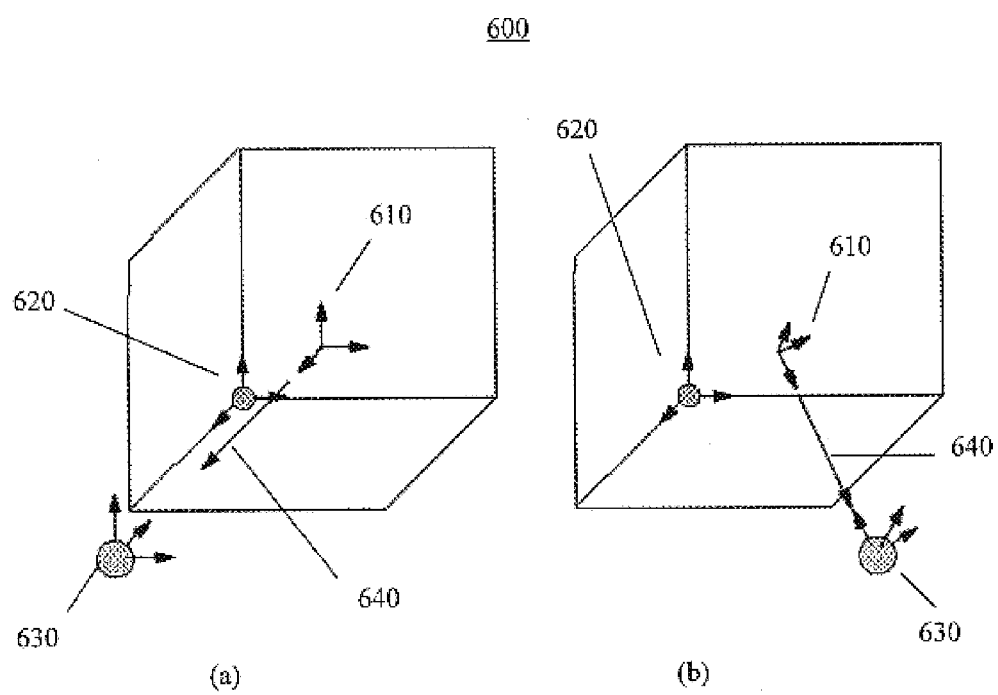
FIG. 6 is a sequence of diagrams illustrating two alignments of the occlusion reducing transformation coordinate system, the world coordinate system, and the viewpoint coordinate system in accordance with the preferred embodiment.

Referring to PIG. 6, there are shown diagrams 600 illustrating two alignments of the ORT CS, World CS, and VP CS. In FIG. 6(*a*), the z-axis of the ORT CS 610 is aligned with the z-axis of the World CS 620. In FIG. 6(*b*), the VP CS 630 has been moved to the right and the ORT CS 610 has been re-oriented to track the change. Note that the line of sight 640 links the ORT CS 610 and the VP CS 630 in both cases.

Distortion Space. In order to determine the effect of an ORT on a layout, each point p, (x, y, z), is transformed into the ORT CS via an affine transformation. This yields a new coordinate p', (x', y', z') in the ORT CS. If the value of z' is greater than zero, then the point is somewhere between the OOI (or FP) and the VP. In this case the distance is measured in the xy plane of the ORT CS only, which measures the distance of the point to the sight-line. If the value of z' is less than zero, then the point is further away from the viewpoint than the OOI.

The advantage of the ORT CS is that the description of more complex distributions of ORTs is greatly simplified. Any transformation that will produce a reduction of the element density along the positive z-axis of the ORT CS will achieve the desired result of occlusion reduction.

Referring back to FIG. 1, the distribution of displacements illustrated can be characterized as having a linear-source with truncation. This ORT operates relative to sight-line 140, the z-axis in the ORT CS, and its distribution is truncated on the far side of the OOI 120 from the VP 130. This produces a cylindrical region of effect 190 where the far end of the cylinder from the VP 130 blends into a hemi-spherical cap 195 around the OOI 120.

In addition to such a linear-source function, an ORT that is derived relative to either the y=0 or x=0 plane of the ORT CS can also be described. Each of these planes contains the z-axis of the ORT and therefore displacements of points away from these planes will reduce occlusion along the sight-line as well as across the plane.

Figure 7:
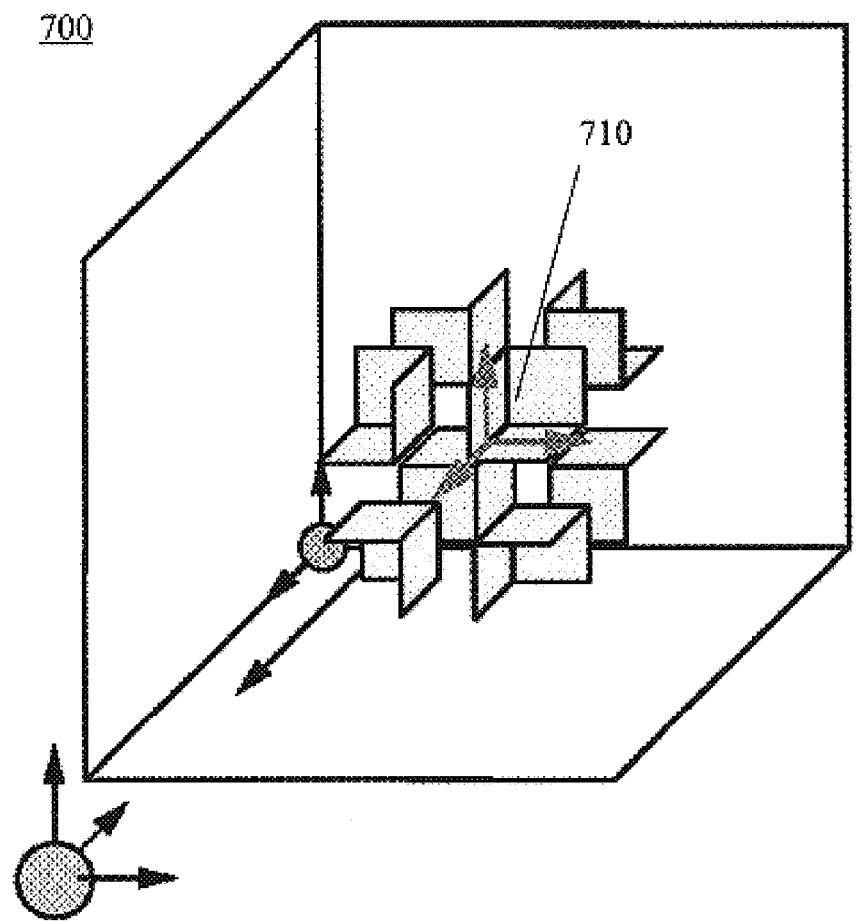
FIG. 7 is a diagram illustrating the various planes of the occlusion reducing transformation coordinate system in accordance with the preferred embodiment.

It is also possible to apply a transformation relative to all of the cardinal axes or planes of the ORT CS in the same manner as they may have been constructed relative to the cardinal axes of the World CS. If defined relative to the ORT CS the deformations will remain aligned to the VP. Referring to FIG. 7, there is shown a diagram 700 illustrating the various planes of the ORT CS. Here, distance of points is measured to the nearest of the three planes passing through the FP 710.

Figure 8:
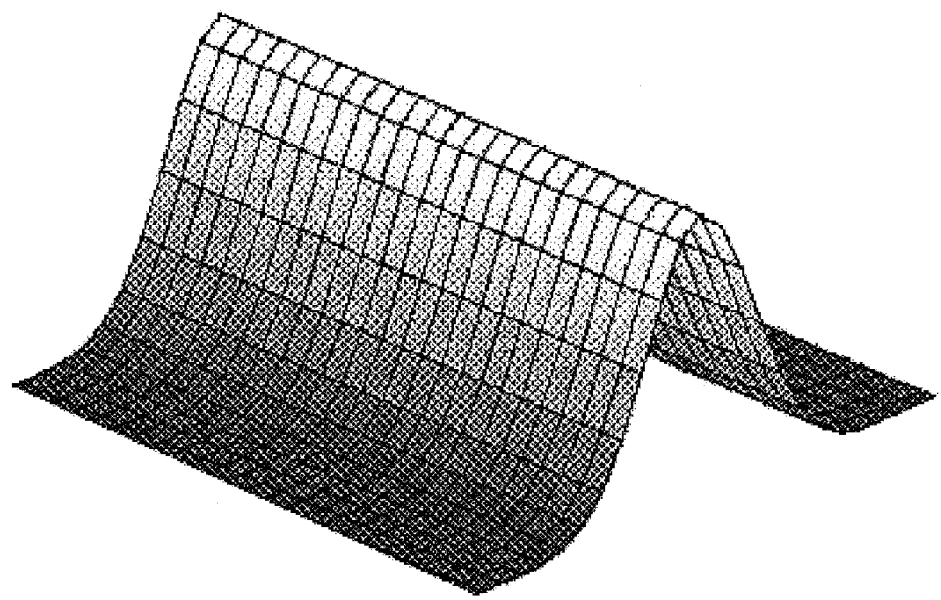
FIG. 8 is a diagram illustrating a Gaussian basis function extruded in z in accordance with the preferred embodiment.
Figure 9:
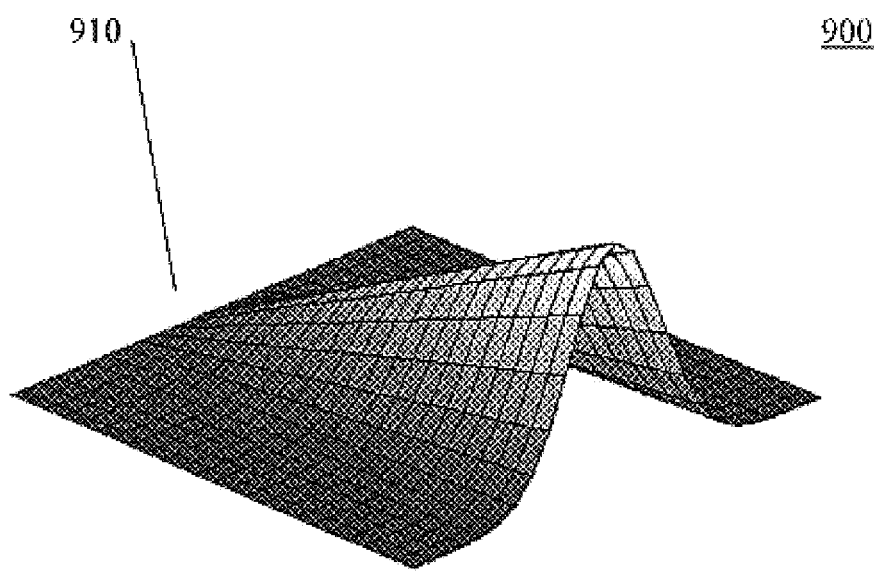
FIG. 9 is a diagram illustrating the Gaussian basis function of FIG. 8 wherein the degree of the function has been scaled to zero at the far end of the space in accordance with the preferred embodiment.

Truncating the distribution at the z=0 plane is only one possible distribution of displacement through the depth of the ORT CS. It is also possible to continue with the constant application of the ORT along the z-axis of the ORT CS, or linearly scale the application of the ORT so that it falls from it's maximum at the near side of the information layout to zero at the origin of the ORT CS, or at the back of the information layout. Referring to FIG. 8, there is shown a diagram 800 illustrating a Gaussian basis function extruded in z. The function illustrated can be used for a detail-in-context adjustment scheme and is given by the equation $f(x)=e^{\wedge}(-10.0*x^{\wedge}2)$. The function $f(x)$ may be referred to as a detail-n-context distortion basis function. Referring to FIG. 9, there is shown a diagram 900 illustrating the Gaussian basis function of FIG. 8 wherein the degree of the function has been scaled to zero at the far end of the space 910.

Figure 10:
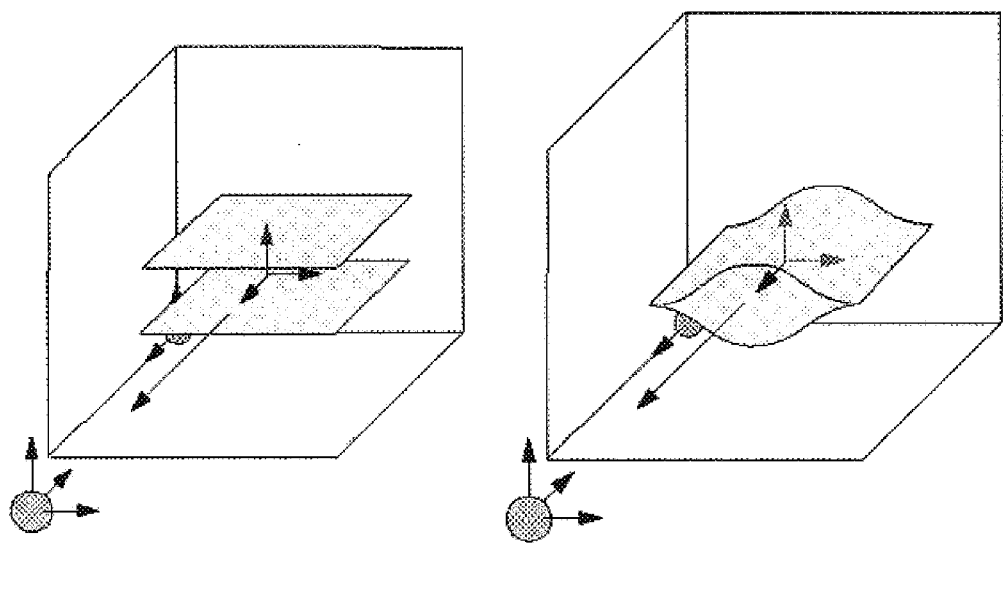
FIG. 10 is a sequence of diagrams illustrating the effect of a Gaussian shaping function on an occlusion reducing transformation defined relative to the y=0 plane in accordance with the preferred embodiment.

If the ORT is defined as having a plane source, then elements of the representation will be pushed away from this plane by the action of the ORT. In this case the distribution of the ORT function across the plane, perpendicular to Me z-axis of the ORT CS, may also be modified by a shaping function. This function controls the degree of application of the ORT in order to spatially constrain the transformation and thereby preserve more of the original layout. These shaping functions may be any curve that modulates the degree of the ORT from a weight of 0, no effect, to 1, the original effect without the shaping function. Referring to FIG. 10, there is shown a diagram 1000 illustrating the effect of a Gaussian shaping function on an ORT defined relative to the y=0 plane. In FIG. 10(*a*), the original plane-relative ORT is illustrated. In FIG. 10(*b*), a secondary shaping function is applied to the horizontal plane-relative ORT. Here, scaling in z is constant but the addition of the shaping curve can be used to constrain the extent of the plane-relative function in x. Note that the extent in width of the shaping function may be adjusted independent of the degree of the ORT.

As with the use of alternative distance metrics to achieve different distributions of layout adjustment in 2D to 2D transformations, measurement of distance according to different metrics in 3D may be applied with a similar effect. For example, distance may be measured with an Lp rather tan with a Euclidean distance metric. The conversion of a 3D point to measurement with the Lp metric is given by the following equation:

$$dLp(x,y,z)=[((ABS(x))^{\wedge}p+(ABS(y))^{\wedge}p+(ABS(z))^{\wedge}p]^{\wedge}(1/p)$$

Figure 11:
FIG. 11 is a sequence of diagrams illustrating distance measurement according to the Lp metric in 3D for varying values of p in accordance with the preferred embodiment.
Figure 11:
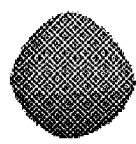
Figure 11:
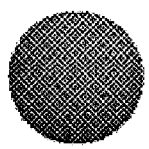
Figure 11:
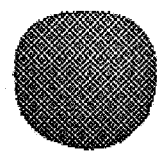
Figure 11:
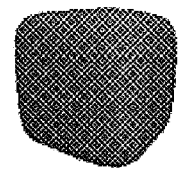

If the profile of the ORT is computed with an Lp distance metric where p=1, then the ORT will have a diamond-shaped rather than round appearance. Increasing the value of the parameter p well beyond 2 will shape the opening in a progressively more squared-off manner. Referring to FIG. 11, there are shown diagrams 1100 illustrating distance measurement according to the Lp metric in 3D for varying values of p. Note that the Lp metric reduces to the Euclidean metric for p=2.

The use of a Super-Quadric distance metric for modeling with implicit surfaces was explored by Tigges, et al. in *Generalized Distance Metrics for Implicit Surface Modeling* (Tigges, Mark, M. S. T. Carpendale, and Brian Wyvill, *Generalized Distance Metrics for Implicit Surface Modeling*, in *Proceedings of the Tenth Western Computer Graphics Symposium*, March 1999) which is incorporated herein by reference. The conversion of Euclidean distance to Super-Quadric distance is given by the following equation:

$$dsq(x,y,z)=[(ABS(x/a))^{(2/ew)}+(ABS(y/b))^{(2/ew)}]^{(ew/ns)}+[ABS(z/c)]^{(2/ns)}$$

Figure 12:
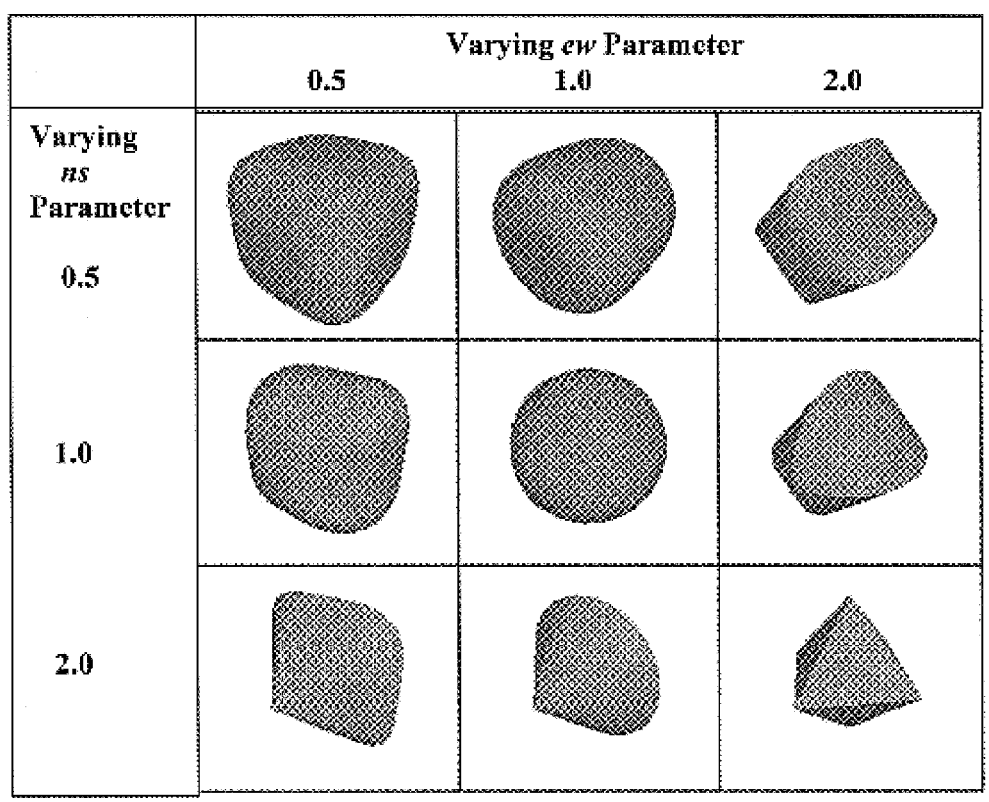
FIG. 12 is a table containing diagrams illustrating the effects of varying the ew and ns parameters of the super-quadratic distance metric on the metric space in accordance with the preferred embodiment.

Here, the ew and ns parameters control the shape of the space. In determining distance from a source, varying these parameters provides independent control of the front-to-back and cross-sectional profile of the shape of the basic OPT function. Referring to FIG. 12, there is shown a table 1200 illustrating the effects of varying the ew and ns parameters on the metric space. In can be seen that the Super-Quadratic distance metric allows separate specifications of the ns and ew shaping parameters to achieve a wide range of possible metric spaces. Note that the Super-Quadratic metric reduces to the Euclidean metric for ew=ns=2.

To summarize, in the description of an ORT operator we may define the basis function for the transformation (i.e. the detail-in-context distortion basis function), the source of the function, the pro-file of the ORT function along the z axis of the ORT CS, the application of a shaping curve for plane-relative ORTs, and the distance metric. These parameters are listed in Table 1 below.

TABLE 1

| Parameter | Possible Values |
| --- | --- |
| basis | linear, gaussian, inverse hemisphere, hemisphere, cosine, user-defined $0 \leq f(x) \leq 1$ |
| source | linear, planar (horizontal, vertical or rotated by α degrees), cardinal axes, principle planes |
| z distribution | constant, truncated, linear, short linear |
| shaping curve | constant, gaussian, linear, etc. varying (0 . . . 1) |
| distance metric | Euclidean, Lp (p), Super-Quadric (ns, ew) |

Figure 13:
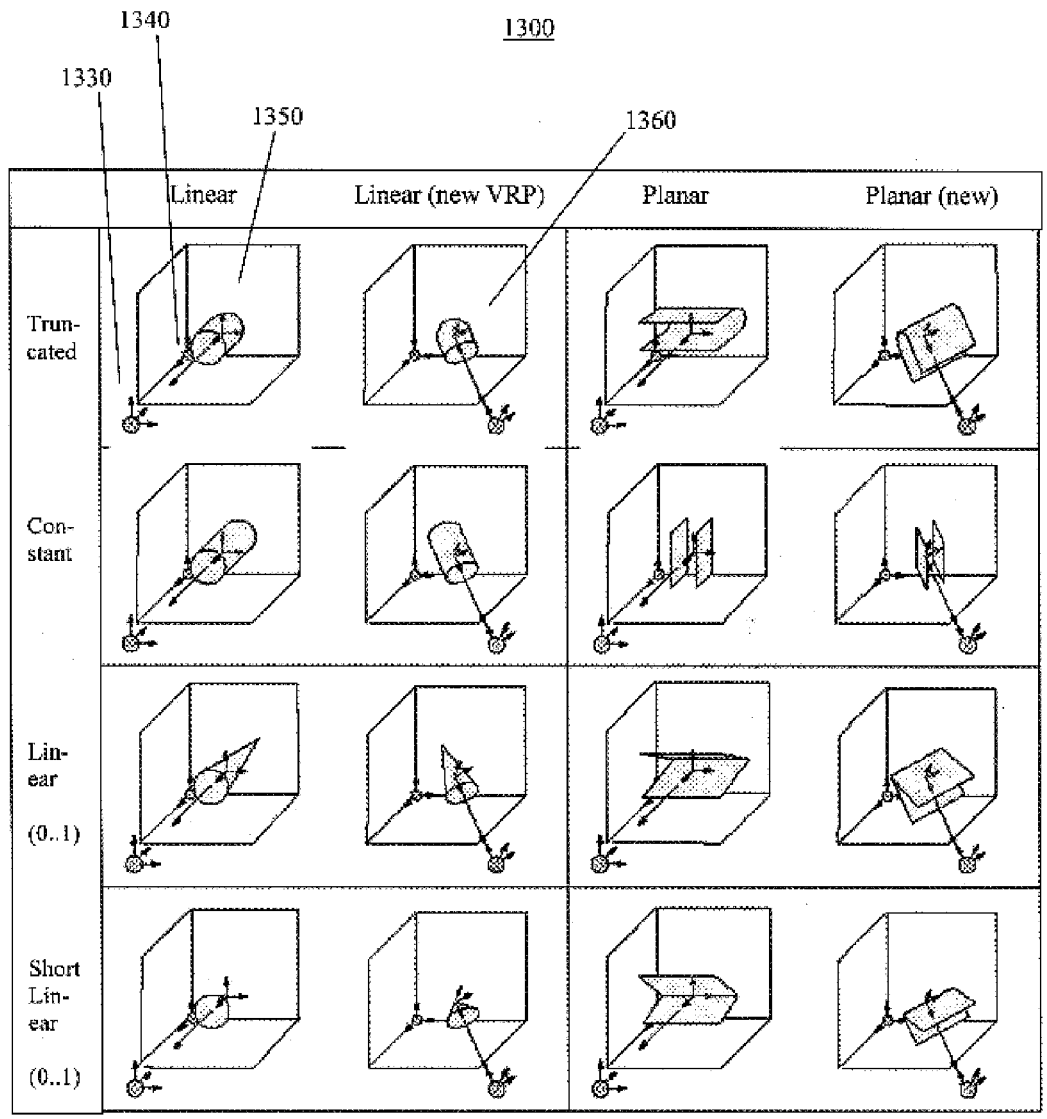
FIG. 13 is a table containing simplified perspective schematic diagrams illustrating the range of occlusion reducing transformation descriptions which are possible through varying different occlusion reducing transformation parameters in accordance with the preferred embodiment.

Referring to FIG. 13, there is shown a table 1300 containing simplified perspective schematic diagrams illustrating the range of ORT descriptions which are possible trough varying the parameters listed in Table 1. In FIG. 13, the World CS 1340 and the VP CS 1330 are indicated by triples of arrows. Two orientations 1350, 1360 of the VP CS and ORT CS are displayed in the World CS for each combination of function source and distribution. The z-axes of the ORT CS and World CS are parallel on the left of each image 1350 and an oblique viewpoint is shown on the right 1360. The left column 1310 of the table 1300 illustrates ORT operators relative to a linear source (i.e. z-axes of the ORT CS) and the right column 1320 illustrates ORTs defined relative to the y=0 or x=0 planes of the ORT CS.

Method Steps. To reiterate and expand, the method of the present invention is based on the detailed extension and application to 3D data of detail-in-context and related perspective viewing techniques for 2D data. The present invention introduces a method based on Occlusion Reducing Transformations (ORTs) which improve the visibility of key regions or objects of interest (OOIs) within a 3D data representation by appropriate displacement of occluding objects. The present invention enables both occlusion reduction and the generation of 3D detail-in-context presentations which show key details in complex data sets. It is an advantage of the present invention that the spatial extent of the rearrangement of the original 3D structure is limited so as to keep the final arrangement of objects as similar as possible to the original "mental model" of the data that the user is familiar with. It is another advantage of the present invention that objects other than the OOI can be removed from the line of sight without removing information from view.

With respect to the method of the present invention, it is not adequate to directly extend or apply the ideas for 2D detail-in-context via perspective projection into 3D since no occlusion resolution will result. Refer again to FIG. 1. This problem is overcome by the present invention as through its method objects are displaced in directions normal to the line of sight (defined as the line from the OOI to the VP) rather than towards the viewpoint (as in EPS technology) with the magnitude of these displacements increasing inversely with the Euclidean distance (or with another distance metric). In FIG. 1, the "focus" or "source" of the distortion is a line 140 rather than a point. A plane parallel to the sight-line rather than the sight-line itself may also be used as the source of the ORT. In this case, occlusion-reducing displacements are performed based on distance from the plane. Moreover, this sight-line source for displacement can be extended to multiple, simultaneous lines of sight and multiple OOIs as shown in FIG. 2. In this case, multiple ORTs are applied, one per OOI.

It is a further advantage of the present invention that distortion distribution functions (i.e. a form of "shaping" function) may be applied to an ORT based on, for example, the distance from the VP along the sight-line. Shaping functions provide additional control of the extent of point displacements and can be used to maintain the visibility of data beyond the OOI. For example, without the application of such a distribution function, the OOI is generally isolated from all other data such that it appears against an empty background, but surrounded by the remaining data. This effect can be desirable as a way of highlighting the OOI. Where this highlighting is not desired, the distribution function provides a means of truncating the distortion at the OOI to maintain visibility of the background data. As illustrated in FIG. 10, shaping functions may be applied to truncate the extent of a planar displacement source. Possible ORTs for planar and linear source cases are illustrated in FIG. 13. And, as indicated in Table 1 above, an ORT can be completely described by a basis function for transformation, the source of this function, the profile of the ORT function along the z-axis of the VP CS, a shaping curve for plane-relative ORTs, and a distance metric.

Figure 15:
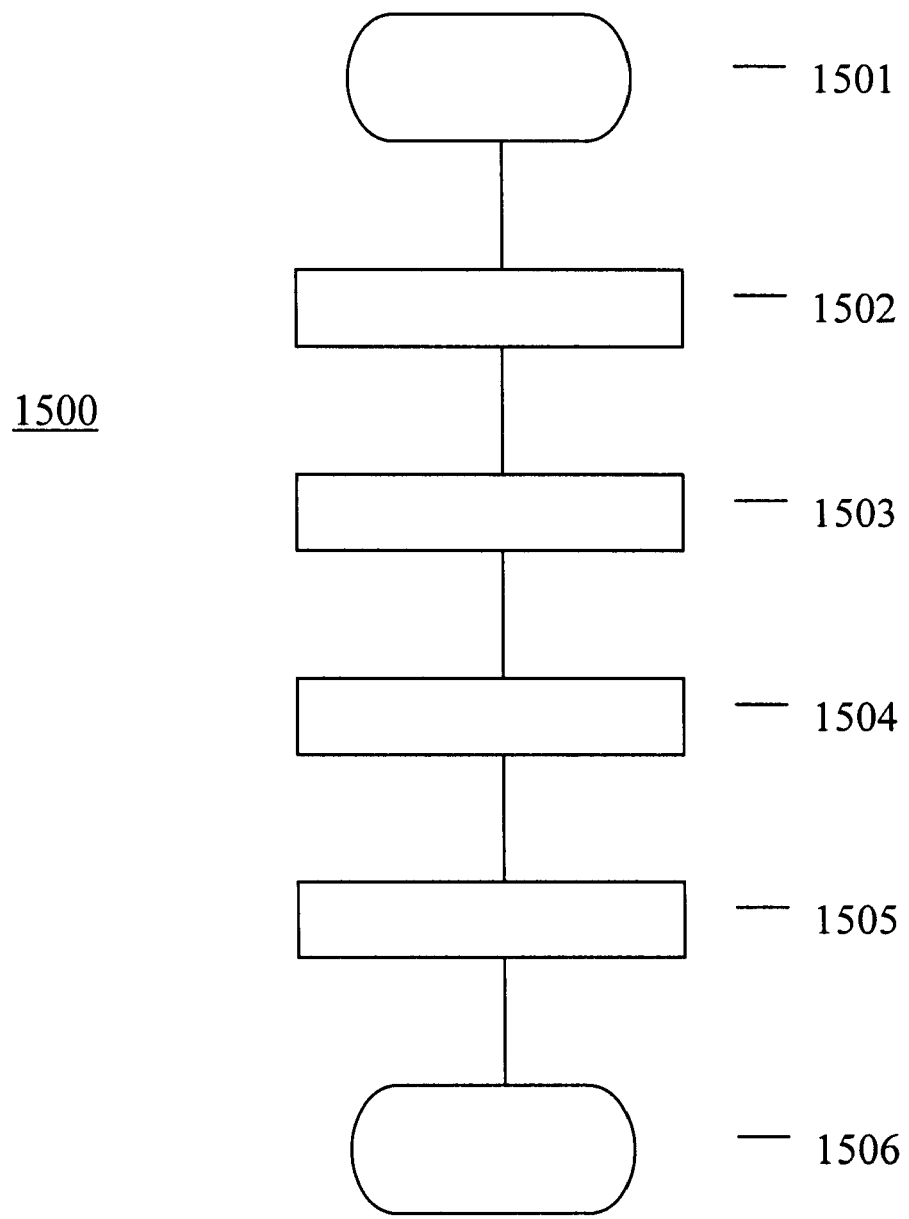
FIG. 15 is a flow chart illustrating a method for occlusion reduction in accordance with the preferred embodiment.

Referring to FIG. 15, there is shown a flow chart 1500 illustrating a general method for occlusion reduction according to one embodiment of the invention. At step 1501, the method starts. At step 1502, an object-of-interest or point in a three-dimensional data representation is selected. At step 1503, a viewpoint with respect to the object-of-interest is selected. At step 1504, a source or path between the viewpoint and the object-of-interest is selected. At step 1505, objects on or near the source are displaced away from the source such that occlusion of the object-of-interest is avoided or reduced when the object-of-interest is viewed from the viewpoint. This step of displacing can include the following for each of the displaced objects: calculation of a direction vector between the object and the nearest point on the source; calculation of the magnitude of the direction vector, calculation of a displacement vector having the same direction as the direction vector and having a magnitude based on the magnitude of the direction vector and given by a transformation function; and, displacement of the object in the direction of the displacement vector a distance given by the magnitude of the displacement vector. At step 1506, the method ends.

Figure 16:
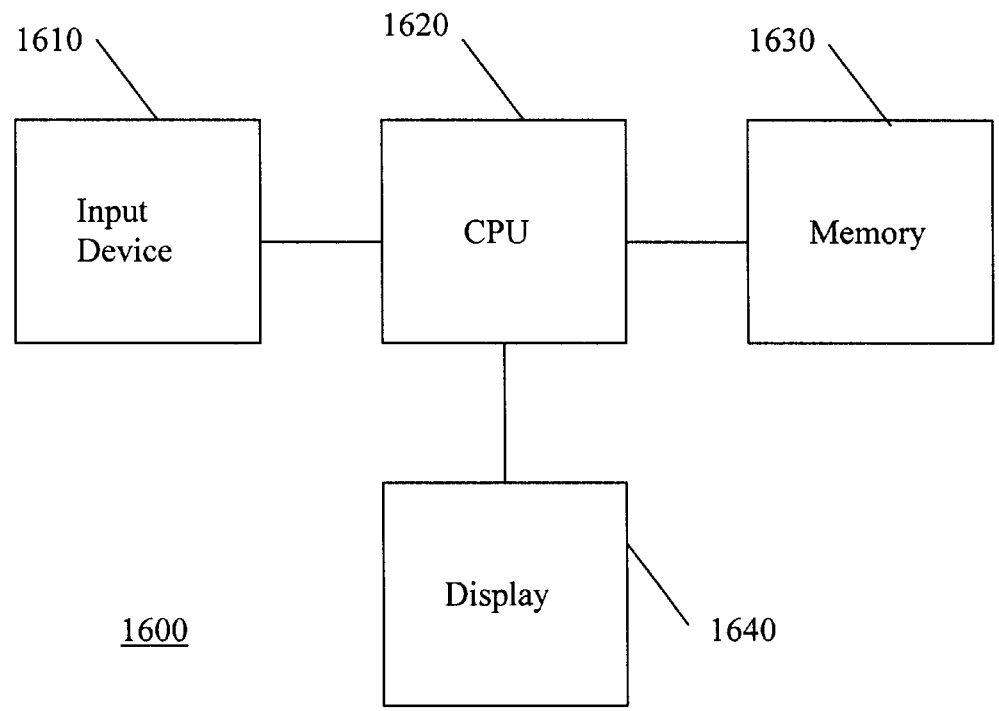
FIG. 16 is a block diagram illustrating an exemplary data processing system in accordance with the preferred embodiment.

System. Referring to FIG. 16, there is shown a block diagram of an exemplary data processing system 1600 for implementing an embodiment of the invention. The data processing system 1600 is suitable for occlusion avoidance and detail-in-context viewing of three-dimensional information representations. The data processing system 1600 includes an input device 1610, a central processing unit or CPU 1620, memory 1630, and a display 1640. The input device 1610 may be a keyboard, mouse, trackball, or similar device. The CPU 1620 may include dedicated coprocessors and memory devices. The memory 1630 may include RAM, ROM, databases, or disk devices. And, the display 1640 may include a computer screen or terminal device. The data processing system 1600 has stored therein data representing sequences of instructions which when executed cause the method described herein to be performed. Of course, the data processing system 1600 may contain additional software and hardware a description of which is not necessary for understanding the invention.

Computer Software Product. The sequences of instructions which when executed cause the method described herein to be performed by the exemplary data processing system of FIG. 16 can be contained in a computer software product according to one embodiment of the invention. This computer software product cam be loaded into and run by the exemplary data processing system of FIG. 16.

Integrated Circuit Product. The sequences of instructions which when executed cause the method described herein to be performed by the exemplary data processing system of FIG. 16 can be contained in an integrated circuit product including a coprocessor or memory according to one embodiment of the invention. This integrated circuit product can be installed in the exemplary data processing system of FIG. 16.

Figure 17:
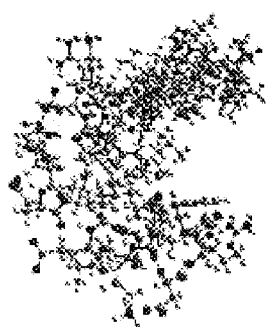
FIG. 17 is a sequence of diagrams illustrating three classes of 3D information representations in accordance with another embodiment.
Figure 17:
Figure 17:
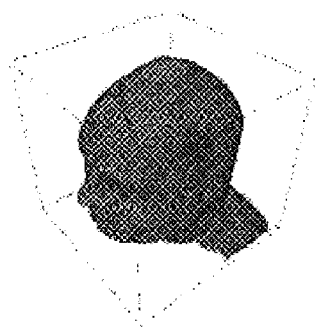

Applications. Having established a framework for the description of ORTs of information layouts in 3D, in the following example applications of these operators will be given for difference categories of representations. Three broad classes of 3D information representations may be defined: discrete, contiguous, and continuous. Referring to FIG. 17, there are shown diagrams 1700 illustrating each of these classes.

Discrete information layouts include node and edge structures or 3D scatter-plot layouts. These may be 3D graph layouts, or molecular models in the "ball and stick" format. Representations of this class are characterized as being spatially ordered where adjacency in the structure is illustrated by connections, such as edges, rather than physical adjacency of he components.

The second class, contiguous information representations, includes 3D models, finite element sets, CAD data, and so on. In these representations not only is spatial ordering important but so are the physical properties of adjacency and containment. Transformations of these representations involve consideration of these properties, as the translation of components through each other defeats the presentation of the objects as 3D physical models.

The last class, continuous information representations, includes representations of datasets that are essentially continuous in nature. That is, the data may be truly continuous, as the product of 3D parametric equations producing a volumetric function, or may be such finely discretized datasets as to appear continuous, such as volumetric medical imaging, geophysical, or fluid-dynamics data. These datasets are generally rendered with methods belonging to the field of volume rendering and present a specific challenge in dealing with their large sizes.

In the following, the application of ORTs to example representations belonging to each of these three broad classes will be described.

Discrete Data Representations. In some situations, discrete data representations are the class least susceptible to the effects of occlusion in a 3D layout. In relatively sparse representations the likelihood of data elements being arranged in such a manner so as to result in occlusion from any particular viewpoint is relatively low. However, there are a number of situations in which the likelihood of occlusion becomes an issue. Increasing the number of discrete data elements in a particular layout increases the likelihood that information elements will be laid out in such a manner as to cause an occlusion situation from any particular viewpoint. In addition, local density variations may cause clustering in regions even of smaller discrete layouts.

Figure 18:
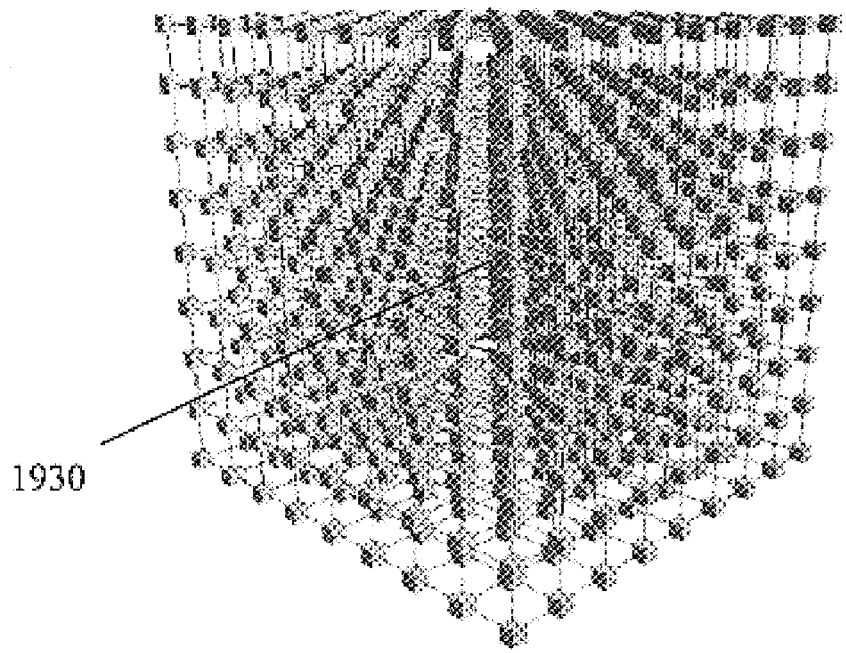
FIG. 18 is a diagram illustrating a 3D grid-graph in accordance with another embodiment.

Regular 3d Graphs Structures. In applying ORTs to discrete information layouts, a first example is a $9^3$ element 3D grid-graph Referring to FIG. 18, there is shown a diagram 1800 illustrating such a grid-graph. The regular spatial structure of this graph lends itself to illustrating the effect of layout adjustment, as well as providing a relatively dense, if uniform, distribution.

The 3D lattice graph in this application has simple connectivity relationships between nodes and their nearest neighbors in x, y and z. The edges of the graph are rendered to represent these relationships. The turntable metaphor to interaction of the viewer in this system may be applied and the viewpoint will normally be found outside the bounds of the graph. For a structure of $9^3$ nodes, a node in the center is likely to be occluded by nodes in 4 other layers regardless of the choice of viewpoint.

Figure 19:
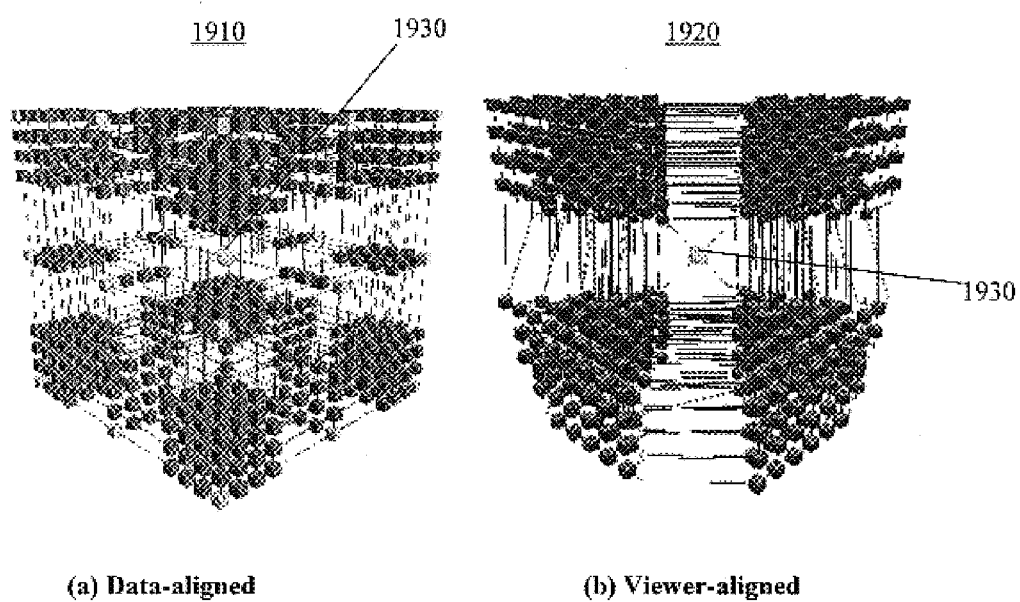
FIG. 19(a) is a diagram illustrating an orthogonal-stretch layout adjustment algorithm applied to the grid-graph of FIG. 18 in accordance with another embodiment.
FIG. 19(b) is a diagram illustrating the application of an orthogonal-stretch layout adjustment as an ORT operator which remains aligned to the viewpoint in accordance with another embodiment.
Figure 20:
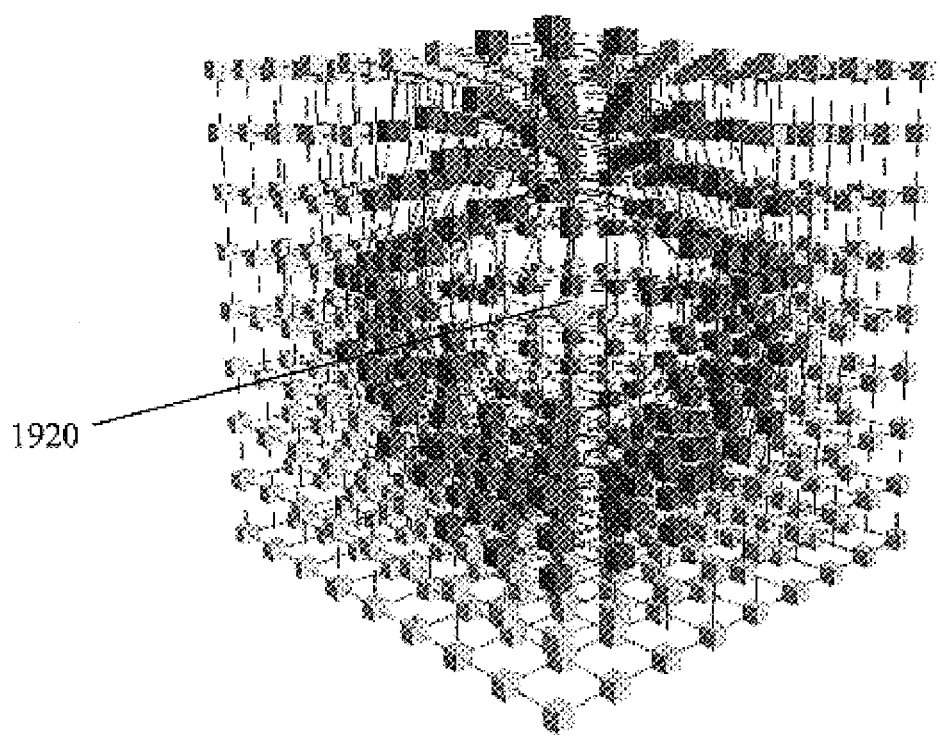
FIG. 20 is a diagram illustrating an ORT that is defined relative to the sight-line connecting an OOI to the VP in accordance with another embodiment.

As discussed above, a wide range of combinations of ORT function sources and distributions are possible. Referring to FIG. 19($a$), ere is shown a diagram 1910 illustrating an orthogonal-stretch layout adjustment algorithm applied to the $9^3$ graph of FIG. 18. The central node 1930 is the OOI. Referring to FIG. 19($b$), there is shown a diagram 1920 illustrating the application of the same function as an ORT operator which now remains aligned to the viewpoint Referring to FIG. 20, there is shown a diagram 2000 illustrating an ORT that is defined relative to the sight-line connecting Me OOI to the VP. Here, the OOI is the central node in the $9^3$ graph and the distribution of the ORT has been truncated at the position of the OOI.

Figure 21:
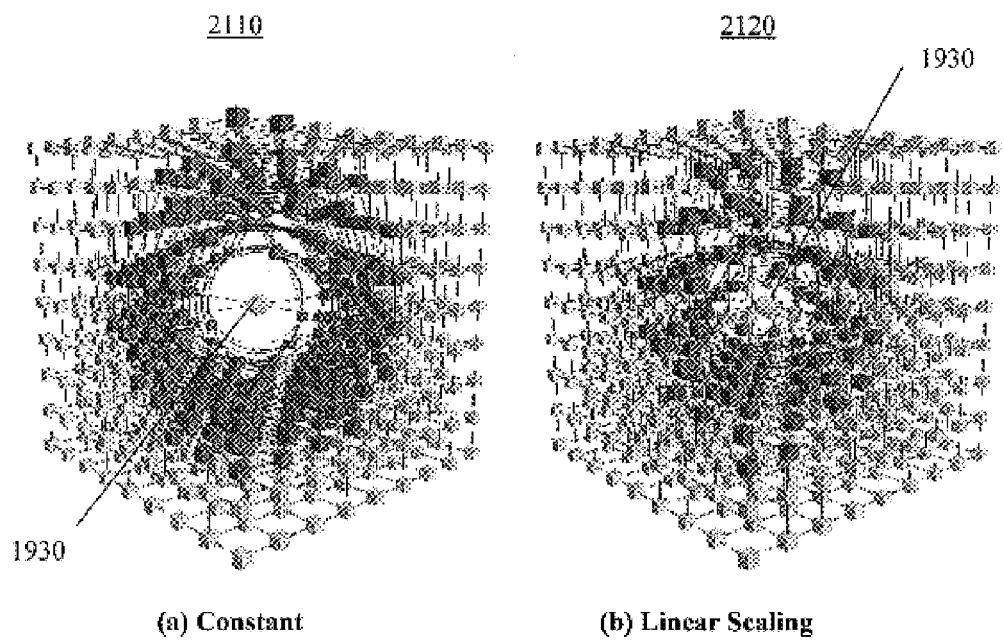
FIG. 21(a) is a diagram illustrating the effects of an ORT function where the sight-line is extended through the OOI resulting in a clear sight-line which isolates the OOI against the background in accordance with another embodiment.
FIG. 21(b) is a diagram illustrating the effects of an ORT function with a tapered cone-like distribution in accordance with another embodiment.

If the sight-line is extended through the node of interest then the ORT results in a clear sight-line which isolates the node against the background. Referring to FIG. 21($a$), there is shown a diagram 2110 illustrating this effect. If the visual clutter of nodes behind the object of interest had interfered with its examination then this pattern of layout adjustment distribution may be useful. Other possibilities include a tapered cone-like distribution of the ORT function. Referring to FIG. 21($b$), there is shown a diagram 2120 illustrating this effect. FIGS. 21($a$) and 21($b$) are examples of constant and linear scaling of the application of an ORT along the z-axis of the ORT CS, respectively.

Figure 22:
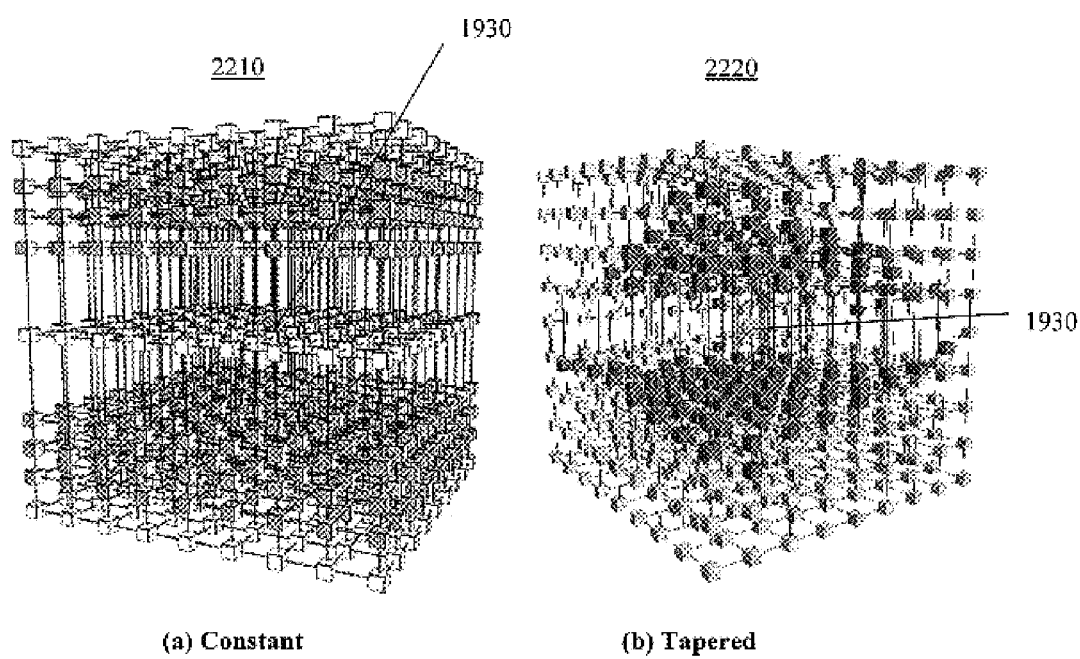
FIG. 22(a) is a diagram illustrating the effects of constant operator that is data-axis relative and does not track changes in the viewpoint in accordance with another embodiment.
FIG. 22(b) is a diagram illustrating the effects of tapered operator that is viewpoint aligned in accordance with another embodiment.

Choosing a plane containing the sight-line as the source of the displacement function provides a means of interactively cutting-into the structure and having this "cut" follow the sight-line as the viewpoint is moved around the structure. The simplest two cases of this form of ORT are vertically and horizontally positioned planes which produce vertical or horizontal cuts into the representation, respectively. Referring to FIG. 22(a), there is shown a diagram 2210 illustrating this effect. Here the truncated or tapered distributions are particularly effective, creating a book-like opening in the representation. Referring to FIG. 22(b), there is shown a diagram 2220 illustrating this effect. This method provides good visibility in the spatial neighborhood of the object of interest, more so within the plane than perpendicular to it. In FIG. 22(a), the operator is data-axis relative and does not track changes in the viewpoint. In FIG. 22(b), the operator is viewpoint aligned.

Figure 23:
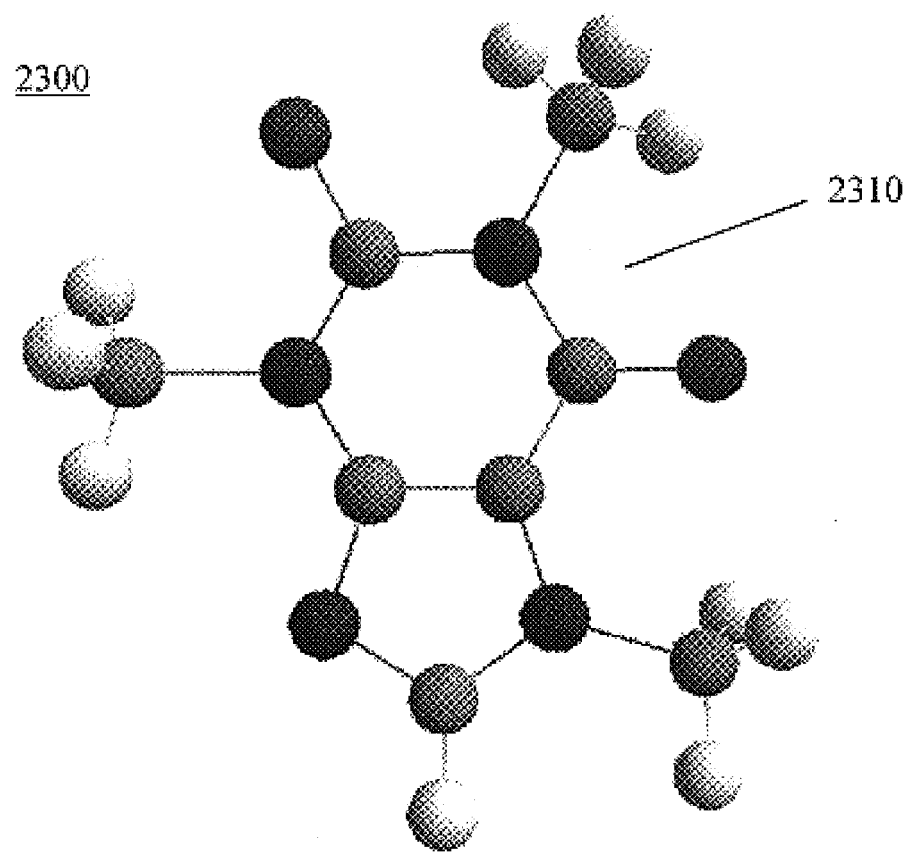
FIG. 23 is a diagram illustrating the caffeine molecule in accordance with another embodiment in accordance with another embodiment.

General 3D Node and Edge Structures. Randomly arranged 3D graphs are available from the field of from chemistry. Ball and stick models of molecular structures are a common means of representing chemical compounds, for example, the caffeine molecule. Referring to FIG.23, there is shown a diagram 2300 of the caffeine molecule 2310. In many respects these structures are similar to 3D graphs, except that here the length of edges tends to be shorter and the number of edges incident on a node is limited by the bonding properties of the atom. That being said, these models are used to represent complex structures where the geometry of the layout is potentially more pertinent to the interpretation of the representation tan in abstract layouts of 3D graphs.

Figure 24:
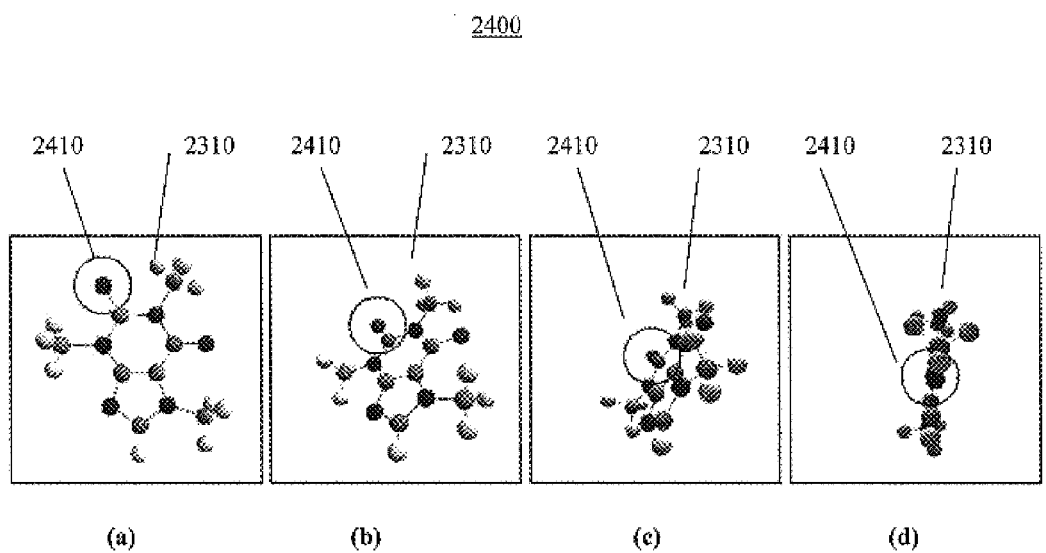
FIG. 24 is a sequence of diagrams illustrating the movement of the viewpoint around the caffeine molecule of FIG. 23 in accordance with another embodiment.
Figure 25:
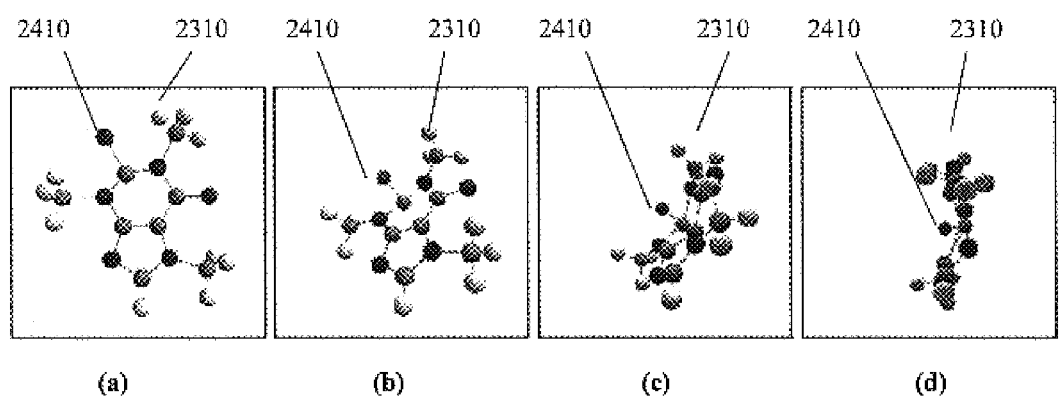
FIG. 25 is a sequence of diagrams illustrating the movement of the viewpoint around the caffeine molecule of FIG. 23 with the application of an ORT in accordance with another embodiment.

The caffeine molecule 2310 illustrated in FIG. 23 consists of 24 atoms and 25 chemical bonds, so occlusion is not a particular problem here. However, it is useful for describing effects of the application of ORTs to this domain of representations. In FIG. 23, the atoms of the molecule are represented by spheres. Selecting one of the atoms as the OOI, a sight-line relative ORT Unction may be applied to it. The ORT may be truncated at the depth of the OOI so as not to disturb the layout of atoms on the far side. Now, as the viewpoint moves around the structure the other atoms are gently deflected away from the sight-line and return to their original positions as the sight-line passes by. Referring to FIG. 24, there is shown a sequence of diagrams 2400 illustrating the movement of the VP around the molecule 2310 without the application of an ORT function In FIG. 24, the OOI 2410 is circled. Without the application of an ORT, the OOI 2410 is occluded as the viewpoint is rotated about the structure 2310. Referring to FIG. 25, there is shown a sequence of diagrams 2500 illustrating the movement of the VP around the molecule 2310 this time with the application of an ORT. In FIG. 25, the OOI 2410 remains visible.

In this example, note that there is a choice as to whether or not to distort the edges representing the bonds between the atoms. The relevant trade-offs are between the increased cost of rendering edges as a piece-wise linear approximations of the curved paths which they take through the ORT influenced space, and the detrimental effect straight edges may have when they are not subject to the effect of the ORT. The immunity of the edges from the ORT detracts from the effect of the ORT on the representation as a whole. In this example, leaving the bonds undistorted means that even if two atoms are displaced away from the sight-line in opposite directions, the bond connecting them may remain in place or be moved into place, in front of the object of interest This may introduce a small amount of occlusion, but it may create a great deal of visual clutter in front of the object of interest.

Other possibilities within this domain include the selection of chemical substructures as objects of interest rather man individual atoms. For example a benzene ring may form a structure of interest that would be cleared of occluding elements and remain undistorted as it's local neighborhood and relationship to the overall structure is studied.

More complex representations of molecular structures and particularly proteins are common in the field of biochemistry. Protein strictures form complex spatial folding arrangements, the intricacies of which are of particular interest in the function proteins during biological processes. The convoluted structures of are often represented visually as ribbons that illustrate the winding, twisting, and folding of the molecular chain which comprises a protein. These representations are often dense and involve considerable occlusion issues and are ideal candidates for the application of ORTs.

Figure 26:
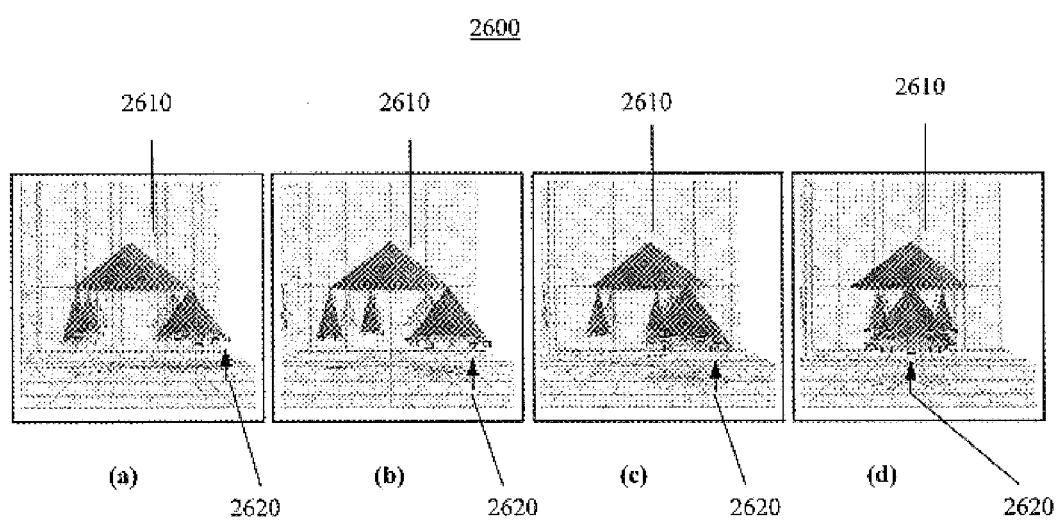
FIG. 26 is a sequence of diagrams illustrating the rotation of a cone-tree directory structure in accordance with another embodiment.

Hierarchical 3D Graph Structures. ORTs may also be applied to cone trees in the field of information science. Cone trees provide a means of creating a 3D layout of a hierarchical information set. In a typical implementation of cone trees, specifying a node of interest within the structure leads to the structure being adjusted automatically such that the node of interest is rotated to the front-and-center position. Referring to FIG. 26, there is shown a sequence of diagrams 2600 illustrating the rotation of a cone tree directory structure 2610. A selected leaf-node 2620 in the cone tree directory structure 2610 is selected in FIG. 26(a). This node 2620 is brought to the front through concentric rotations of the cone tree structure 2610 as illustrated in FIGS. 26(b) through 26(d). This technique works well in the case of a single OOI 2620 but the mechanism does not readily extend to provide a means of dealing with two, arbitrarily specified, OOIs.

Figure 27:
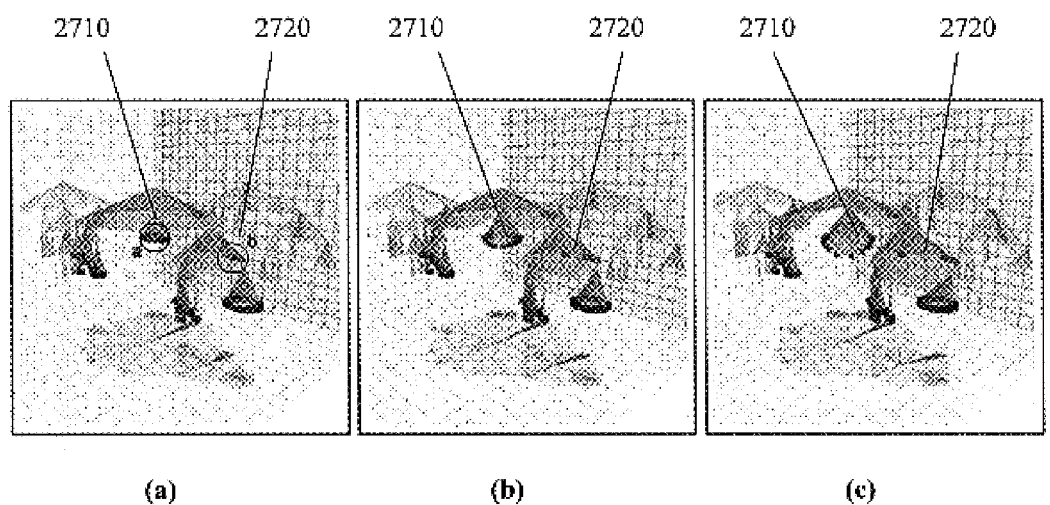
FIG. 27 is a sequence of diagrams illustrating the application to two ORT operators to two leaf-nodes in a cone-tree directory in accordance with another embodiment.

ORTs may be used to support interaction with multiple nodes of interest with the cone tree framework. As one application of cone trees is the display of directory and file structures, then if a user is searching for a particular version of a file within the layout a scan of the file system may yield several potential candidates. With single focus operation each of the files produced as a result of the search must be examined in a sequential manner. With the addition of multiple ORTs, each providing occlusion reduction for one of the search results, a multi-focal 3D detail-and-context overview is possible. This display facilitates the addition of more detailed information (e.g. file date, path, author, etc.) to each result (i.e. either simultaneously if there are relatively few results or as the user hovers the cursor if there are too many results for simultaneous display). Referring to FIG. 27, there is shown a sequence of diagrams 2700 illustrating the application of two ORT operators to two leaf-nodes labelled "a" 2710 and "b" 2720. In FIG. 27(a), the two leaf-nodes 2710, 2720 are selected simultaneously. In FIGS. 27(b) and 27(c), two ORT operators are applied improving the visibility of these nodes 2710, 2720 without explicitly rotating one or the other to the front.

Figure 28:
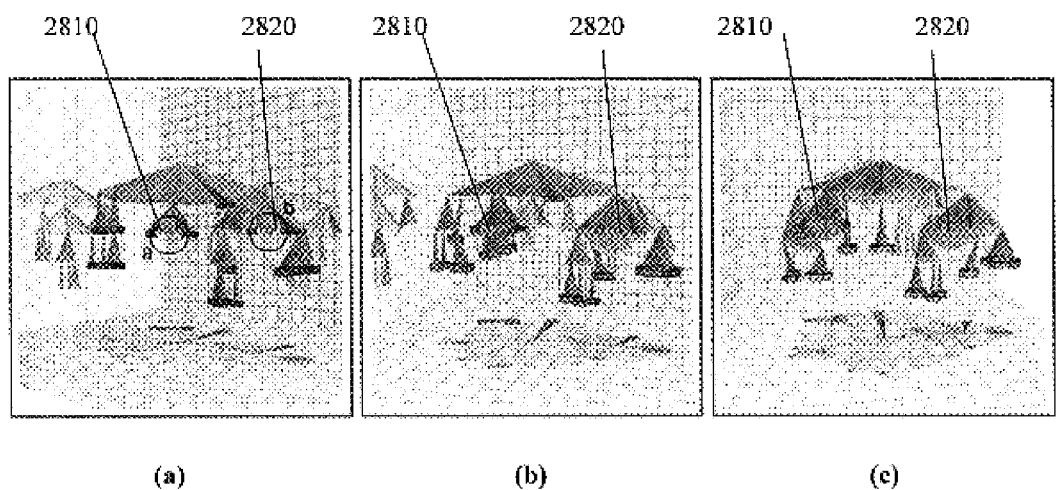
FIG. 28 is a sequence of diagrams illustrating navigation of the viewpoint after the application of ORTs for a cone-tree directory in accordance with another embodiment.

Once the multiple objects of interest are defined, navigation of the viewpoint is possible while the objects remain visible. Referring to FIG. 28, there is shown a sequence of diagrams 2800 illustrating this effect. Once ORT operators are attached to the nodes "a" 2810 and "b" 2820 in FIG. 28(a), these nodes 2810, 2820 remain visible during movement of the viewpoint as shown in FIGS. 28(b) and 28(c). This is an inherent property of each ORT incorporating the current viewpoint.

Figure 29:
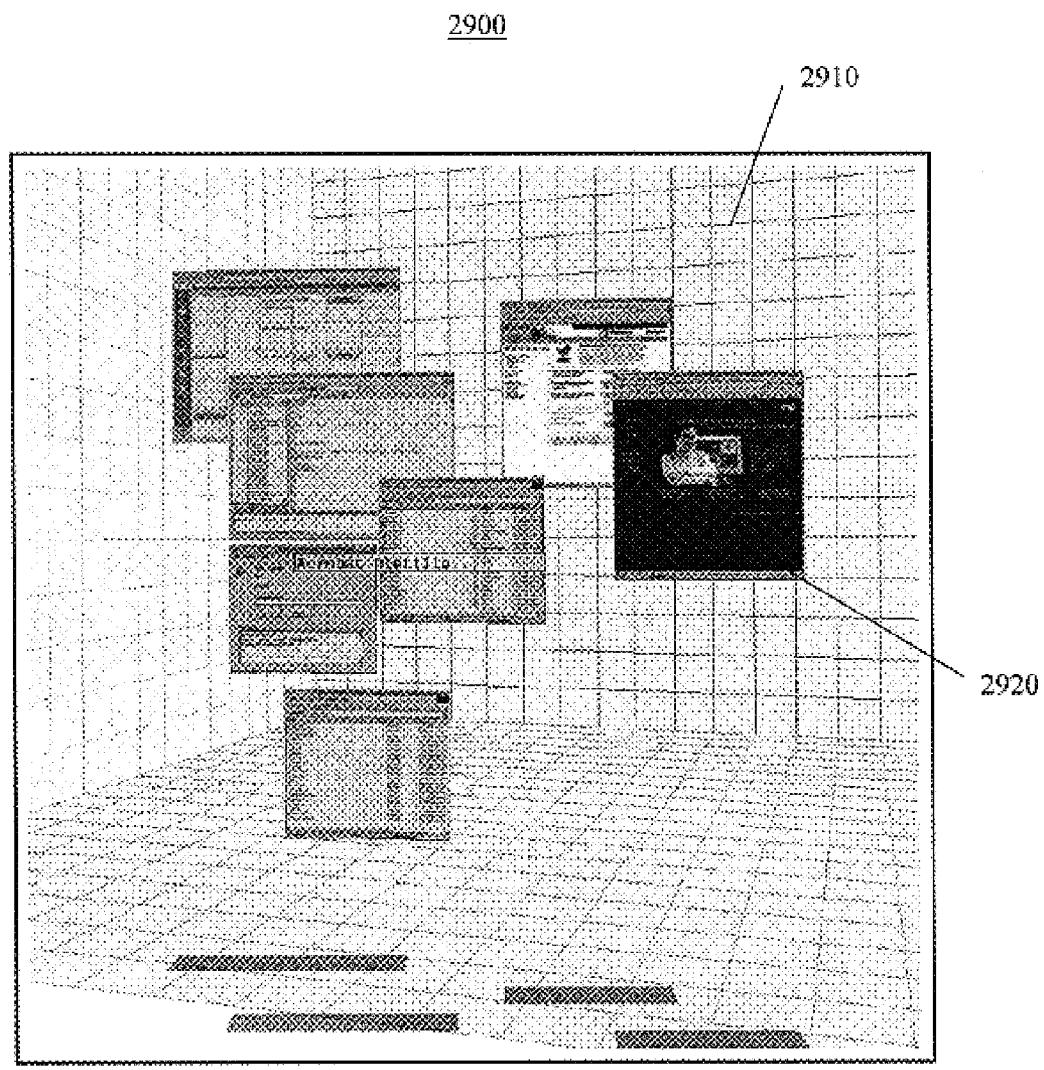
FIG. 29 is a diagram illustrating a 3D desktop-style environment in accordance with another embodiment.

3D Desktop Environment. As a final example of the application of ORTs in discrete information spaces, consider a 3D desktop-style environment. Referring to FIG. 29, there is shown a diagram 2900 illustrating a 3D desktop environment 2910. This environment 2910 can be implemented on a personal computer running the Microsoft Windows operating system. As the system initializes, it "grabs" images of each application 2920 currently running on the user's desktop. These images are attached to polygonal surfaces within the 3D-desktop environment 2910 in which the user cm navigate by movement of the viewpoint with a turntable metaphor. Within this environment 2910 the user can arrange the 3D windows 2920 by dragging them.

Figure 30:
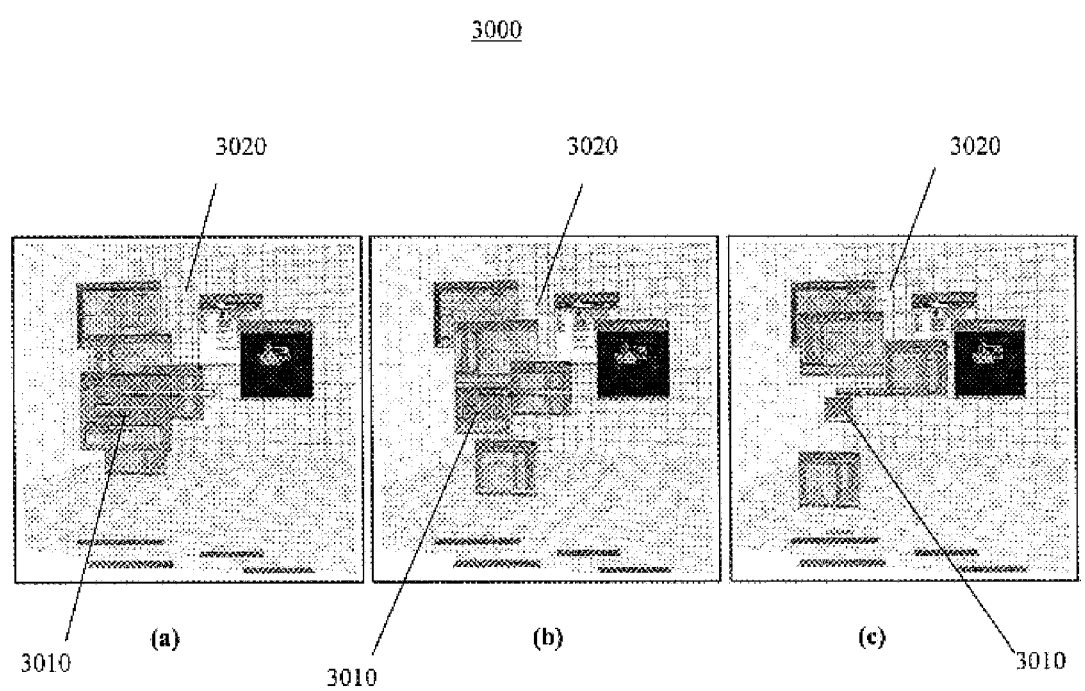
FIG. 30 is a sequence of diagrams illustrating the arrangement of windows in a 3D desktop environment in accordance with another embodiment.

Referring to FIG. 30, there is shown a sequence of diagrams 3000 illustrating the arrangement of windows in a 3D desktop environment 2910. After a user selects a window 3010, either by clicking on it once or, when no window is currently selected, by hovering the mouse over it, that window becomes marked as an OOI. Once a window is marked as an OOI, an ORT function is applied to resolve any potential occlusion situations. As the selected window 3010 is pushed to the back of the scene through a cluster of windows 3020 in the 3D desktop environment 2910, the cluster 3020 is dispersed in order to prevent occlusion of the selected window 3010. This results in the sight-line moving through the cluster of unselected windows 3020 and the effect of the ORT is to move these windows 3020 away from the neighbourhood of the sight-line. A single window 3010 can also be brought to the focal position, immediately in font of the viewer, where it can appear at the same scale as it would on the user's desktop.

In FIG. 30, new ORTs are introduced over a number of frames, producing a smooth transition between the previous state of the layout and the new layout. If a selection results in the transfer from one OOI to a second then the original ORT is removed in a similar manner, producing a cross-fade between the two states of the layout. Were the layout to "jump" between states the task of tracking changes in the layout would detract from the principle task of interaction with the desktop environment.

Figure 31:
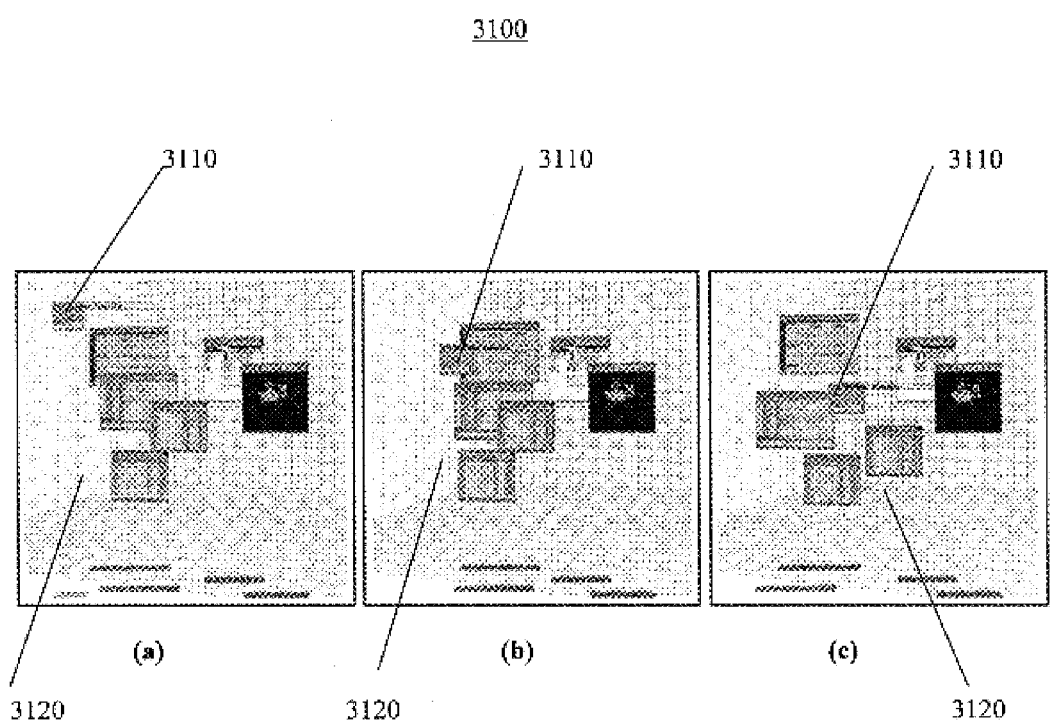
FIG. 31 is a sequence of diagrams illustrating the effects of an ORT applied to a 3D desktop environment in accordance with another embodiment.

Once a window has been selected as a focus by clicking on it, it remains the OOI until it is de-selected, either by clicking on another window of clicking over "empty" space which de-selects all windows. As long as a window is selected it remains un-occluded as the user navigates through the space or changes the position of the window. As the user drags the selected window behind another group of windows they are temporarily "pushed" off of the sight-line by the influence of the ORT. Referring to FIG. 31, there is shown a sequence of diagrams 3100 illustrating this effect. As the selected window 3110 is moved from its initial position in the upper left of the view (FIG. 31(a)), the cluster of other windows 3120 which it passes in front of are dispersed (FIGS. 31(b) and 31(c)) by the action of the ORT attached to the selected window 3110. As the selected page 3110 is moved from its initial position (FIG. 31(a)) to an intermediary position (FIG. 31 (c)), the nearby windows 3120 are deflected away from their initial positions as the selected window 3110 passes by and may return to their initial positions after the selected window 3110 has passed.

Contiguous Data Representations. A second classification of information representations in three-dimensions may be termed contiguous data representations. These representations are characterized as having stronger adjacency and containment relationships than the discrete data representations discussed above. Examples of contiguous data representations include 3D models or parts assemblies in Computer Aided Drafting ("CAD"). Other examples would include surface data derived from volumetric data sets such as medical imaging, fluid dynamics, atmospheric, or geophysical data.

In such datasets the layout is comprised of components that have physical relationships which may include containment or adjacency. In the application of ORTs to these representations it may be necessary to take these relationships into account. This may mean animating components of a parts assembly through a partial disassembly sequence before the parts come under the influence of the displacement of the ORT. While requiring a somewhat more complex model description, including some information about the assemblage of parts, including containment relationships, which parts must be removed before others are free to move and so on, the application of ORTs provides a means of creating an interactive assembly diagram. In such a system, other elements of the model would disassemble themselves in order to provide clear visual access to a component of interest. As the viewpoint is moved, component groups would disassemble and move out of the way then reassemble as necessary to provide occlusion-free views of the component of interest. Increasing and decreasing the magnitude of the ORTs would also have the affect of the assembly coming apart and reassembling itself.

In the following, two exemplary system embodiments which apply ORTs to component-based data will be described. The first system is directed towards 3D models consisting of different parts. For this system, a model of the skeletal structure of the human foot will be used by way of example. The second system applies ORTs to surface data derived via the "Marching-Cubes" algorithm as reviewed by Cowperthwaite in *Occlusion Resolution Operators for Three-Dimensional Detail-In-Context*. It demonstrates the use of ORTs to cut through components, or layers, of this data to reveal underlying elements. Here, objects of interest are excepted from the effect of the OPT displacements.

Figure 32:
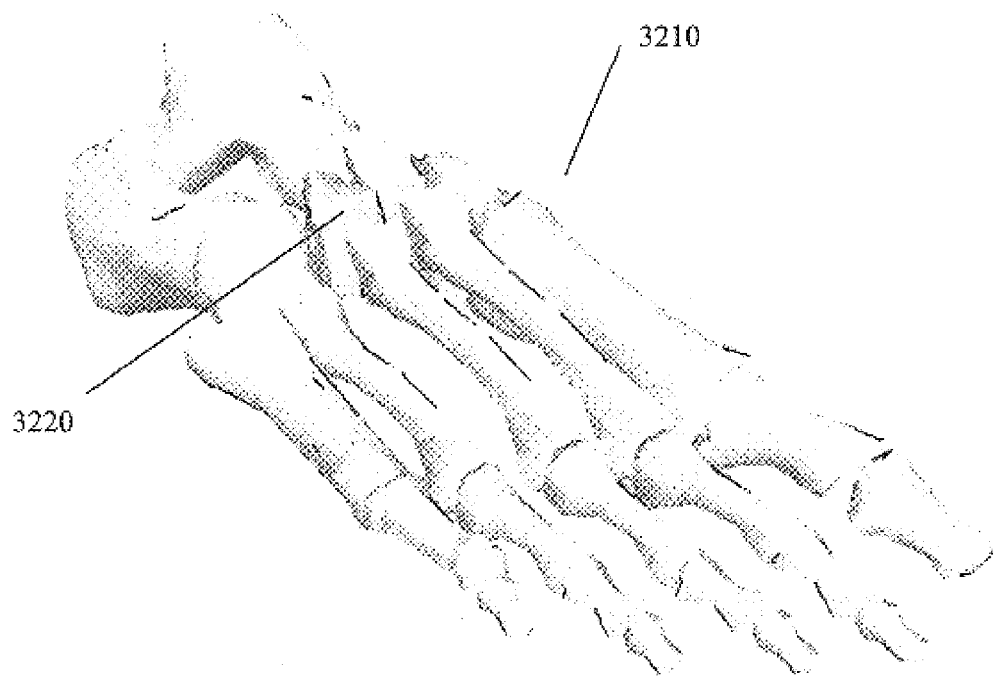
FIG. 32 is a diagram illustrating a skeletal model of a human foot in accordance with another embodiment.

3D Models. Referring to FIG. 32, there is shown a diagram 3200 illustrating a skeletal model of a human foot 3210. This model 3210 contains 26 separate components, including the external cuneiform bone 3220, and approximately 4204 triangular faces. Note that this model 3210 does not have any containment relationships. If the external cuneiform bone 3220 is the current focus of attention, then other bones around it can be scaled and displaced in order to provide sufficient space to increase the scale of the bone of interest. In other words, a magnification producing transformation ("MPT", i.e. a form of detail-in-context distortion basis function) may be combined with an ORT.

Figure 33:
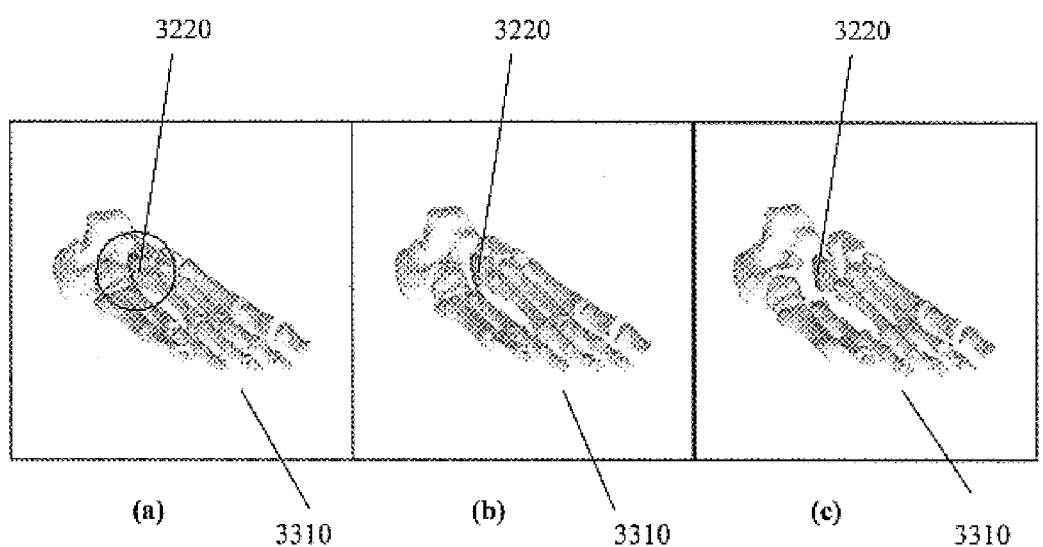
FIG. 33 is a sequence of diagrams illustrating the effect of an ORT applied to she skeletal model of FIG. 32 in accordance with another embodiment.
Figure 34:
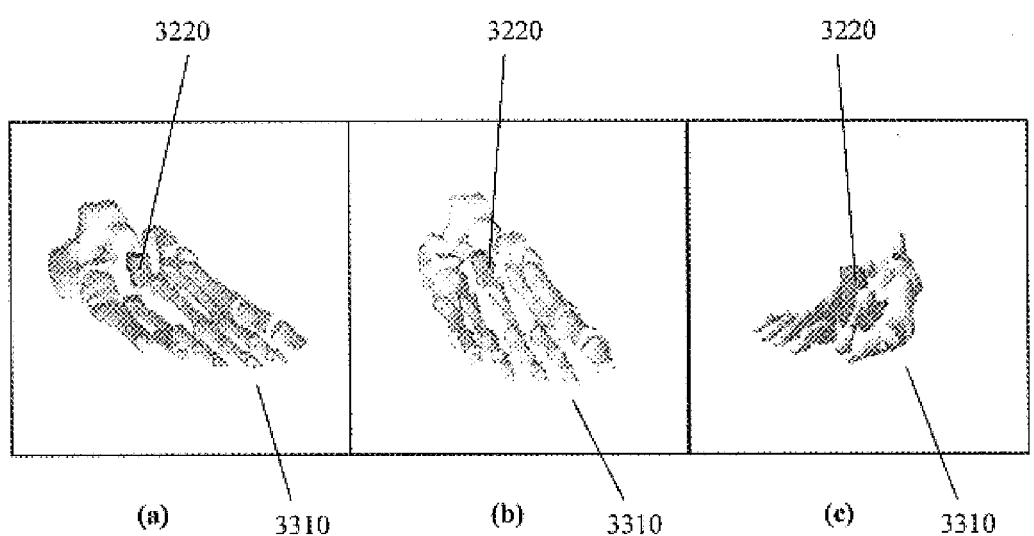
FIG. 34 is a sequence of diagrams illustrating the movement of the viewpoint around the skeletal model of FIG. 33 in accordance with another embodiment.

By adding viewpoint-aligned ORTs to the model, a particular component of interest 3220 can be selected and revealed via the action of the ORT. Referring to FIG. 33, there is shown a sequence of diagrams 3300 illustrating this effect. In FIG. 33(a), the external cuneiform bone 3220 is circled. In FIGS. 33(b) and 33(c), the remaining 25 bones 3310 are displaced away from the sight-line. Referring to FIG. 34, there is shown a sequence of diagrams 3400 illustrating the movement of the viewpoint around the model 3210. As the viewer navigates around the model, all of the remaining components 3310 are dynamically deflected off of the sight-line. In this manner a clear view of the selected component 3220 is maintained.

Figure 35:
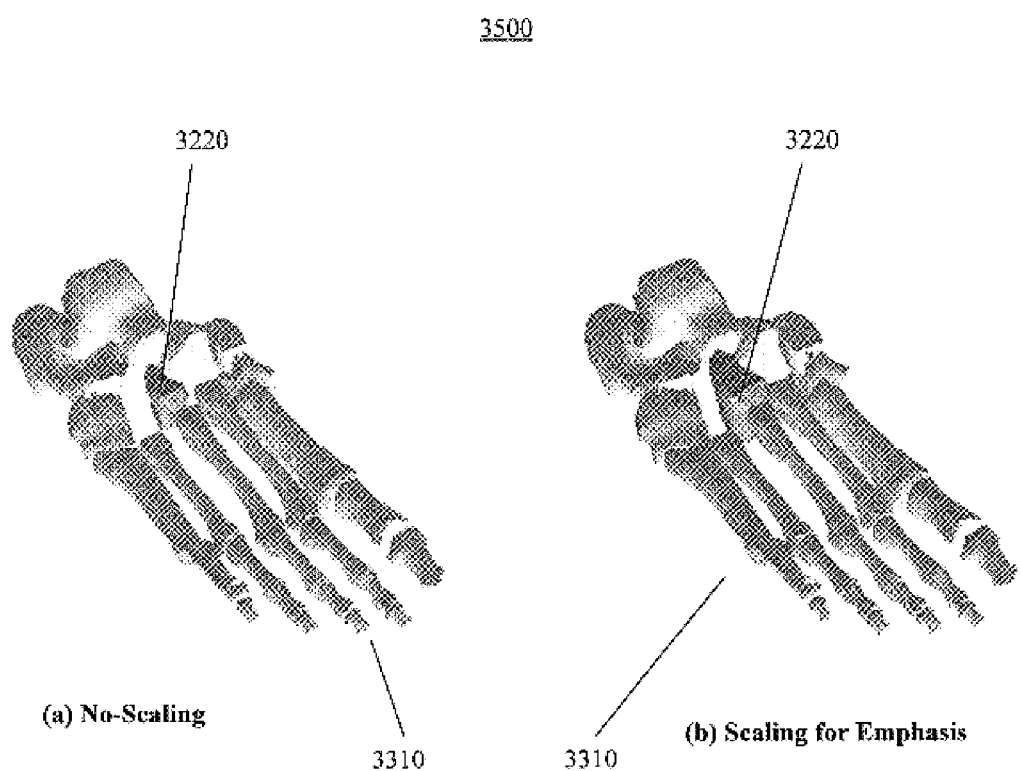
FIG. 35 is a sequence of diagrams illustrating the effects of scaling the object of interest in the skeletal model in accordance with another embodiment.

Attention emphasis through scaling can be applied in conjunction with the occlusion reduction of ORT operators. The scale of the component of interest can be increased and the remailing components can be displaced, rather than scaled, in order to provide sufficient room for the increase in scale of the component of interest. Referring to FIG. 35, there is shown a sequence of diagrams 3500 illustrating this effect. In FIG. 35(a), no scaling is applied and the effect of the OPT is simply to displace components 3310 and reduce occlusion. In FIG. 35(b), in addition to displacement, components 3310 have been scaled according to their geometric distance from the OOI, the external cuneiform bone 3220.

Figure 36:
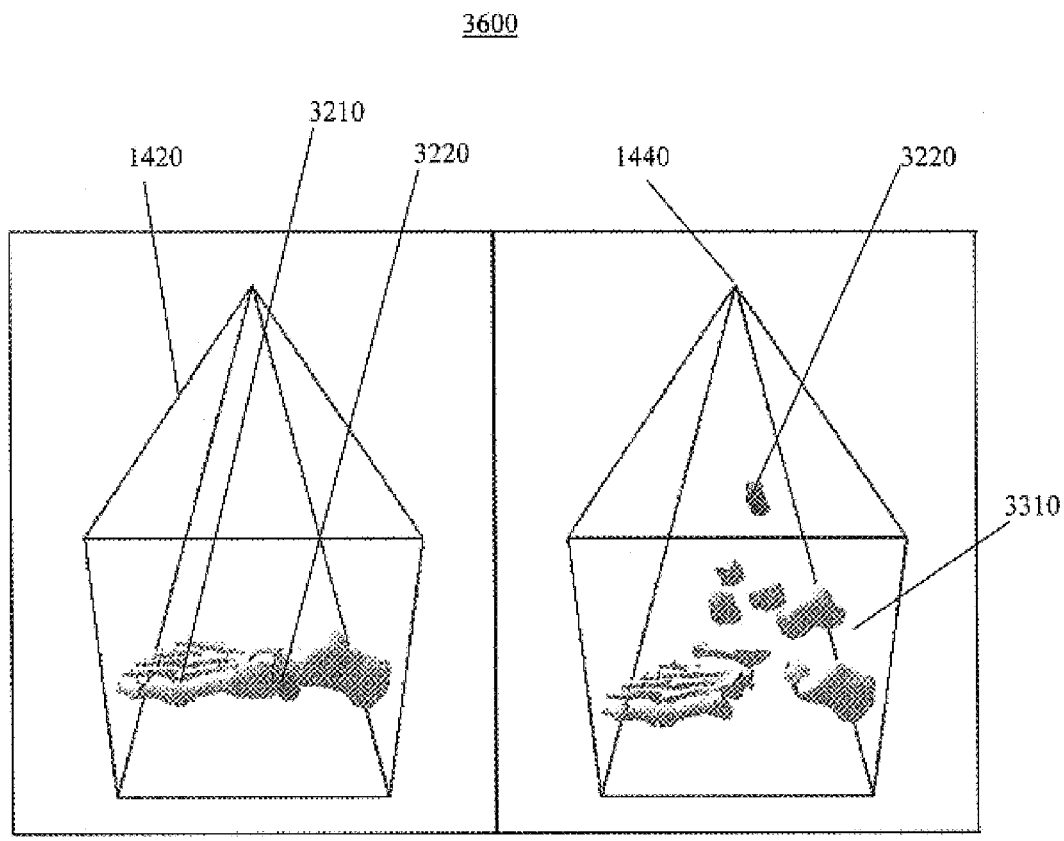
FIG. 36 is a sequence of diagrams illustrating the operation of a MPT operator on the skeletal model in accordance with another embodiment.

Now, scaling can be achieved by at least two mechanisms. First, components may be scaled in place, simply adjusting the local scaling factor as each component is rendered at its original position. Second, the effect of perspective distortion may be employed to achieve scaling using MPTs. In this second technique, components are moved towards the viewpoint along the sight-line trough their geometric center in order to magnify the component. Components can also be moved away from the viewpoint in order to compress or minify them. Referring to FIG. 36, there is shown a sequence of diagrams 3600 illustrating the operation of a MPT operator on the model of the foot as seen from a secondary viewpoint. In FIG. 36(a), both the model 3210 and a representation of the perspective viewing frustum 1420 (in FIG. 14) are illustrated. In FIG. 36(b), the focal component 3220 and those nearest it are moved towards the principle viewpoint 1440 producing magnification. The degree of magnification depends on the ratio of original and final positions relative to the z-axis of the camera coordinate system. In other words, components 3310 of the model 3210 are translated along their individual lines of sight to produce magnification via perspective distortion.

Figure 37:
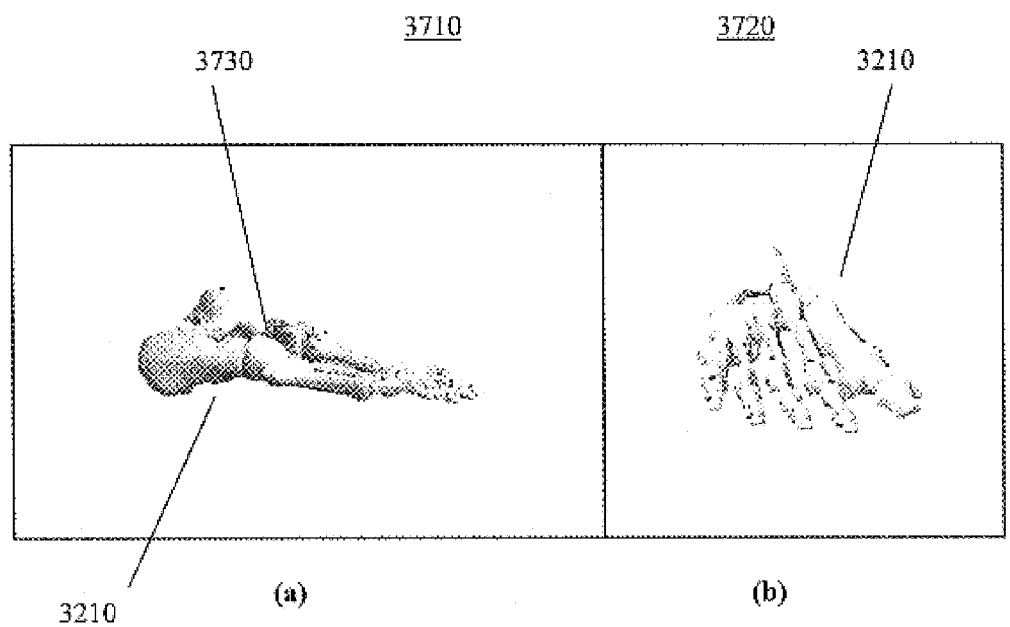
FIG. 37(a) is a side view illustrating the skeletal model of the foot with no ORTs applied in accordance with another embodiment in accordance with another embodiment.
FIG. 37(b) is a font view illustrating the skeletal model of the foot with no ORTs applied in accordance with another embodiment.

While substantially different in mechanism from in place scaling, the NPT technique produces similar results once perspective projection has been applied. Referring to FIG. 37, there are shown side and front views 3710, 3720 illustrating the skeletal model of the foot 3210, including the navicular bone 3730, in two orientations with no ORTs applied.

Figure 38:
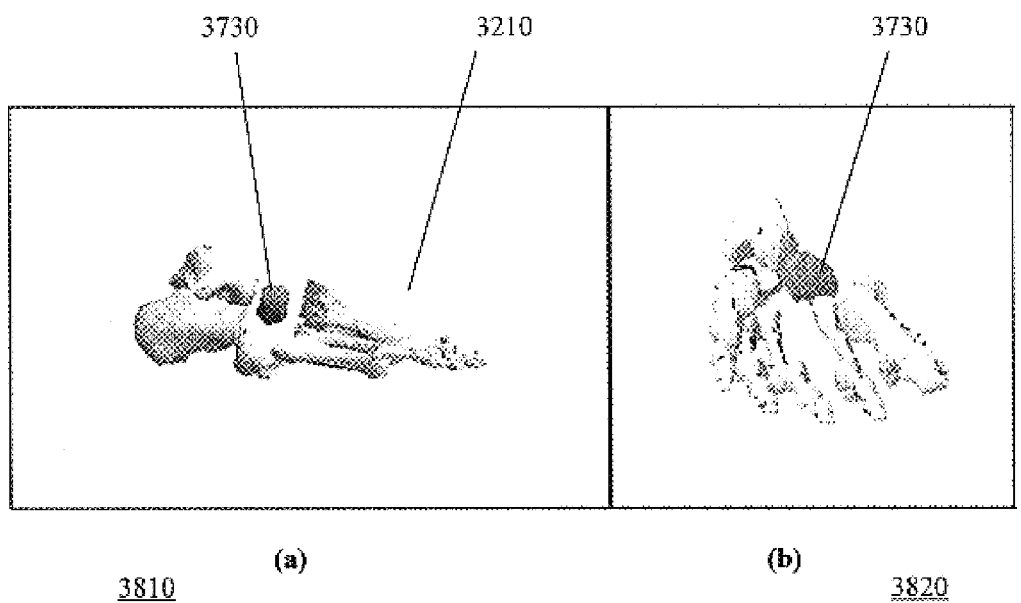
FIG. 38(a) is a side view illustrating the skeletal model of the foot wherein distortion has been applied in accordance with another embodiment.
FIG. 38(b) is a front view illustrating the skeletal model of the foot wherein distortion has been applied in accordance with another embodiment.
Figure 39:
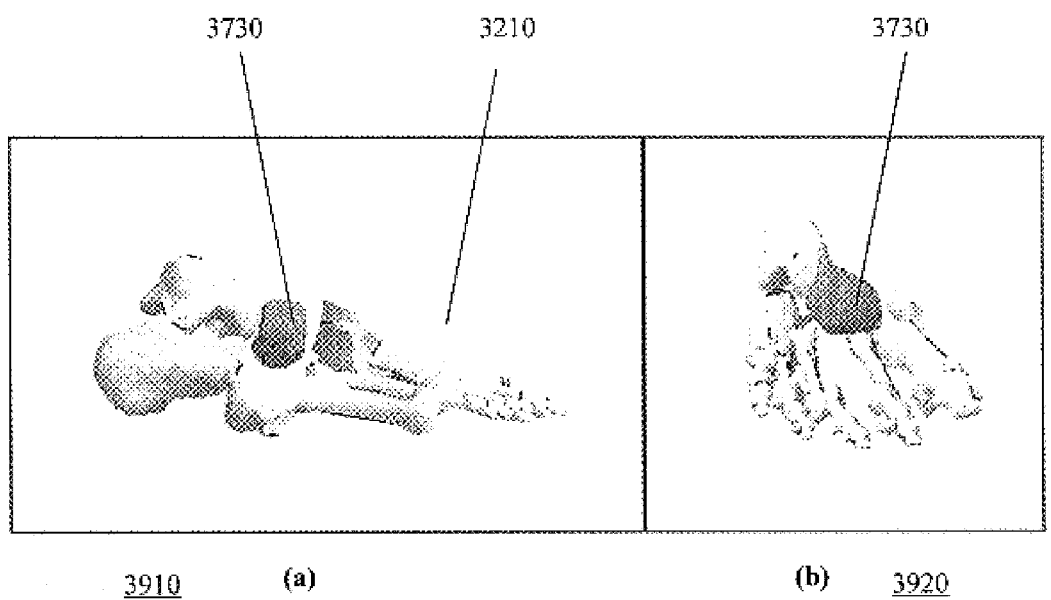
FIG. 39(a) is a side view illustrating the skeletal model of the foot wherein both an ORT and a MPT has been applied in accordance with another embodiment.
FIG. 39(b) is a front view illustrating the skeletal model of the foot wherein both an ORT and a MPT has been applied in accordance with another embodiment.
Figure 40:
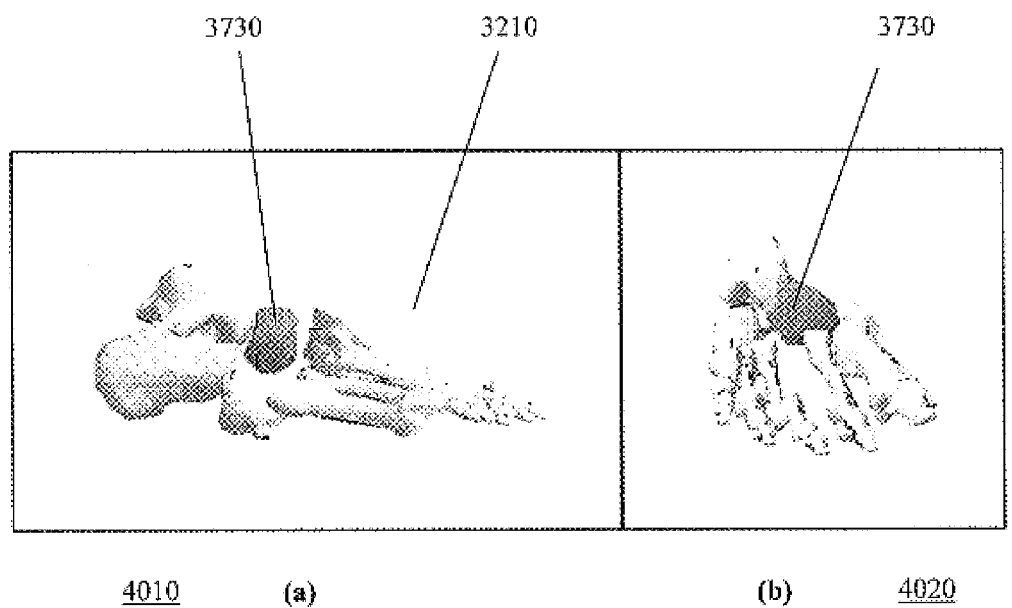
FIG. 40(a) is a side view illustrating the skeletal model of the foot wherein distortion has been applied in accordance with another embodiment.
FIG. 40(b) is a front view illustrating the skeletal model of the foot wherein distortion has been applied in accordance with another embodiment.

With no distortion or magnification applied, the navicular bone 3730 object-of-interest remains all but completely occluded both FIGS. 37(a) and 37(b). Referring to FIG. 38, there are shown side and front views 3810, 3820 illustrating the skeletal model of the foot 3210 wherein distortion has been applied to the layout of the model with no scaling for emphasis. Again, the navicular bone 3730 is the OOI. Referring to FIG. 39, there are shown side and front views 3910, 3920 illustrating the skeletal model of the foot 3210 wherein both an ORT and a MPT have been added to provide occlusion reduction and perspective based scaling of the navicular bone 3730. Magnification here is produced through perspective transformation and as a result, the navicular 3730 is rendered in front of other bones that may have still resulted in partial occlusion. Referring to FIG. 40, there are shown side and front views 4010, 4020 illustrating the skeletal model of the foot 3210 including displacement and wherein scaling is produced by in-place component scaling. Once again, the navicular bone 3730 is the OOI. From the principle viewpoint in the perspective projection system there is no apparent motion of the components in an MPT as they are constrained to move back and forth along the vector of their original sight-line.

Figure 41:
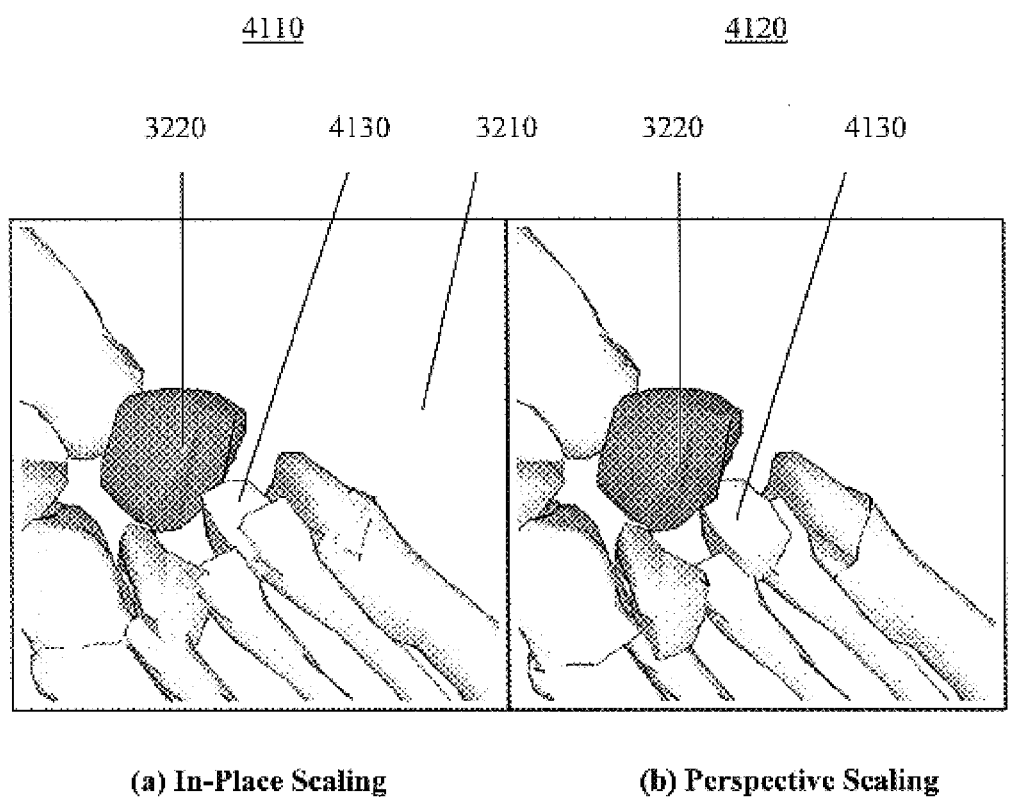
FIG. 41(a) is a diagram illustrating in-place scaling for the skeletal model of the foot in accordance with another embodiment.
FIG. 41(b) is a diagram illustrating perspective scaling for the skeletal model of the foot in accordance with another embodiment.

The most significant difference between the resulting images, produced by in-place or MPT scaling are in cases where adjacent magnified components begin to intersect each other. Referring to FIG. 41, there are shown detail views 4110, 4120 of the skeletal model of the foot 3210 illustrating in-place scaling and perspective scaling. Here, the external cuneiform bone 3220 is the OOI. The intersection of the external cuneiform bone 3220 and the third metatarsal bone 4130 as a result of in-place scaling as illustrated in FIG. 41(a) is resolved by the relative displacement of the components 3220, 4130 in depth through perspective scaling as illustrated in FIG. 41(b). With a MPT, components are separated in depth such that intersections are resolved by the magnified components 3220 being rendered in front of the compressed or less magnified elements 4130. Partial occlusion of the smaller elements in the overlapping areas is the result as illustrated in FIG. 41(b). The application of MPTs in conjunction with depth-enhancing stereo vision support whether via multiple screens in a head mounted display or more simply by rendering the scene as a red-blue 3D anaglyph may lead to interesting perceptual effects. The more magnified objects would appear not only larger but closer than the less magnified components.

Isosurface Set Data. The class of contiguous representations also includes isosurfaces derived from volumetric data. This information is often generated by an algorithm such as "Marching Cubes" as reviewed by Cowperthwaite in *Occlusion Resolution Operators for Three-Dimensional Detail-In-Context*. In many cases these surface extraction algorithms are applied successively to a data set in order to extract surfaces corresponding to the boundaries of various different components. They may also be used to extract surfaces from several, spatially coincident, sets of data. In medical imaging for example, several passes may be made to derive separate sets of surface data for bone, muscle, brain and rumor in a diagnostic cranial MRI scan. In dealing with the resulting concentric layer occlusion, there was previously no way to disassemble the components in order to provide clear visual access to the interior features. The most common approaches to providing access to the interior elements of such structures were through the use of transparency, component removal, or cutting planes. As discussed above, each of these approaches has some undesirable effects, either in complicating the perception of the distinct surfaces or in that they remove considerable quantities of information from the display. However, according to one embodiment of the present invention, applying a modified, discontinuous, ORT to the layers which occlude a component layer of interest in such a display makes it possible to produce a viewpoint dependent clear visual path to the region of interest.

A discontinuous ORT operates on the representation at the level below that of discrete components or layers by acting on the individual polygons (triangles) that comprise these surfaces. Triangles are transformed into the local coordinate system of the ORT and the resulting, displaced, locations of its vertices are determined. Discontinuous ORTs may include plane-relative functions. Triangles which span the source plane of the function may be split into components entirely on one side or the other and re-triangulated, leading to a clean cut surface. Other less computationally complex solutions include moving the triangle to the side already containing the majority of vertices, or leaving the plane-spanning triangles out of the final image altogether.

Figure 42:
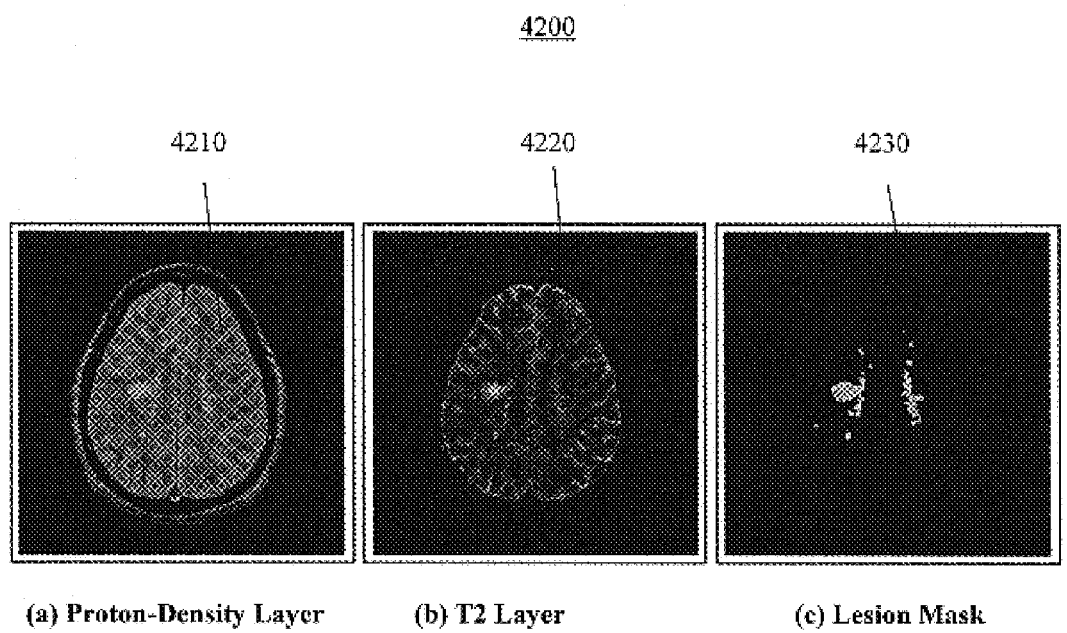
FIG. 42 is a sequence of diagrams illustrating proton-density layer, T2 layer, and lesion mask source images for the generation of Marching Cubes derived Lace images of MRI data for a MS patient's head in accordance with another embodiment.
Figure 43:
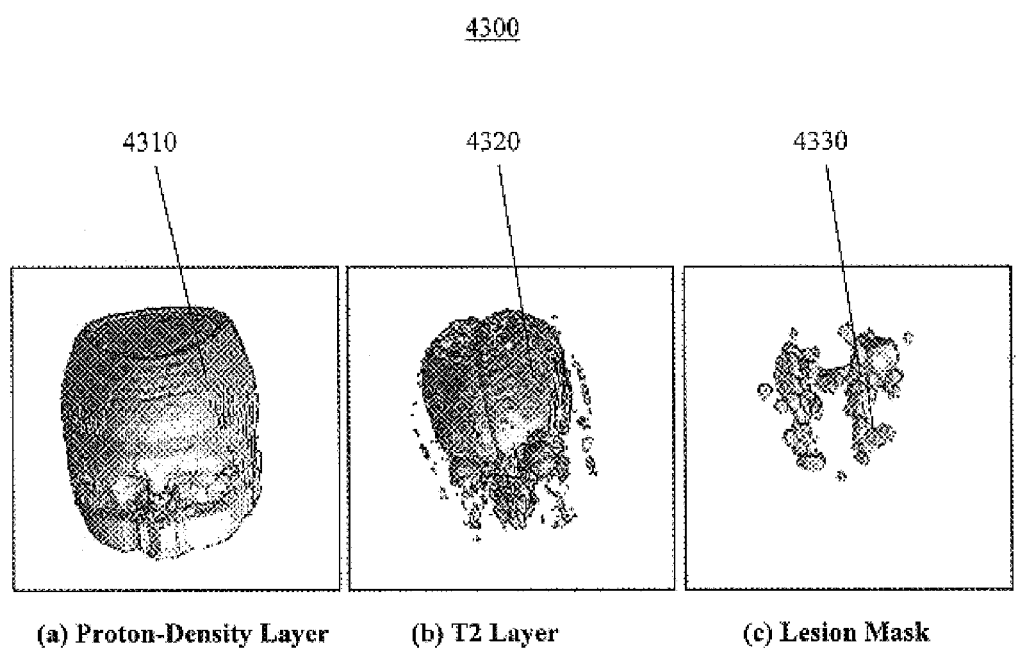
FIG. 43 is a sequence of diagrams illustrating surfaces derived from the MRI source images of FIG. 42 in accordance with another embodiment.
Figure 44:
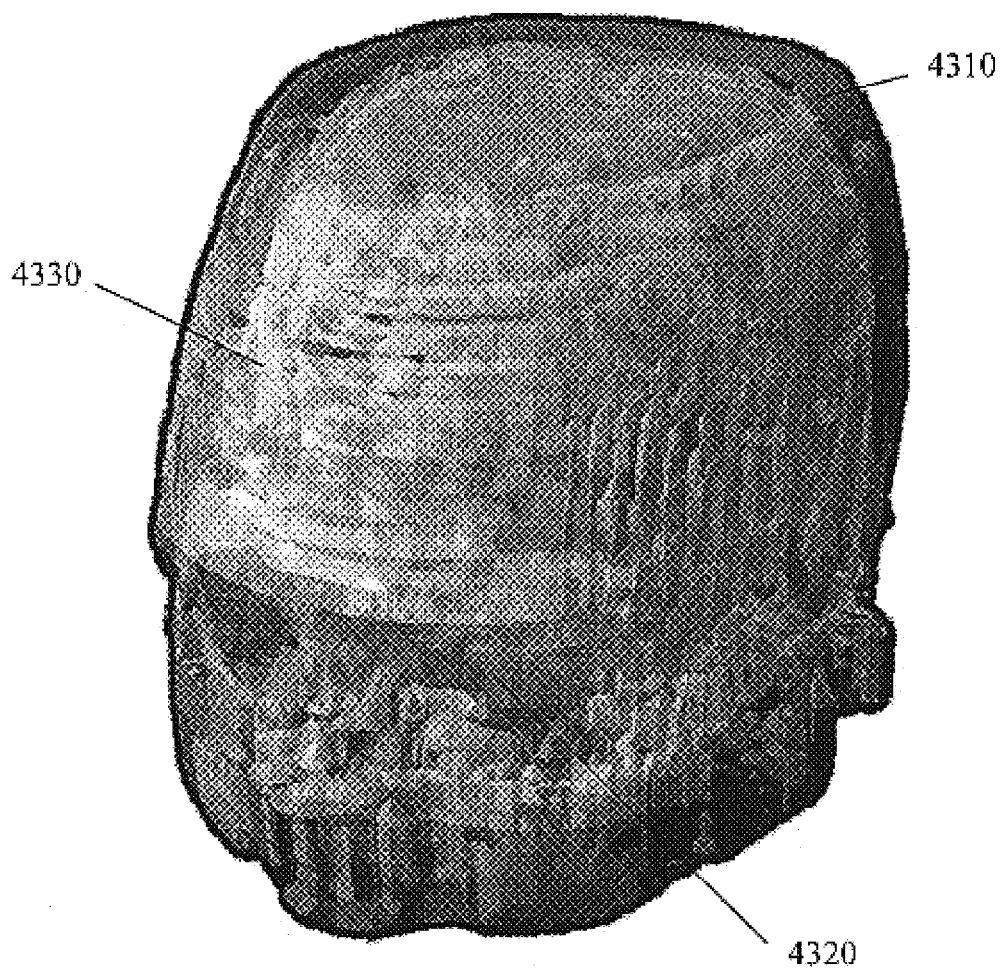
FIG. 44 is a composite diagram illustrating the proton-density layer surface, the T2 layer surface, and the lesion mask surface of FIG. 43 in accordance with another embodiment.

For example, a linearly-tapered vertical-plane-relative ORT may be applied to a representation derived from a diagnostic MRI scan of a Multiple Sclerosis ("MS") patient's head and a volumetric map of lesions. Referring to FIG. 42, there is shown a sequence of diagrams 4200 illustrating proton-density layer 4210, T2 layer 4220, and lesion mask 4230 source images for the generation of Marching Cubes derived surface images of MRI data for a MS patient's head. Referring to FIG. 43, there is shown a sequence of diagrams 4300 illustrating surfaces 4310, 4320, 4330 derived from the MRI source images 4210, 4220, 4230. The proton-density layer space 4310 reveals outer surfaces such as the skin, the T2 layer surface 4320 reveals neural tissue including the brain and eyes, and the lesion mask surface 4330 indicates the location of MS lesions. Referring to FIG. 44, there is shown a composite diagram 4400 illustrating the proton-density layer surface 4310, the T2 layer surface 4320, and the lesion mask surface 4330.

Figure 45:
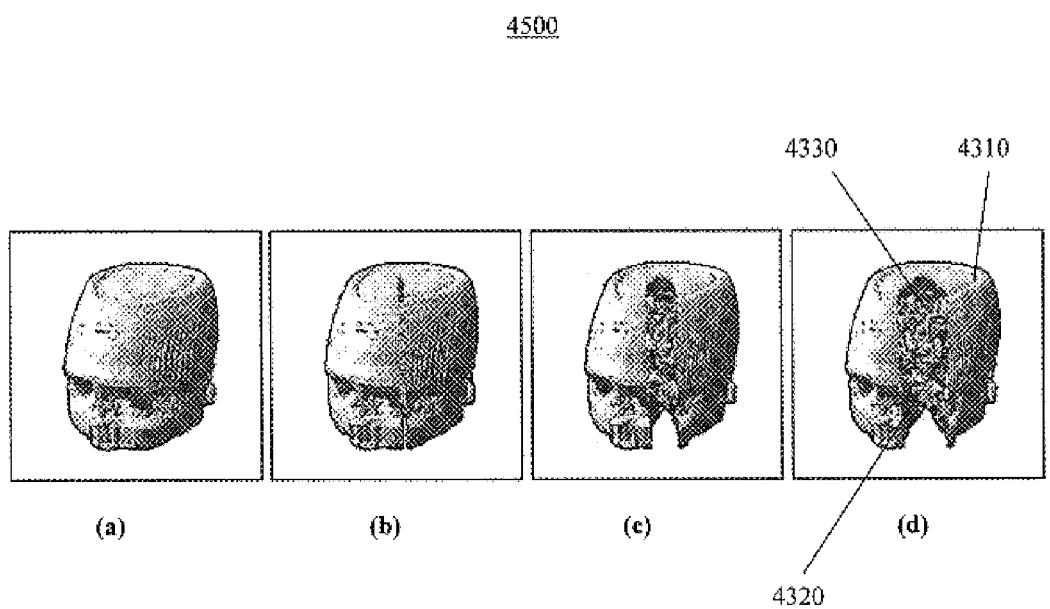
FIG. 45 is a sequence of diagrams illustrating the application of an ORT to reveal the lesion layer, pushing back the outer brain and skin layers, and providing an occlusion-free view of a portion of the lesion mask in accordance with another embodiment.

FIG. 44 has been rendered partially transparent in order to make the internal layers 4310, 4320, 4330 visible. Now, referring to FIG. 45, there is shown a sequence of diagrams 4500 illustrating the application of an ORT to reveal the lesion layer 4330, pushing back the outer brain 4320 and skin layers 4310 and providing an occlusion-free view of a portion of the lesion mask 4510. This deformation may automatically follow the viewer as the viewpoint is manipulated to examine the data from a different angle.

Continuous Data Representations. Often a volumetric data set will be amorphous and lack clear surface boundaries to extract via methods such as Marching Cubes. In these cases direct volume rendering ("DVR") algorithms are the preferred approach. There are a wide range of DVR methods. These algorithms fall into three major categories based on the method in which they traverse the object to be rendered: image order, object order, or a hybrid of the two.

Image order DVR methods include re-projection and ray casting of the volume. In re-projection, voxel values are averaged along parallel rays from each pixel in the viewing plane. The resulting image resembles an X-ray. Source-attenuation re-projection assigns a source strength and attenuation coefficient to each voxel and allows for obscuring of more distant voxels. Re-projection is a simple case of ray casting while applying a "SUM" operator. Ray casting of the volume involves performing an image order traversal of the pixels in the image plane. Rays are cast from the viewpoint through each pixel and through the volume. The opacities and shaded intensities encountered are summed to determine the final opacity and color of the pixel. Rays continue to traverse the volume until the opacity encountered by the ray sums to unity or the ray exits the volume. When a ray intersects a cell between grid points an interpolation may be performed to find the value at the intersection point. Ray casting, while CPU intensive, produces high quality images of the entire data set, not just surfaces as in surface fitting algorithms such as Marching Cubes.

Object order DVR methods are characterized as processing the scene in order of the elements of the data set rather than on a pixel by pixel basis. The "cuberille" rendering algorithm, for example, is a straightforward mapping of voxels to six-sided polyhedra (cubes). Hidden surfaces are normally removed when rendering with a z-buffer algorithm but it is also possible to determine a traversal order that yields the correct visible surfaces since a volume is so strongly spatially sorted. These orderings, such as front-to-back, back-to-front, and "octree" based approaches, all yield a performance benefit. The blocky appearance of cuberille rendered images can be improved by shading the cubes according to gradient information rather than their geometry. "Splatting" is an object order approach that operates by building up an image of the volume in the projection plane. The process is often likened to building up a picture by dropping appropriately colored snowballs representing the projection of each voxel. When the snowball hits the plane it splats and spreads the contribution of the voxel over an area.

In the following, embodiments of the present invention will be described in which ORTs are applied in the context of object order volume rendering.

Figure 46:
FIG. 46 is a diagram illustrating a data set of a human head rendered with the fast-splatting approach in accordance with another embodiment.

Fast-Splat Rendering. "Fast-Splatting" is an object order approach in which each voxel of data is rendered in place as a "small quad" (i.e. 4-sided polygon) which is colored by the volume data. A normal derived from the gradient of the volume across that voxel may also be associated with the quad and used in hardware based illumination calculations. The quad used to represent the voxel is further modified by using a alpha-texture map that performs the function of the blending kernel in traditional splatting. The resulting colored and alpha-mapped quad is rendered into, for example, the OpenGL-TM frame buffer in much the same way as a traditional splat contributes to the final image. The correct performance of this algorithm depends on the volume being traversed from back to front. Simply determining the axis of the data most parallel to the viewdirection and rendering planes perpendicular to that back to front means that the planes and the rendered quadrangles which comprise them are now within 45 degrees of perpendicular to the viewpoint Referring to FIG. 46, there is shown a diagram 4600 illustrating a data set of a human head 4610, with the top and back of the cranium removed to reveal the outer surface of the brain 4620, rendered with the fast-splatting approach.

Figure 47:
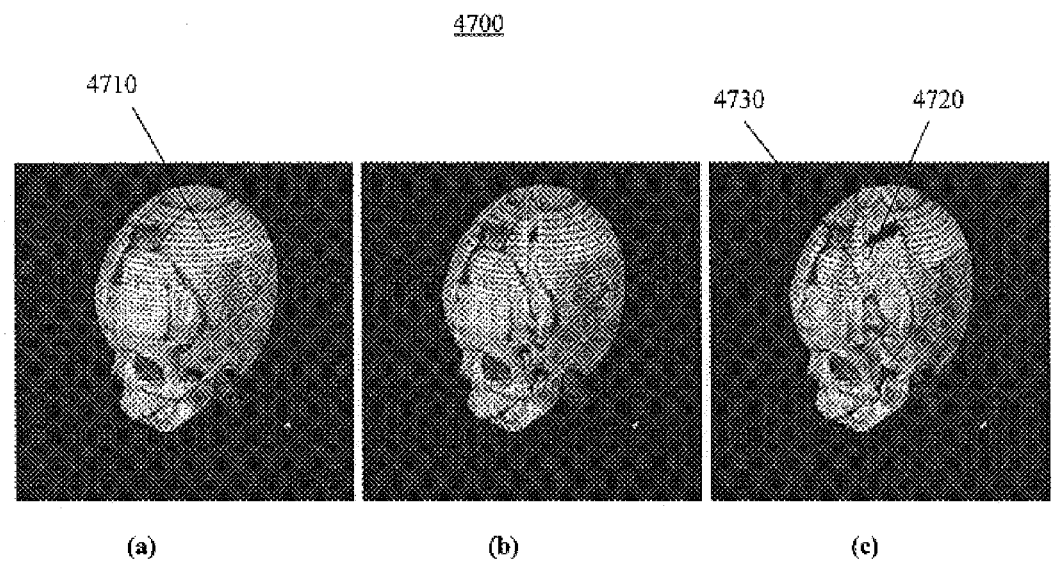
FIG. 47 is a sequence of diagrams illustrating the application of a vertical-plane source ORT to CT data of a human skull rendered via fast-splatting in accordance with another embodiment.

In order to apply an ORT to such data, the location of the voxels are transformed into the space of the ORT CS. A translation vector is determined and applied to vary the final, rendered position of the individual quadrangles. Effects similar to the application of discontinuous ORTs as discussed can be achieved with the application of linearly attenuated plane-relative displacement functions (refer to FIG. 13). Referring to FIG. 47, there is shown a sequence of diagrams 4700 illustrating the application of a vertical-plane source ORT to CT data of a human skull rendered via fast-splatting 4710. Such ORTs have the effect of producing a "cut-into and retract" incision into the interior of the volume. The extent of the incision can be limited or modified by a shaping function to achieve a more constrained effect as discussed above. The reason for the use of plane relative incisions here, rather than simply employing sight-line as with more discrete forms of data, is that the "real-world" meaning of a point incision, stretched out large enough to provide any internal visual access, is difficult to establish. The interior, or bounding, surface of a line-relative incision would be formed by the intersection of a single ray with the volume data and would not reveal much meaningful visual information. Conversely, the application of a plane-relative displacement function produces incisions which have interior surfaces 4720 produced by the intersection of the source plane and the volume data. These cut surfaces carry much more useful information and provide a virtual approximation of a real-world incision.

There are some visual effects that the simple transformation of the splat-producing quadrangles produces as they are rendered. As quadrangles are "pushed aside" to make an incision into the representation they have a tendency to pile-up and overlap more than they did in the original data layout. The effect of this increasing overlap is that in these regions there are additional contributions to the compositing process achieved with, for example, the OpenGL-TM blending mechanism. This results in increased intensity of the color of the volume data in these regions. In other words, the surfaces at the edge of the cut are brightened 4730. Anisotropic scaling of the quadrangles in the regions of compression around the ORT can be applied to reduce or eliminate this effect.

Figure 48:
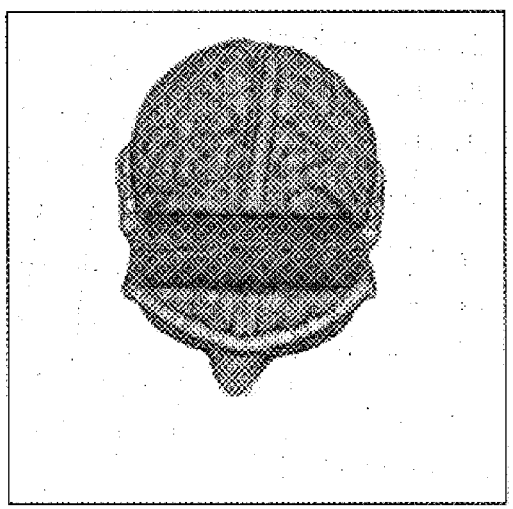
FIG. 48 is a sequence of diagrams illustrating the application of a horizontal-plane ORT to the UNC Head data set in accordance with another embodiment.
Figure 48:
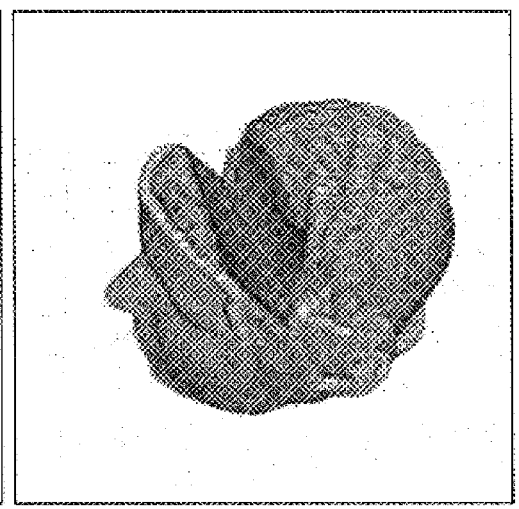
Figure 49:
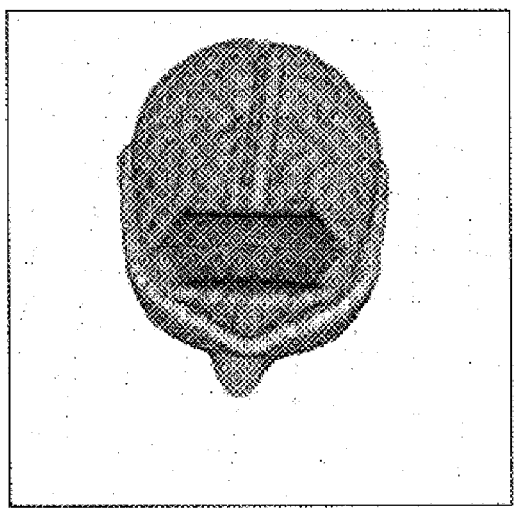
FIG. 49 is a sequence of diagrams illuming the application of a horizontal-plane ORT to the UNC Head dam set wherein the extent of the function across the plane is truncated and the function is also scaled linearly in depth to produce a wedge effect in accordance with another embodiment.
Figure 49:
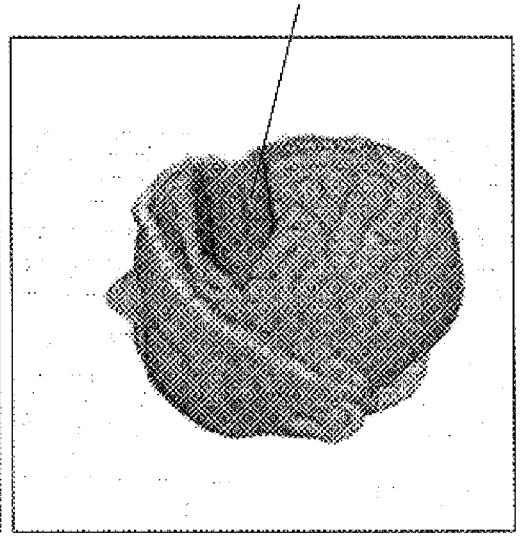
Figure 50:
FIG. 50 is a sequence of diagrams illustrating the application of a plane-relative ORT to the Visible Human Female data set wherein the ORT is scaled in depth from the front to the back of the data set rather than from the front of the region of interest in accordance with another embodiment.

In FIGS. 48 through 50, examples of the application of ORTs to volumetric data rendered with the fast-splatting algorithm are illustrated. Referring to FIG. 48, there is shown a sequence of diagrams 4800 illustrating the application of a horizontal-plane ORT to the "UNC Head" data set. In FIG. 48(a), the ORT is aligned to the viewpoint. In FIG. 48(b), the representation is rotated without updating the viewpoint of the ORT in order to highlight the linear scaling of the application of the ORT in view-aligned depth. The ORT is scaled in depth from the front of the representation to the depth of the region of interest. Referring to FIG. 49, there is shown a sequence of diagrams 4900 illustrating the application of a horizontal-plane ORT to the "UNC Head" data set wherein the extent of the function across the plane is truncated and the function is also scaled linearly in depth to produce a wedge effect 4910. In other words, a shaping curve has been added to control the extent of the ORT operator across the horizontal plane. Referring to FIG. 50, there is shown a sequence of diagrams 5000 illustrating the application of a plane-relative ORT to the "Visible Human Female" data set wherein the ORT is scaled in depth from the front to the back of the data set rather than from the front to the region of interest.

3D Texture-Based Rendering. The advent of high speed texture mapping hardware has made the application of 3D texture-based rendering technology practical for use as a method of direct volume rendering. Typically, data is first converted into a 3D texture map with a one-time application of a transfer function to determine the red, green, and blue values as well as opacity. Color and opacity are thus stored in the 3D texture map. The texture map is applied to many parallel polygonal planes, each plane sampling a slice through the texture. The texture coordinates are specified for the corners of the planes and the texture mapping hardware interpolates the texture coordinates across the plane in three-dimensions. There are two means of relating the polygons to tie 3D texture (i.e. the data volume). Either the texture planes may be aligned with the principle axes of the data and move (rotate/translate) with the data or the planes may remain aligned parallel to the projection plane and the texture coordinates alone are moved (translated/rotated) in order to view the data from a different position. In general, more parallel planes sampling the 3D texture will result in a higher quality image whereas less planes yields higher rendering speeds. The advantage of this method is that once all of the data has been downloaded into texture memory, and the polygons transformed, the graphics hardware is capable of performing all slice rendering and the composition of the images. The disadvantages are the restriction to rectilinear volumes and the relatively small texture sizes that can be accommodated in texture memory at one time. The process of bricking (breaking the volume up into smaller texture regions and then loading them into texture RAM and rendering them sequentially) permits the use of this technique to render larger volumes. It also provides a method of optimizing the rendering process in that by constructing bricking layouts that eliminate regions of the original data set that are empty. These regions are then not rendered and hence no time is lost in computing the texture coordinates and compositing in rendered pixels where no volume elements are present.

Figure 51:
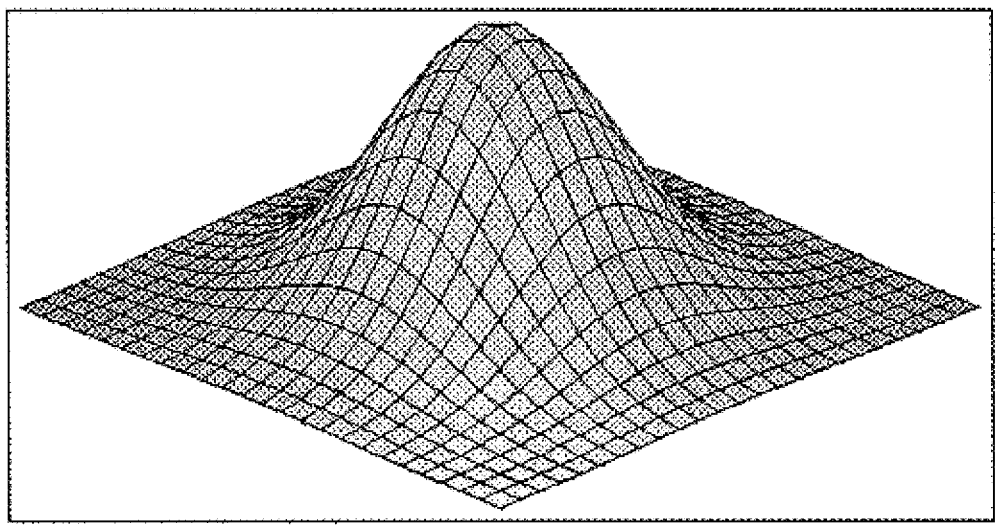
FIG. 51 is a diagram illustrating a Gaussian function in accordance with another embodiment.
Figure 52:
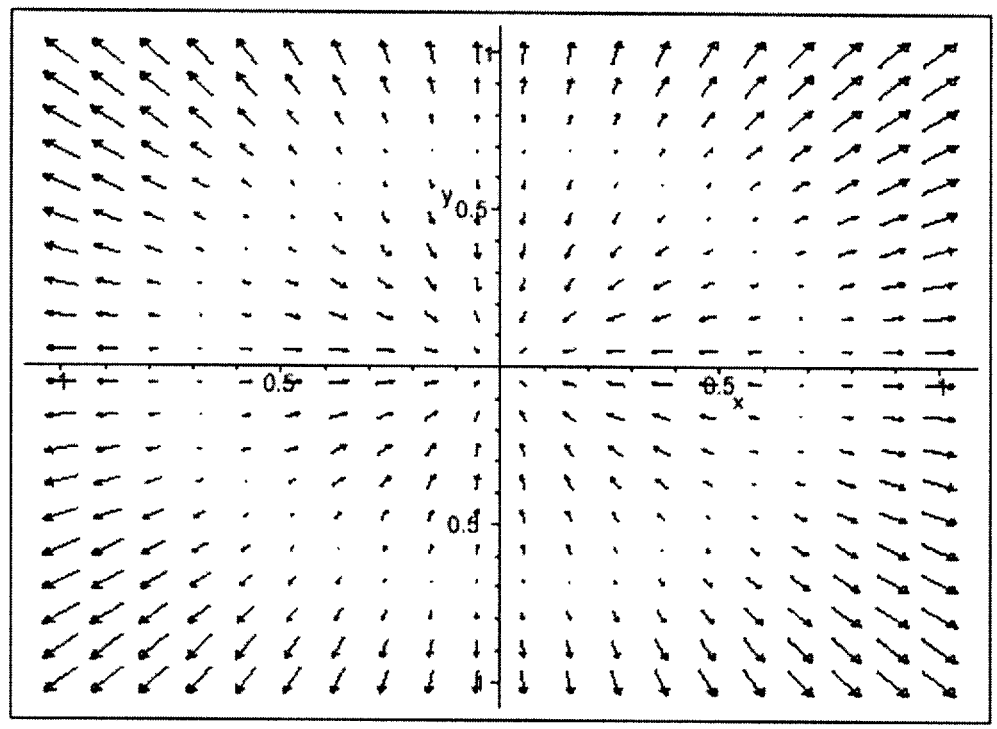
FIG. 52 is a diagram illustrating the Hessian of the Gaussian function of FIG. 51 in accordance with another embodiment.
Figure 53:
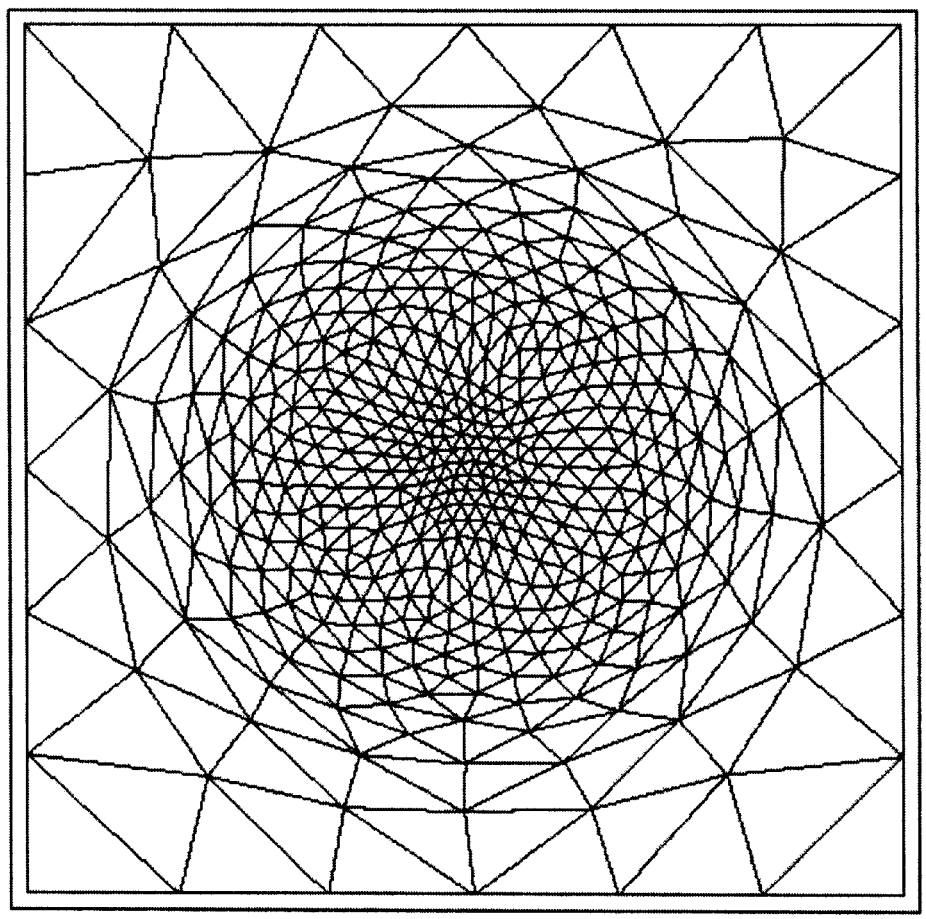
FIG. 53 is a diagram illustrating an anisotropic mesh aligned to the Hessian of FIG. 52 in accordance with another embodiment.

In order to provide a means of producing ORTs which result in the apparent cutting-into effect described above, a division of the texture sampling surfaces which provides additional vertices in the regions where displacements will occur must be provided. This may be accomplished by fitting a mesh to a function that describes the shape of the displacement function. The method for anisotropic mesh generation described by Bossen (Bossen, Frank J., *Anisotropic Mesh Generation with Particles,* Technical Report CMU-CS-96-134, CS Dept., Carnegie Mellon University, May 1996), which is incorporated herein by reference, provides a means of producing a tessellation of the plane that fits the geometry of the triangulation to a space defined by the Hessian of the function. The Hessian is the matrix of the second partial differentials of a function. Using the methods presented by Bossen, et al. Bossen, Frank J. and Paul S. Heckbert, *A Pliant Method for Anisotropic Mesh Generation,* in 5th Intl. Meshing Roundtable, pages 63–74, October 1996), which is incorporated herein by reference, meshes may be generated which provide a region of increased detail around a point of interest and conform to the shape of the Hessian of a Gaussian function centered at that point. Referring to FIG. 51, there is shown a diagram 5100 illustrating the Gaussian function $f(x,y)=e^{-10.0x^2-10.0y^2}$. Referring to FIG. 52, there is shown a diagram 5200 illustrating the Hessian of the Gaussian function $f(x,y)=e^{-10.0x^2-10.0y^2}$. And, referring to FIG. 53, there is shown a diagram 5300 illustrating an anisotropic mesh aligned to the Hessian of the Gaussian function $f(x,y)=e^{-10.0x^2-10.0y^2}$.

Figure 54:
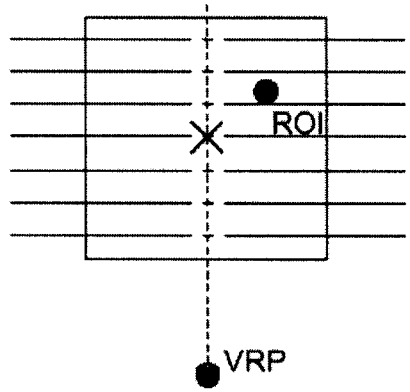
FIG. 54(a) is a diagram illustrating sampling planes aligned to the data space axis in accordance with another embodiment.
FIG. 54(b) is a diagram illustrating sampling planes centered on the sight-line in accordance with another embodiment.
Figure 54:
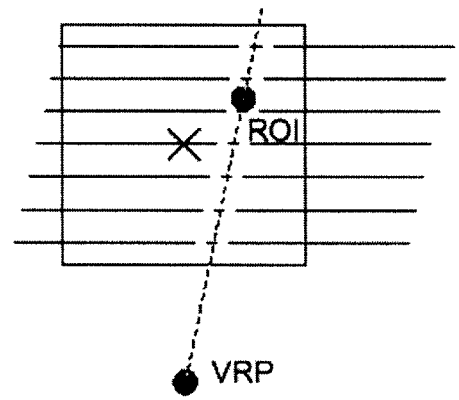

Typically, the method of rendering volumes using 3D texture mapping hardware involves rotating the texture sampling planes such that they remain perpendicular to the view direction. This may be used for the generation of ORTs as follows. If a single tessellated mesh is created which provides the desired geometrical detail for manipulation of the volume, rather than simply lining all of these planes up and centering them on the view direction vector through the volume, then the planes can be positioned so that they are centered on the sight-line through the point of interest. Referring to FIG. 54, there are shown diagrams 5410, 5420 illustrating alternate sampling plane alignments. In FIG. 54(a), the sampling plans are aligned to the data space axis. In FIG. 54(b), the sampling planes are centered on the sight line.

Interestingly, an optimization is possible for 3D texture-based rendering that was not possible in the above-described method of applying ORTs to fast-splatted volumetric data. If the maximum deformation of one plane by the ORT is determined, then from this determination the state of all of the remaining texture sampling planes can be derived. The state of any plane can be derived by interpolating between the state of the initial plane and the maximally deformed plane to the appropriate state. In this manner, functions can be produced that are constant, truncated, or tapered with varying depth in the ORT coordinate system, all from the state of two texture sampling planes.

As with the fast-splatting method of rendering volumes, here too the application of a linear-source function is questionable. The first issue arises around introducing a symmetric hole into the tessellated surface and the subsequent rearrangement of texture coordinates to accommodate the hole as it grows. Again the result would be a tube, the inner boundary of which would simply be the series of voxels that a given ray intersected on its path through the volume. This would convey little meaningful information. One possibility solution may be termed a "colored balloon" approach to introducing a hole into the tessellated surface. In this case, triangles whose edges are stretched by the deformation have their contribution to the composition operation reduced by decreasing their "alpha" proportionally. Thus, triangles that are stretched become increasingly transparent. The most significant problems with this method are that it results in an inner boundary to the distortion which is fuzzy and indistinct and that it results in the removal of some information from the display. If information removal was deemed acceptable then the timing of the tessellation to produce a hole would result in clearer imaging of the interior boundary of the deformation and the result would be something like a CSG operation removing a sub-volume of data from the final image. This would still have the advantage that the removed regions would track the viewpoint as the representation is manipulated and the regions of interest are moved within the volume.

Consider now the application of plane-relative deformations of the volume data set. As with fast-splatting these deformations produce the appearance of an incision into and retraction of material in the representation. No data is removed in this manner, rather, it is merely pushed aside in order to produce interior visual access aligned to the current viewpoint.

Figure 55:
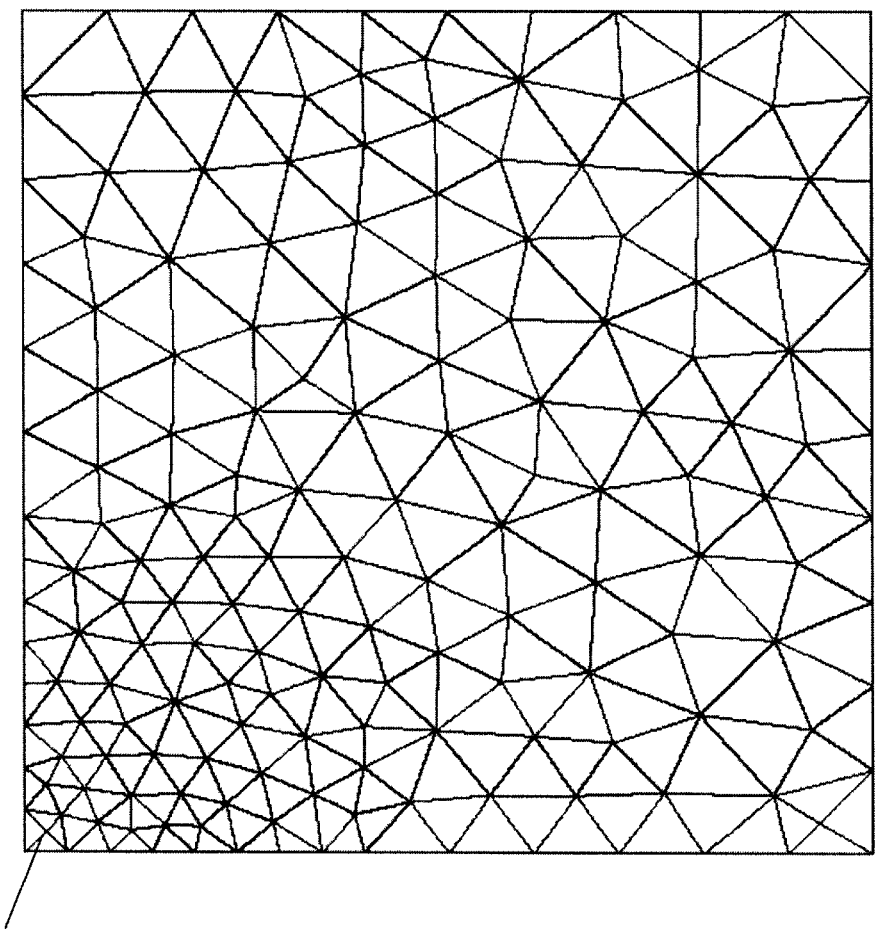
FIG. 55 is a diagram illustrating an increase in triangulation density in accordance with another embodiment.

In moving from a linear-source to a plane-source, the way in which the texture sampling planes are arranged can be modified by replacing each single plane with four quarter-planes where these four planes cover the four quarters of the original plane. The tessellation pattern can also be changed to provide increased geometrical detail in the inner comer of the quarter-plane which will be adjacent to the line of sight through the region of interest in this revised scheme. Referring to FIG. 55, there is shown a diagram 5500 illustrating an increase in triangulation density in the inside comer 5510 where ORT displacements will occur. This minimizes the extent of linear interpolation of texture coordinates.

Figure 56:
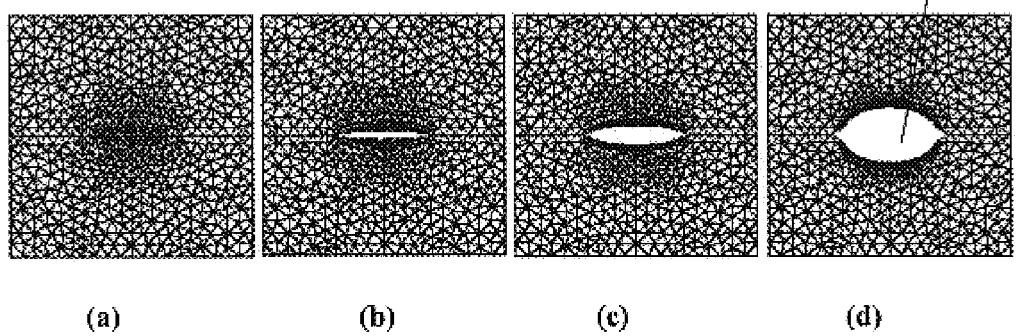
FIG. 56 is a sequence of diagrams illustrating the reflection of quarter planes in accordance with another embodiment.

All of the benefits of reduced computation of deformations remain true for the use of quarter planes. In particular, computation of vertex deformations now need only be performed for the maximum deformation of one quarter plane, the remaining three being rendered by reflection of the first quadrant. Referring to FIG. 56, there is shown a sequence of diagrams 5600 illustrating this effect. Mirroring the single deformed texture sample plane allows for the creation of a closed empty region in the middle of the plane 5610. Texture sampling coordinates are also determined for only one plane and the remaining three planes obtain the correct texture coordinates by manipulation of, for example, the OpenGL-TM texture coordinate transformation matrix. This use of geometrical transformations allows for the generation of an entire slice from a mesh covering only one quadrant.

Figure 57:
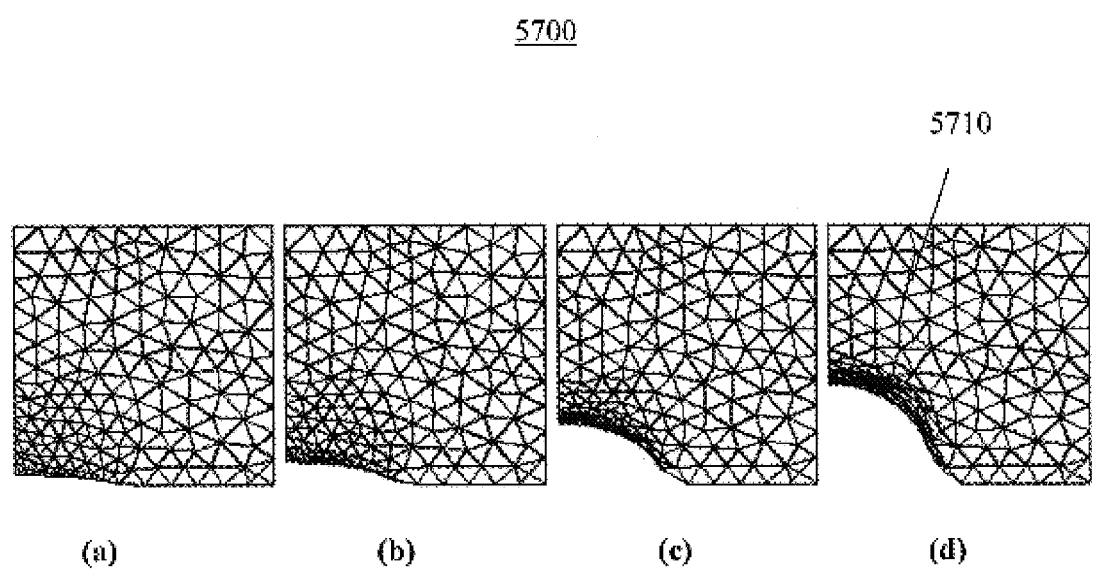
FIG. 57 is a sequence of diagrams illustrating the introduction of a semi-circular deformation of a texture sampling mesh in accordance with another embodiment.

As described above, the profile of the ORT in depth and in the plane perpendicular to the view direction can be modified. This allows an ORT to be produced that is spatially constrained across the field of view. Using a hemispherical profile as a shaping envelope, ORTs can be produced that resemble incision and retraction operations on the volume data. Referring to FIG. 57, there is shown a sequence of diagrams 5700 illustrating the introduction of a semi-circular deformation of the texture sampling mesh by deforming vertices along the y-axis. The inner boundary of the ORT surface is formed by the intersection of the ORT source plane with the volume data. The use of quartered texture sampling planes 5710 means that there is a pre-defined break in the geometry at the location of this intersection and this obviates the complexity of dynamically re-triangulating the texture sampling planes.

Figure 58:
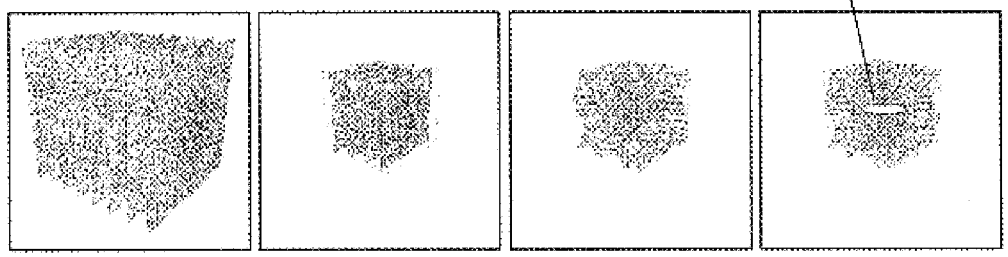
FIG. 58 is a sequence of diagrams illustrating the clipping of tessellated texture sampling planes and their rotation perpendicular to the viewer in accordance with another embodiment.

Now, having developed a method for the construction of suitable geometrical sampling surfaces it is necessary to integrate these polygonal primitives with the 3D texture data in order to produce the volume rendered image. An OOI may be located anywhere within the bounds of the volume data, and the volume data may be oriented arbitrarily with respect to the viewer. The described method of centering the texture sampling planes on the line of sight from the viewer and through he OOI means that the sampling planes must be scaled sufficiently large enough to encompass the data volume in the most extreme combinations of OOI position and orientation. For example, consider an OOI in one corner of the data and an orientation of the data with rotations of 45 degrees in two axes to the viewer, such that a vertex of the data volume points towards the viewer. In this configuration the projection of the data volume is maximized in width, height, and depth. The dimension of a single texture sampling plane must then be the maximum diagonal across the data set and the stack of texture sampling planes must span that same distance in depth. In general, this means that a large portions of the area of each texture sampling plane falls outside of the boundaries of the data volume. Rather than wasting computational effort performing pixel-fill operations in these areas, clipping planes (rotated appropriately to account for the orientation of the viewer and data volume) can be applied to trim the stack of sampling planes to the bounds of the data volume in a manner similar to that describe by Wilson, et al. (Wilson, Orion, Allen VanGelder, and Jane Wilhelms, *Direct Volume Rendering Via 3d Textures,* Technical Report UCSC-CRL-94-19, University of California, Santa Cruz, Jack Baskin School of Engineering, June 1994), which is incorporated herein by reference. Referring to FIG. 58, there is shown a sequence of diagrams 5800 illustrating the clipping of tessellated texture sampling planes and their rotation perpendicular to the viewer. OpenGL-TM, for example, clipping planes are used to trim the texture planes to the boundaries of the volume presentation space. In FIG. 58(*d*), the addition of the effect 5810 of an ORT function to the planes is illustrated.

The texture coordinates for each of vertex in a given texture sampling plane are computed based on the position and orientation of the plane within the data volume. These coordinates are determined for the vertices in their original, un-deformed configuration.

Figure 59:
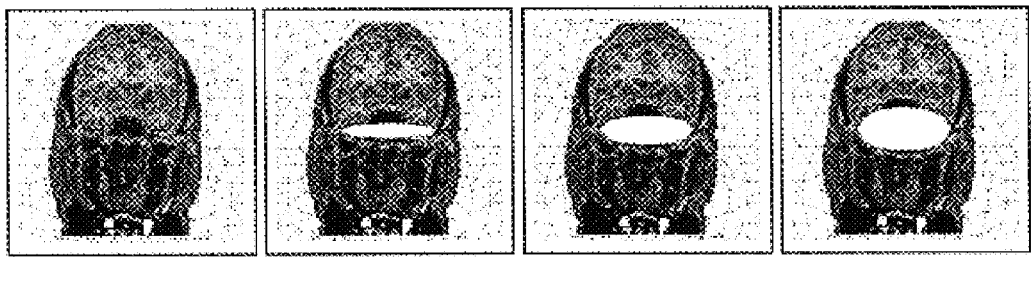
FIG. 59 is a sequence of diagrams illustrating the progressive application of an ORT to produce a horizontal, shaped opening in a single plane in a volumetric representation in accordance with another embodiment.
Figure 60:
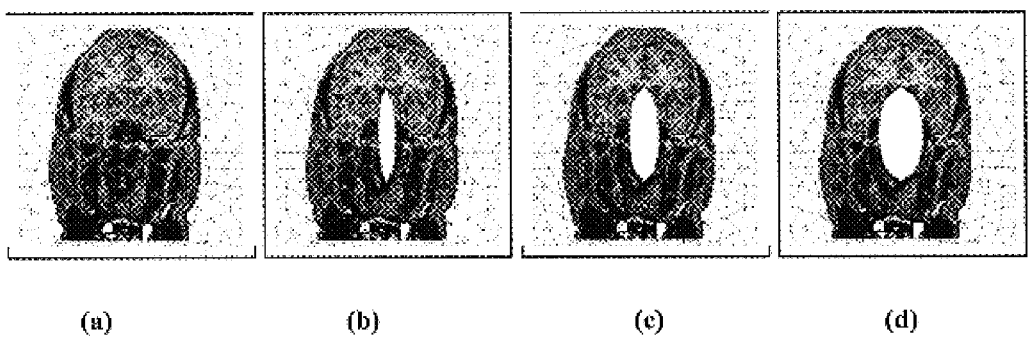
FIG. 60 is a sequence of diagrams illustrating the progressive application of an ORT to produce a vertical, shaped opening in a single plane in a volumetric representation in accordance with another embodiment.
Figure 61:
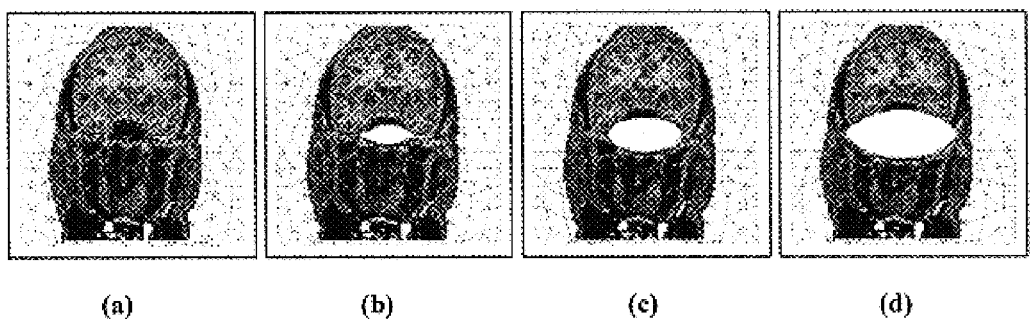
FIG. 61 is a sequence of diagrams illustrating enlargement of a horizontal ORT in a single slice of a volumetric data set by increasing the width of the shaping function in accordance wit another embodiment.
Figure 62:
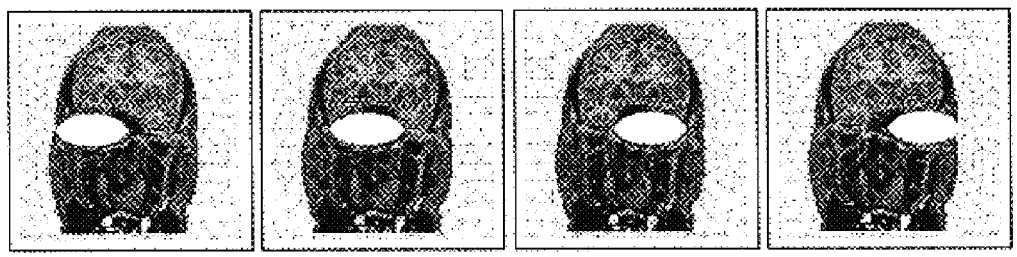
FIG. 62 is a sequence of diagrams illustrating the manipulation of the texture transformation matrix so that as the intersection of the sampling planes is moved across the presentation space the texture space remains stationary in accordance with another embodiment.

These same coordinates are used in the application of texture to the deformed planes resulting from the application of an ORT operator. The result is Mat the data from the original position of the vertex is pulled to the deformed position. Rather than explicitly deforming each of the volume data elements as with fast-splatting, an interpolated result can be achieved between the vertices of each element of the triangular mesh. Appropriate application of ORT operators and modification of the texture transformation matrices allows for the creation of horizontal or vertical bounded or unbounded plane-relative incisions into the volume data. Referring to FIG. 59, there is shown a sequence of diagrams 5900 illustrating the progressive application of an ORT to produce a horizontal, shaped opening in a single plane in a volumetric representation. Referring to FIG. 60, there is shown a sequence of diagrams 6000 illustrating the progressive application of an ORT to produce a vertical, shaped opening in a single plane in a volumetric representation. Referring to FIG. 61, there is shown a sequence of diagrams 6100 illustrating enlargement of a horizontal ORT in a single slice of a volumetric data set by increasing the width of the shaping function. Furthermore the movement of the OOI is accomplished by the movement of the textured plane and the counter translation of the texture coordinates, maintaining the volume data position. Referring to FIG. 62, there is shown a sequence of diagrams 6200 illustrating the manipulation of the texture transformation matrix so that as the intersection of the sampling planes is moved across the presentation space the texture space remains stationary.

Figure 63:
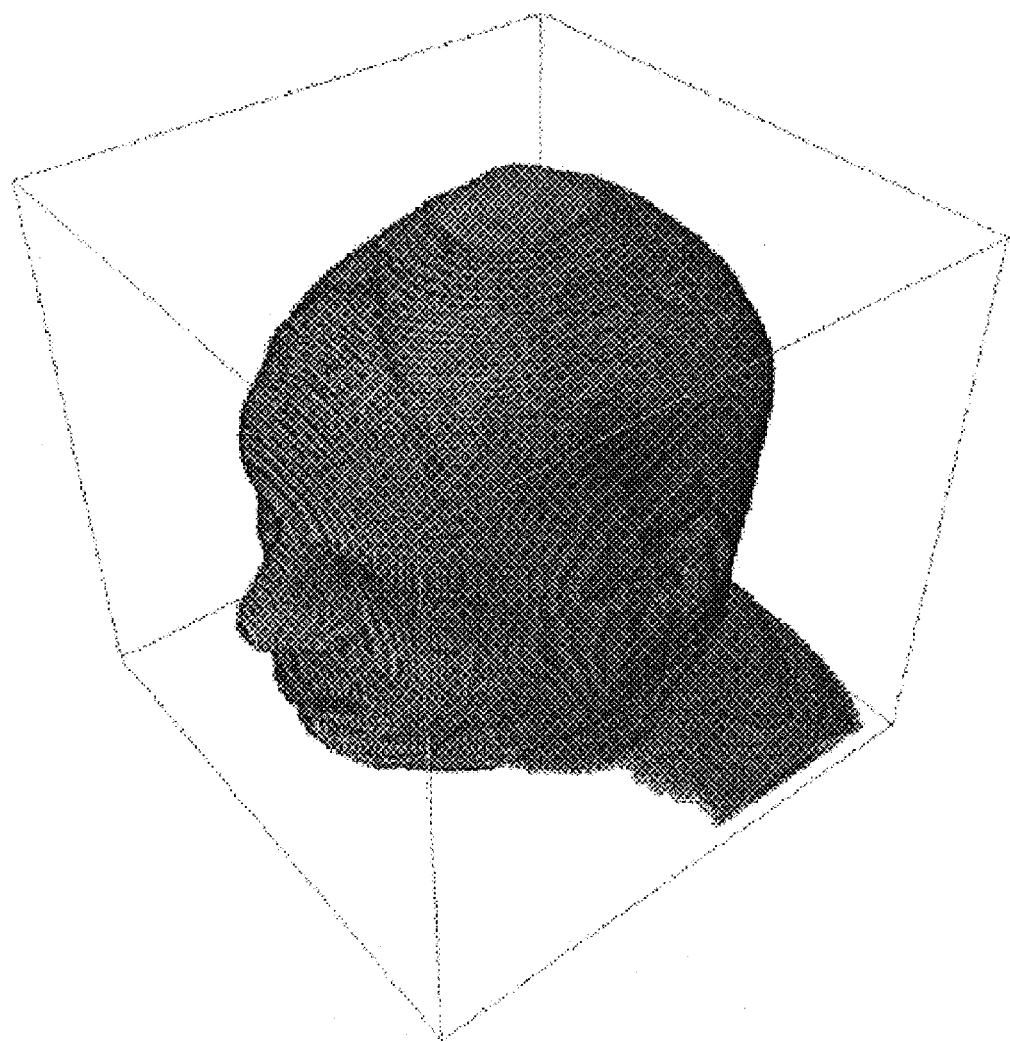
FIG. 63 is a diagram illustrating the Visible Human Male data set rendered via 3D texture slicing in accordance with another embodiment.
Figure 64:
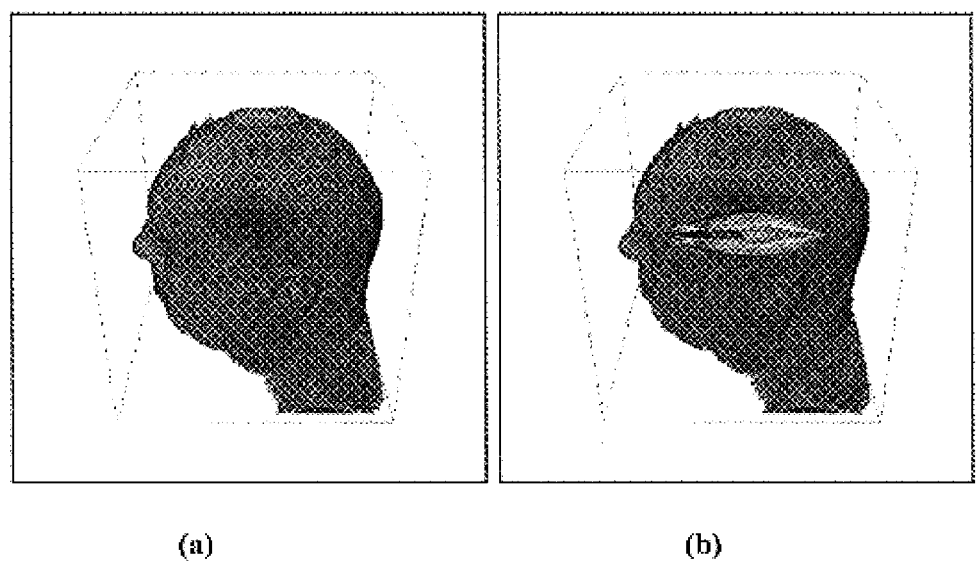
FIG. 64 is a sequence of diagrams illustrating the application of a bounded, linearly-truncated, plane-relative, horizontal ORT to the Visible Human Male data set in accordance with another embodiment.

The effect of ORT functions may be illustrated on the head of the "Visible Human Male" data set. Referring to FIG. 63, there is shown a diagram 6300 illustrating the Visible Human Male data set rendered via 3D texture slicing, FIG. 63 represents the initial state. Referring to FIG.

Figure 65:
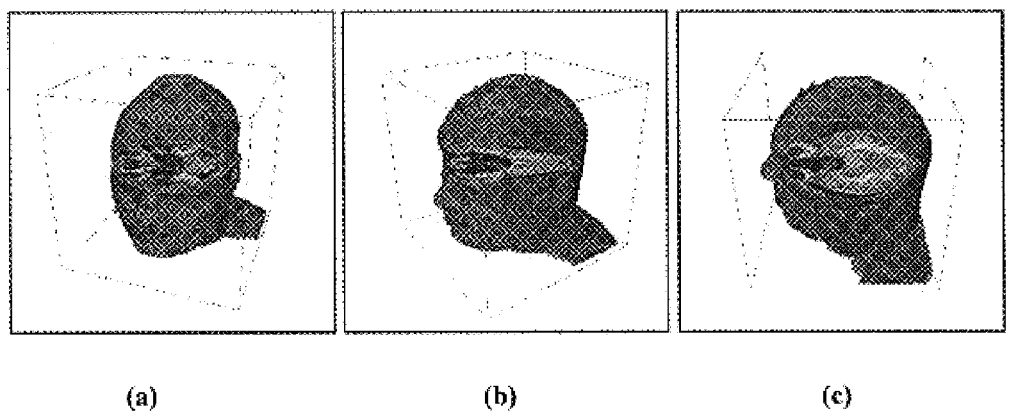
FIG. 65 is a sequence of diagrams illustrating the rotation of Visible Human Male head in place, from the front to the left side, while a horizontal ORT function provides visual access to an area behind and between the eyes in accordance with another embodiment.

64, there is shown a sequence of diagrams 6400 illustrating the application of a bounded, linearly-truncated, plane-relative, horizontal ORT to he Visible Human Male data set. The OOI is behind the left eye and the effect of the ORT is to reveal two cut-surfaces aligned to the viewpoint without the removal of data. Referring to FIG. 65, there is shown a sequence of diagrams 6500 illustrating the rotation of the Visible Human Male head in place, from the front to the left side, while a horizontal ORT function provides visual access to an area behind and between the eyes.

Figure 66:
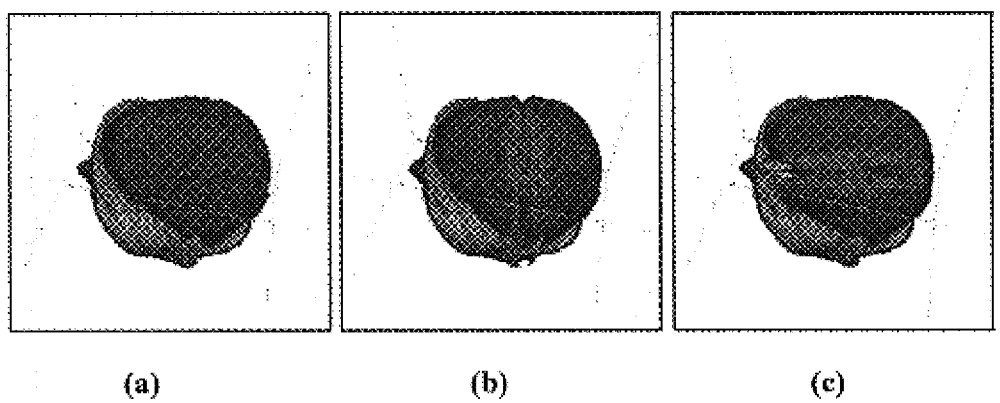
FIG. 66 is a sequence of diagrams illustrating the UNC Head CT data set to which vertically and horizontally aligned ORT functions have been applied to reveal cut surfaces aligned to the current viewpoint in accordance with another embodiment.

Now, consider the application of ORTs to the "UNC Head CT" data set. Referring to FIG. 66, there is shown a sequence of diagrams 6600 illustrating the UNC Head CT data set to which vertically and horizontally aligned ORT functions have been applied to reveal cut surfaces aligned to the current viewpoint. Arbitrary orientations between horizontal can be obtained by rotating the up vector used in the construction of the ORT coordinate system and rotating the texture sampling planes around the sight-line to accommodate the new configuration.

The method described above applies to a single region of interest or OOI in the volume representation and corresponding ORT. Having a single ORT source means that the texture sampling planes can be arranged along that source by shearing their positions to center them on the sight-line through the point of interest. To extend the system and to provide support for multiple regions of interest and ORTs, some of the efficiencies described may have to be abandoned. Since the location of the intersection of multiple ORTs with each successive texture sampling plane would diverge with movement away from the viewer, a single tessellation of these planes can not be employed that provides additional geometrical detail in specifically the right places in all planes. Rather, a compromise solution of sufficient detail throughout the plane is possible. Each of these planes would have to by dynamically intersected by the ORT source planes and cut and re-triangulated at the line of intersection. Interestingly, the fast-splatting method requires no such extension to account for multiple ORTs since it is essentially a very dense example of the same methods that are applied to render discrete models.

Figure 67:
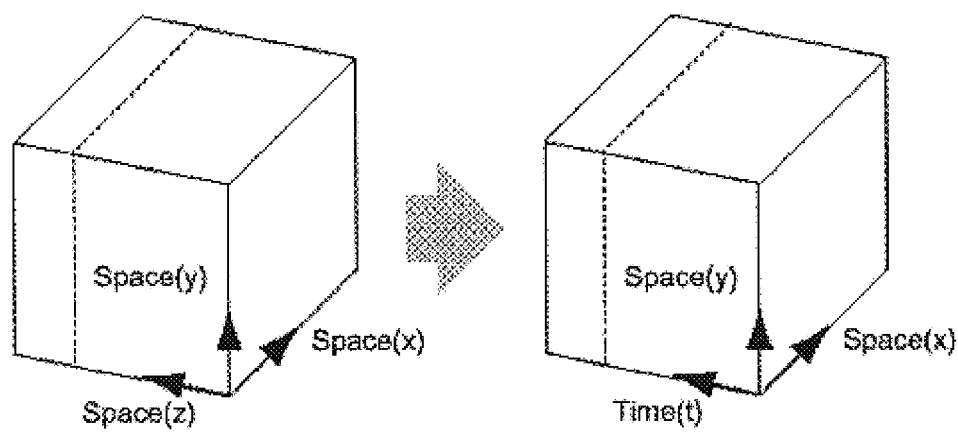
FIG. 67 is a sequence of diagrams illustrating the arrangement of spatio-temporal data as a 3D cube in accordance with another embodiment.
Figure 68:
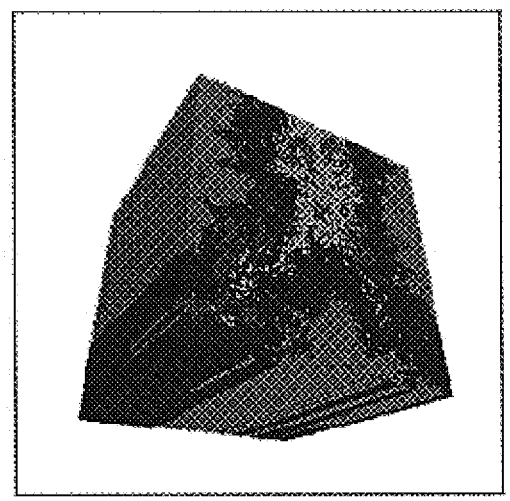
FIG. 68 is a sequence of diagrams illustrating a block of spatio-temporal landscape data and an ORT operator applied to reveal the state of the landscape at an instant in time in accordance with another embodiment.
Figure 68:
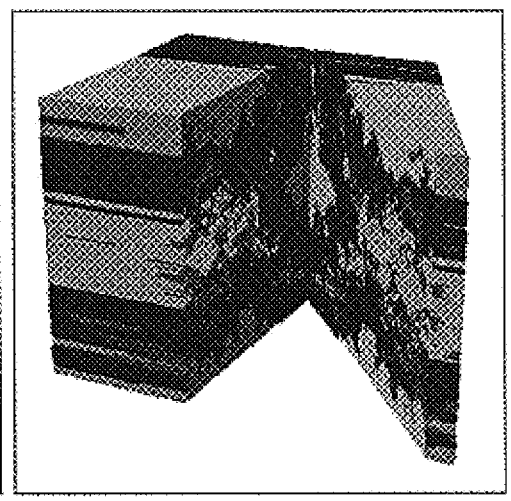

Temporally Sequential 2D Information. Another source of 3D information is the change in a 2D information layout through time. A 3D layout of such information is possible when temporal sequence is employed as one of the spatial axes. Referring to FIG. 67, there is shown a sequence of diagrams 6700 illustrating the arrangement of spatio-temporal data as a 3D cube by using a spatial axis to represent time. In FIG. 67, 2D-over-time data is arranged to form a 3D cube. This method has been employed for the display and exploration of spatio-temporal landscape data. One of the metaphors employed for interaction with such 2D-over-time information is that of a flip-book. The data is presented as a cube, where 2 axes represent space and the third time. By cracking the cube open perpendicular to one of these axes two interior faces are revealed, representing adjacent slices through the data. Referring to FIG. 68, there is shown a sequence of diagrams 6800 illustrating a block of spatio-temporal landscape data and an ORT operator applied to reveal the state of the landscape at an instant in time. If the cube is split perpendicular to the temporal axis, then the faces display the state of two spatial dimensions across a step in time at the position of the split. If the cube is split across one of the spatial axes, then the changes along a line across the landscape through time are revealed.

Figure 69:
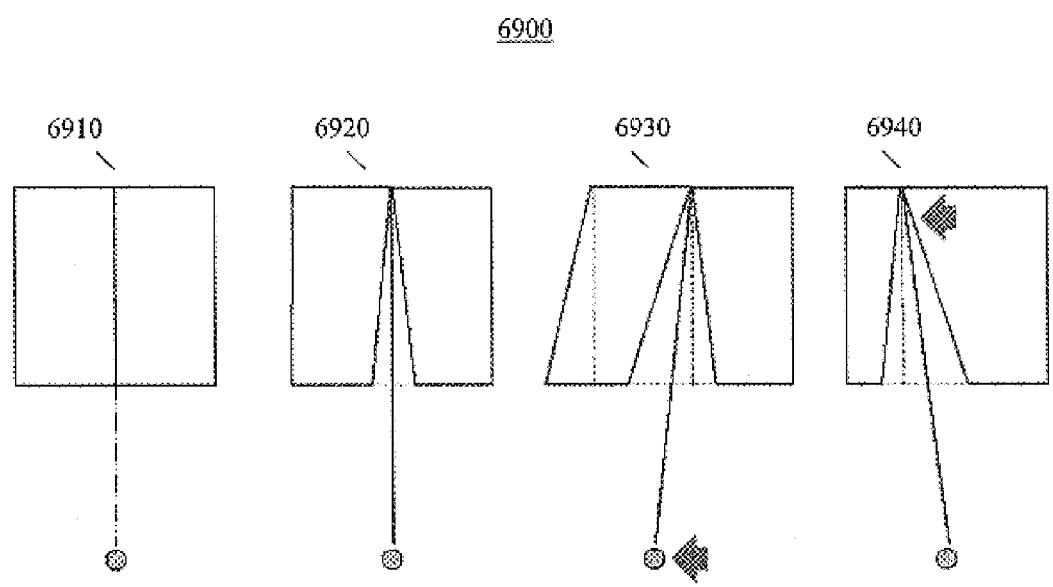
FIG. 69 is a sequence of diagrams illustrating the positioning of a split in a data-cube, applying an ORT operator to reveal two internal faces, repositioning the viewpoint to obtain a more perpendicular view of the right face, and selecting a new point at which to position the split in accordance with another embodiment; and, FIG. 70 is a sequence of diagrams illustrating the operation of a book mode ORT with a hardcover appearance in accordance with another embodiment.

An operator derived from the ORT can be applied to the interaction of a user with this display metaphor in order to maintain the visibility of the open pages of the book. The application of an ORT means that each of the two faces will remain visible from the viewpoint during manipulation of the split position or navigation of the viewpoint. Referring to FIG. 69, there is shown a sequence of diagrams 6900 illustrating the positioning of a split in a data cube 6910, applying an ORT operator to reveal two internal faces 6920, repositioning the viewpoint to obtain a more perpendicular view of the right face 6930, and selecting a new point at which to position the split 6940. Adjusting the position of the opening reveals a new point in time or space, while the viewpoint may be repositioned in order to obtain a clearer view of one face by orienting it perpendicular to the viewer.

The ORT operator takes into account the position and orientation of the data cube, the opening in the cube, and the position of the viewpoint. The ORT can be modified so that the splitting plane across the cube forms the source of the ORT operator, regardless of the relative position of the viewpoint. A line from the intersection of this plane with the far side of the datacube to the viewer becomes a tool for the determination of the degree to which to apply the ORT function. If the viewpoint lies on the plane splitting the cube, then a relatively small degree of distortion reveals the two inner faces of the split. If the viewpoint lies away from the splitting plane, then the degree of the ORT function is increased such that this sight-line lies between the two open face.

Figure 70:
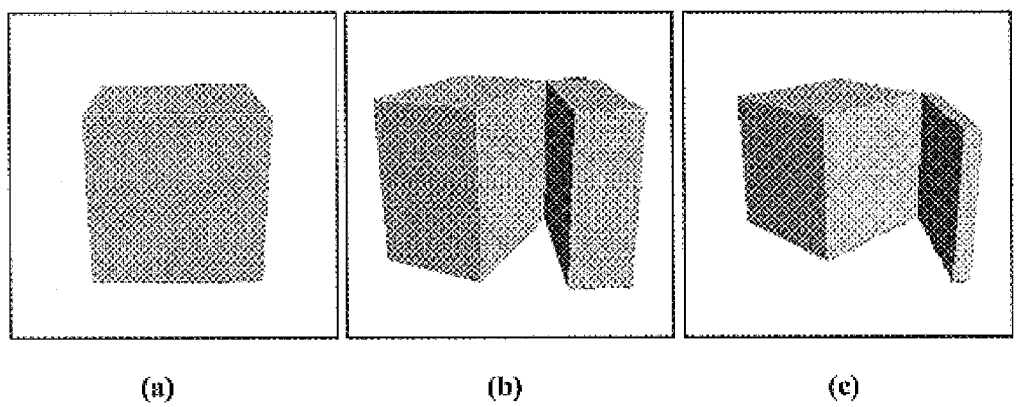

Two modes of operation are possible in this book-like configuration of an ORT. These can be identified by their similarity to the manner in which hard cover and soft cover books behave. In operating as a "softcover" book, the two sections of the cube formed by the split are sheared away from the viewpoint and the near faces of these halves may become compressed, the far face of the cube remains planar. In operating as a "hardcover" book, the two sections of the cube are rotated about the intersection of the splitting plane with the far side of the cube. Referring to FIG. 70, there is shown a sequence of diagrams 7000 illustrating the operation of the book mode ORT with a hardcover appearance. In this case the two sections are not sheared, their near faces do not compress and the far face is broken into two across the bend.

In each mode the relative sizes of the two sections produced by the split provides information about the relative position within the dataset in a manner that is familiar to a user's experience with physical books. Animating the turning of pages as the position of the split is adjusted can also be employed to further support the book metaphor. Browsing through such a structure by moving the splitting plane supports task such as examining the structural changes in a landscape over time.

Additional Applications. The method of the present invention may be used in the following additional applications: to obtain an unobstructed view of a particular inventory item or other stored object in an electronic display or print-out of the contents of a storage facility where objects are placed in three dimensional storage, such as rows of shelves arranged in isles of a warehouse or shipping vessel; to obtain an unobstructed view of a particular person in an electronic display or other display of a group of people; to obtain an unobstructed view of a component within a 3D mechanical design or engineering drawing, such as, but not restricted to, a design of an automobile engine; and, to obtain an unobstructed view of a node in a 3D network topology such as that of a computer network.

To reiterate and expand, the present invention provides a framework with which to describe transformations on a data layout. The effect of these transformations on a layout is distinct from a change of the layout itself. Supporting the perception of these transformations as such is an important aspect in their effective application. As with 2D layout adjustment approaches, an understanding of the effect these operators have on a structure can be supported in a number of ways. If the structure is initially very regular, for example 9×9×9 grid graph, then the effect of the ORT on the layout is readily apparent, even in a single still image. If the structure of the data is more random, for example a molecular model, then the effect of the adjustment performed by the ORT may not be so readily apparent. In these situations the addition of a secondary, more regular, structure to the presentation can aid in the perception of the distinct effect of the ORT. For example, the path of the bonds in a molecular model can be bent under the influence of an ORT to provide additional clues as to the role of the layout adjustment operator on the original structure. ORT operators support constrained layout adjustments which leave substantial parts of the original data layout intact. Further properties such as color, scale, and orientation of components remain invariant under the effect of an ORT. Other properties of groups of components such as co-planarity may not be preserved, although maintenance of orthogonal ordering is supported.

Comprehension of these distorted layouts may be supported by a number of different mechanisms and properties of the distortions themselves. As in EPS technology, these distortions support both the concepts of reversibility and revertability. Revertability is the understanding that two states are related and that one can effect manipulations to move from one to the other and back while reversibility is the idea that two states are in some way equivalent. The ability to move between the original and distorted states of the layout is an important aspect in supporting understanding through these mechanisms. The fact that the adjustment of the layout is spatially constrained and that as the viewpoint moves different regions enter and exit the area of this influence further supports the perception of revertability. This ability to move the viewpoint or re-orient the layout leads to the generation of motion fields through the movement of individual features of the structure. The interaction of the ORT with the initial layout overlays a second set of motion vectors. These additional motion cues surround the area of interest but do not affect the actual OOI, at the source of the ORT. This isolation of the focal object in a secondary motion field may serve to further emphasize the location of the object of interest.

Finally, while detail-in-context displays of 2D information representations may be extended to 3D information spaces, the prior art techniques do not deal directly with the problem of occlusion of objects of interest with occurs in 3D representations. In addition, prior art approaches to reducing occlusion in 3D do not produce detail-in-context results. The present invention provides a layout adjustment approach for creating 3D detail-in-context views, derived from 2D oriented techniques, that addresses the unique challenges of 3D.

Although the invention has been described with reference to certain specific embodiments, various modifications thereof will be apparent to those skilled in the art without departing from the spirit and scope of the invention as outlined in the claims appended hereto.

The embodiments of the invention in which an exclusive property or privilege is claimed are defined as follows:

1. A method for generating a presentation of a region-of-interest in a three-dimensional information representation for display on a display screen comprising: establishing a viewpoint for said region-of-interest; establishing a path between said viewpoint and said region-of-interest; and, displacing regions in said information representation away from said path according to a transformation function to locations within said information representation where substantially all of said regions displaced remain visible and do not occlude said region-of-interest when viewed from said viewpoint, wherein said transformation function is constrained by a shaping function to control displacement of said regions.

2. The method of claim 1 wherein, for each of said regions, said displacing includes: calculating a direction vector between a region and a nearest point on said path, said direction vector having a direction and a magnitude; calculating a displacement vector having said direction and having a displacement vector magnitude given by said magnitude, said transformation function, and said shaping function; and, displacing said region in said direction a distance given by said displacement vector magnitude.

3. The method of claim 2 wherein said displacement vector magnitude is defined by a distance metric.

4. The method of claim 3 wherein said distance metric is Euclidean.

5. The method of claim 3 wherein said distance metric is Lp.

6. The method of claim 3 wherein said distance metric is super-quadratic.

7. The method of claim 3 wherein said distance metric is user-defined.

8. The method of claim 2 wherein said transformation function displaces said regions proximate said path further than said regions distal said path, wherein said displacement vector magnitude decreases smoothly from said proximate regions to said distal regions, and wherein said distal regions furthest from said path are not displaced.

9. The method of claim 1 wherein said transformation function includes a detail-in-context distortion function.

10. The method of claim 9 wherein said region-of-interest is a focus of said detail-in-context distortion function.

11. The method of claim 9 wherein said detail-in-context distortion function is linear.

12. The method of claim 9 wherein said detail-in-context distortion function is Gaussian.

13. The method of claim 9 wherein said detail-in-context distortion function is hemispherical.

14. The method of claim 9 wherein said detail-in-context distortion function is inverse hemispherical.

15. The method of claim 9 wherein said detail-in-context distortion function is trigonometric.

16. The method of claim 9 wherein said detail-in-context distortion function is user defined.

17. The method of claim 1 wherein said path is a line.

18. The method of claim 1 wherein said path is a plane.

19. The method of claim 18 wherein said plane is parallel to a plane containing a vector from said viewpoint to said region-of-interest.

20. The method of claim 18 wherein said plane is perpendicular to a plane containing a vector from said viewpoint to said region-of-interest.

21. The method of claim 18 wherein said plane is rotated with respect to a plane containing a vector from said viewpoint to said region-of-interest.

22. The method of claim 18 wherein said transformation function has a distribution across a plane perpendicular to a vector from said viewpoint to said region-of-interest that is constrained by said shaping function.

23. The method of claim 1 wherein said shaping function is a non-continuous function for spatially constraining said transformation function.

24. The method of claim 1 wherein said shaping function is a continuous function for continuously constraining said transformation function and wherein said continuous function is a constant function.

25. The method of claim 24 wherein said continuous function is a Gaussian function.

26. The method of claim 24 wherein said continuous function is a linear function.

27. The method of claim 24 wherein said continuous function is a user-defined curve.

28. The method of claim 1 wherein said transformation function has a distribution along said path defined by a distribution function, said shaping function including said distribution function.

29. The method of claim 23 wherein said distribution function is a z-axis distribution function.

30. The method of claim 28 wherein said distribution function is constant.

31. The method of claim 28 wherein said distribution function is linear.

32. The method of claim 31 wherein said linear distribution function continues through said three-dimensional data representation thereby isolating said region-of-interest.

33. The method of claim 28 wherein said distribution function is short linear.

34. The method of claim 33 wherein one end of said short linear distribution function terminates at said region-of-interest.

35. The method of claim 28 wherein said distribution function is truncated.

36. The method of claim 35 wherein said distribution function is truncated at said region-of-interest.

37. The method of claim 36 wherein said truncated distribution function includes a cap around said region-of-interest.

38. The method of claim 37 wherein said cap is hemispherical.

39. The method of claim 28 wherein said distribution function is a user-defined curve.

40. The method of claim 1 wherein said region-of-interest includes a plurality of regions-of-interest and wherein said region-of-interest includes an object-of-interest.

41. A data processing system including an input device, a central processing unit, memory, and a display, said data processing system having stored therein data representing sequences of instructions which when executed cause the method any of claims 1 through 40 to be performed.

42. A computer software product including sequences of instructions which when executed cause the method any of claims 1 through 40 to be performed.

43. An integrated circuit product including sequences of instructions which when executed cause the method any of claims 1 through 40 to be performed.

44. The use of the method of claim 1 to obtain a non-occluded presentation of a stored object in a representation of contents of a warehouse.

45. The use of claim 44 wherein said stored object is an inventory item.

46. The method of claim 1 wherein said display screen is an electronic display screen.

47. The method of claim 1 wherein said display screen is a print-out.

48. The use of claim 44 wherein said warehouse is a shipping vessel.

49. The use of the method of claim 1 to obtain a non-occluded presentation of a person in a representation of a group of people.

50. The method of claim 1 wherein said display screen is a television screen.

51. The method of claim 1 wherein said display screen is a projection screen.

52. The use of the method of claim 1 to obtain a non-occluded presentation of a component within a three-dimensional drawing representation.

53. The use of claim 52 wherein said drawing is a mechanical design drawing.

54. The use of claim 52 wherein said drawing is an engineering drawing.

55. The use of claim 52 wherein said drawing is a drawing of an automobile engine.

56. The use of the method of claim 1 to obtain a non-occluded presentation of a node in a three-dimensional network topology representation.

57. The use of claim 56 wherein said network topology is a computer network.

58. The method of claim 1 wherein said three-dimensional information representation includes a two-dimensional information representation and a multi-dimensional information representation.

* * * * *

UNITED STATES PATENT AND TRADEMARK OFFICE
CERTIFICATE OF CORRECTION

| | |
|---|---|
| PATENT NO. | : 6,798,412 B2 |
| APPLICATION NO. | : 09/946806 |
| DATED | : September 28, 2004 |
| INVENTOR(S) | : David Cowperthwaite |

It is certified that error appears in the above-identified patent and that said Letters Patent is hereby corrected as shown below:

1. Specification, column 1, line 17: Insert a period -- . -- after the word "representation".

2. Specification, column 1, line 34: Insert a period --. -- after the word "exists".

3. Specification, column 1, line 43: Replace the word "Derail" with the word -- Detail --.

4. Specification, column 2, line 63: Insert a period -- . -- after the word "situation".

5. Specification, column 4, line 6: Insert a period -- . -- after the word "function".

6. Specification, column 8, line 26: Replace the word "she" with the word -- the --.

7. Specification, column 8, line 39: Delete the words "in accordance with another embodiment".

8. Specification, column 8, line 40: Replace the word "font" with the word -- front --.

9. Specification, column 9, line 30: Replace the word "dam" with the word -- data --.

10. Specification, column 10, line 12: Replace the word "wit" with the word --with --.

11. Specification, column 15, line 1: Replace the word "To" with the word -- to --.

12. Specification, column 16, line 37: Replace the word "Me" with the word -- the --.

13. Specification, column 16, line 59: Replace the word "tan" with the word -- than --.

14. Specification, column 17, line 51: Replace the word "trough" with the word -- through --.

15. Specification, column 20, line 45: Replace the word "ere" with the word -- there --.

16. Specification, column 20, line 53: Replace the word "Me" with the word -- the --.

17. Specification, column 23, line 8: Replace the word "cm" with the word -- can --.

18. Specification, column 23, line 26: Replace the word "font" with the word -- front --.

UNITED STATES PATENT AND TRADEMARK OFFICE
CERTIFICATE OF CORRECTION

PATENT NO. : 6,798,412 B2
APPLICATION NO. : 09/946806
DATED : September 28, 2004
INVENTOR(S) : David Cowperthwaite It is certified that error appears in the above-identified patent and that said Letters Patent is hereby corrected as shown below:

19. Specification, column 24, line 67: Replace the word "OPT" with the word -- ORT --.

20. Claim 29, column 37, line 1: Replace the number "23" with the number -- 28 --.

21. Claim 41, column 37, line 31: Insert the word -- of -- after the word "method".

22. Claim 42, column 37, line 33: Insert the word -- of -- after the word "method".

23. Claim 43, column 37, line 36: Insert the word -- of -- after the word "method".

Signed and Sealed this

Twelfth Day of June, 2007

JON W. DUDAS
*Director of the United States Patent and Trademark Office*